(12) United States Patent
Izukawa

(10) Patent No.: US 6,522,837 B2
(45) Date of Patent: Feb. 18, 2003

(54) IMAGE BLUR CORRECTING SYSTEM

(75) Inventor: Kazuhiro Izukawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/739,215

(22) Filed: Dec. 19, 2000

(65) Prior Publication Data

US 2001/0031141 A1 Oct. 18, 2001

(30) Foreign Application Priority Data

| Dec. 28, 1999 | (JP) | ............................................ | 11-373185 |
| Aug. 3, 2000 | (JP) | ...................................... | 2000-235066 |
| Aug. 23, 2000 | (JP) | ...................................... | 2000-253039 |

(51) Int. Cl.$^7$ ............................................. G03B 17/00
(52) U.S. Cl. ....................................................... 396/55
(58) Field of Search ............................. 396/52–55, 302, 396/529; 348/208

(56) References Cited

U.S. PATENT DOCUMENTS

| 5,172,150 A | | 12/1992 | Teramoto et al. ............ 354/202 |
| 5,649,237 A | | 7/1997 | Okazaki ....................... 396/55 |
| 6,088,533 A | * | 7/2000 | Shiomi ......................... 396/52 |
| 6,157,780 A | * | 12/2000 | Hamada et al. ................ 396/55 |

FOREIGN PATENT DOCUMENTS

| JP | 6-250272 | 9/1994 | ........... G03B/17/00 |
| JP | 7-191355 | 7/1995 | ............ G03B/5/00 |
| JP | 11-64907 | 3/1999 | ............ G03B/5/00 |
| JP | 11-64908 | 3/1999 | ............ G03B/5/00 |

OTHER PUBLICATIONS

European Search Report dated Jul. 5, 2001 (Ref. No. EP29045).

* cited by examiner

*Primary Examiner*—W. B. Perkey
(74) *Attorney, Agent, or Firm*—Fitzpatrick, Cella, Harper, Scinto

(57) ABSTRACT

An image blur correcting system includes a photographing device including arithmetically operating means for determining a relation between a detection output value of the blur detecting means and a driven amount of the image blur correcting means corresponding to the detection output value in accordance with information related to a blur prevention sensitivity, conducting arithmetic operation on the basis of the determined relation to calculate a drive signal for driving the image blur correcting means in accordance with the detection output value of the blur detecting means, and transmitting means for transmitting the drive signal calculated by the arithmetically operating means to the optical device, and an optical device including transmitting means for transmitting the information related to the blur prevention sensitivity to the photographing device, and drive control means that receives the drive signal for controlling the driving of the image blur correcting means in accordance with the drive signal.

46 Claims, 38 Drawing Sheets

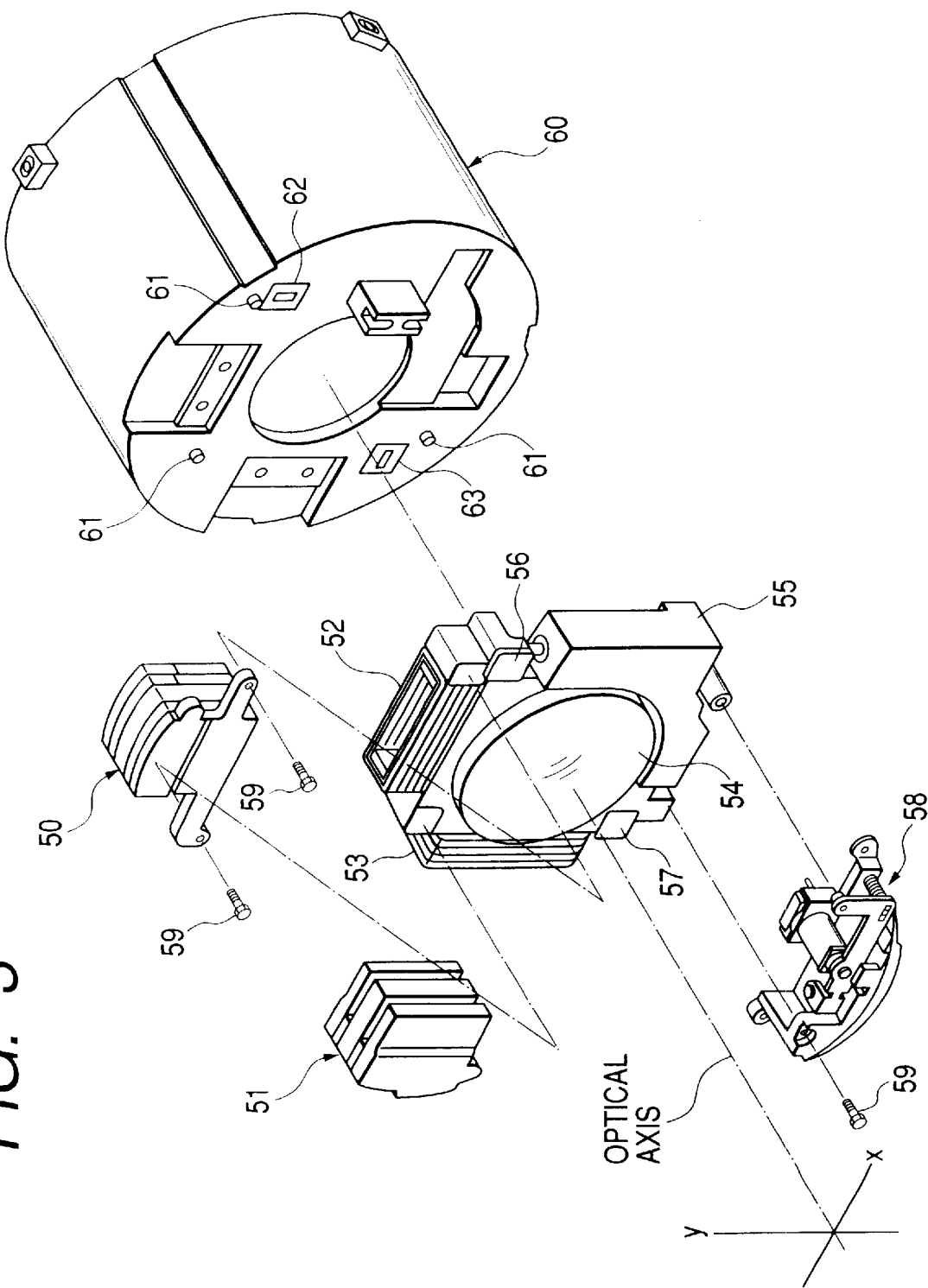

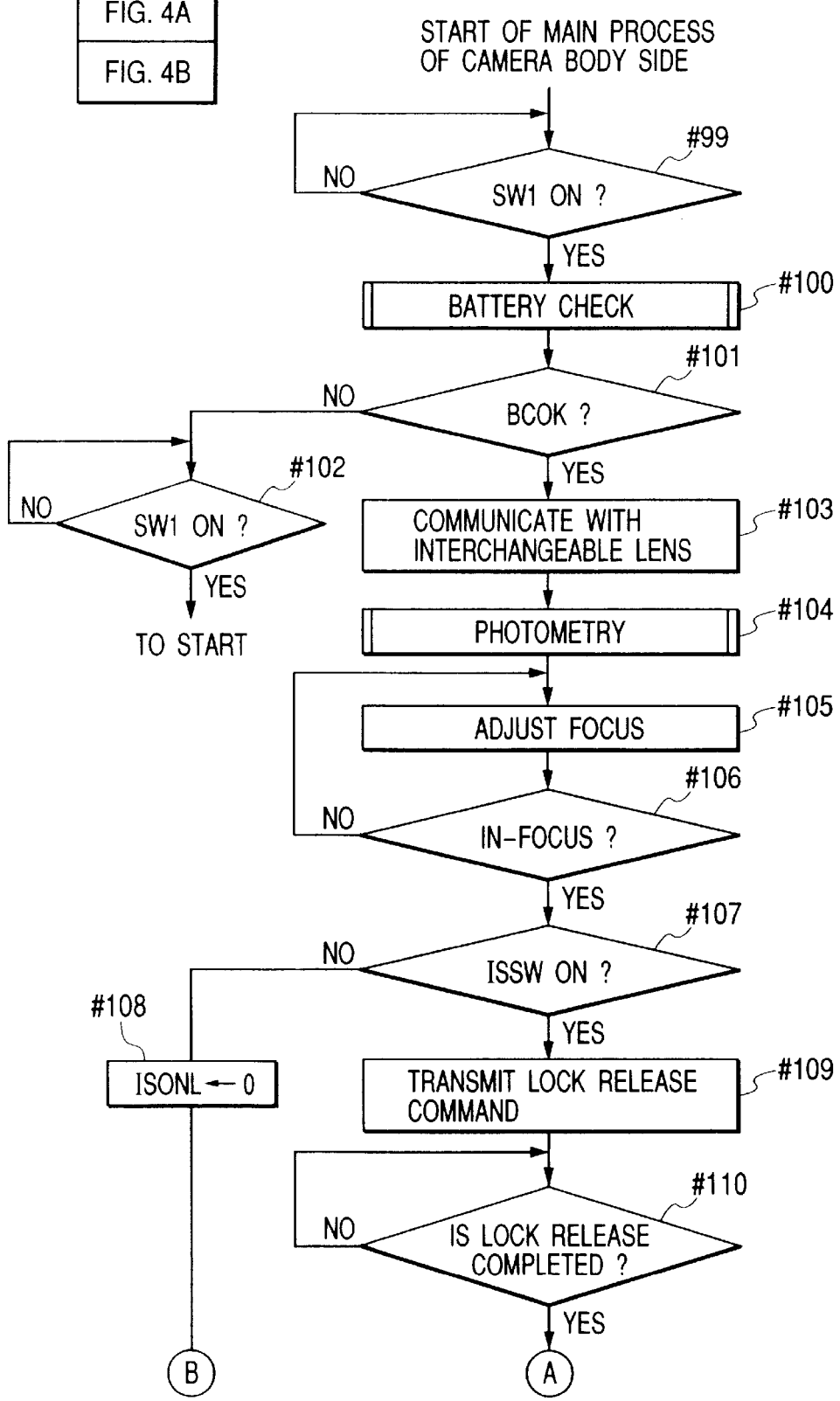

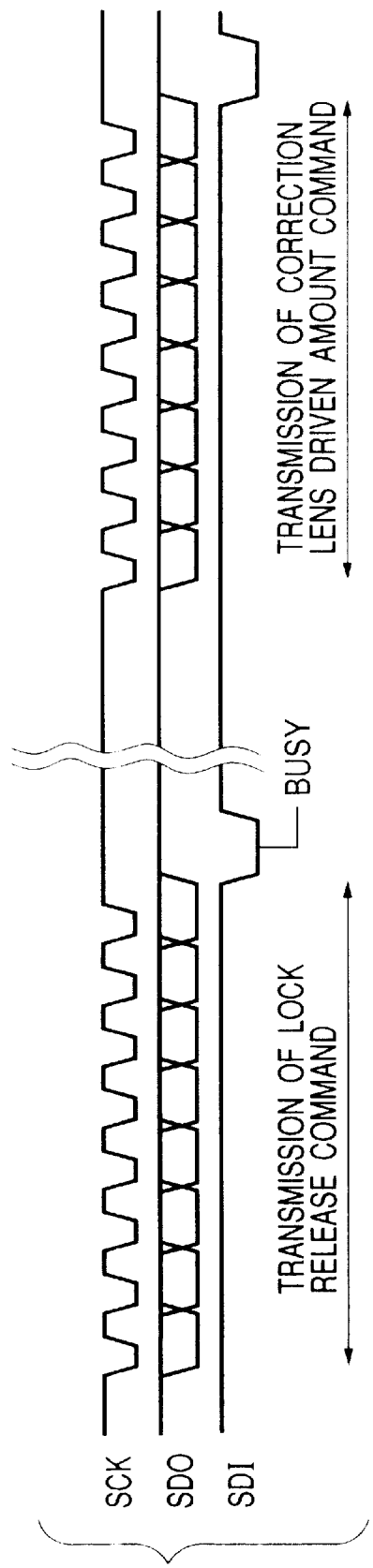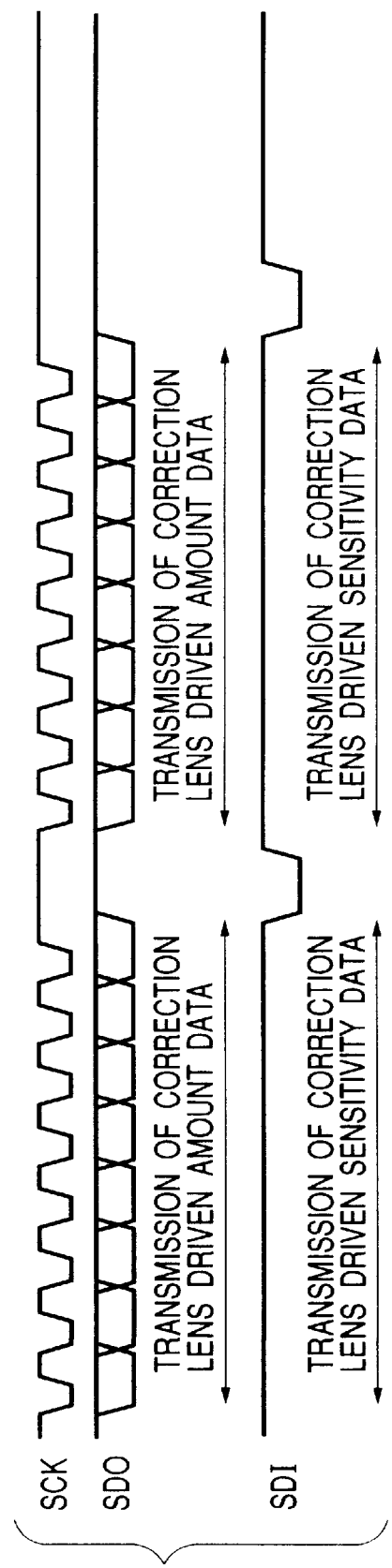

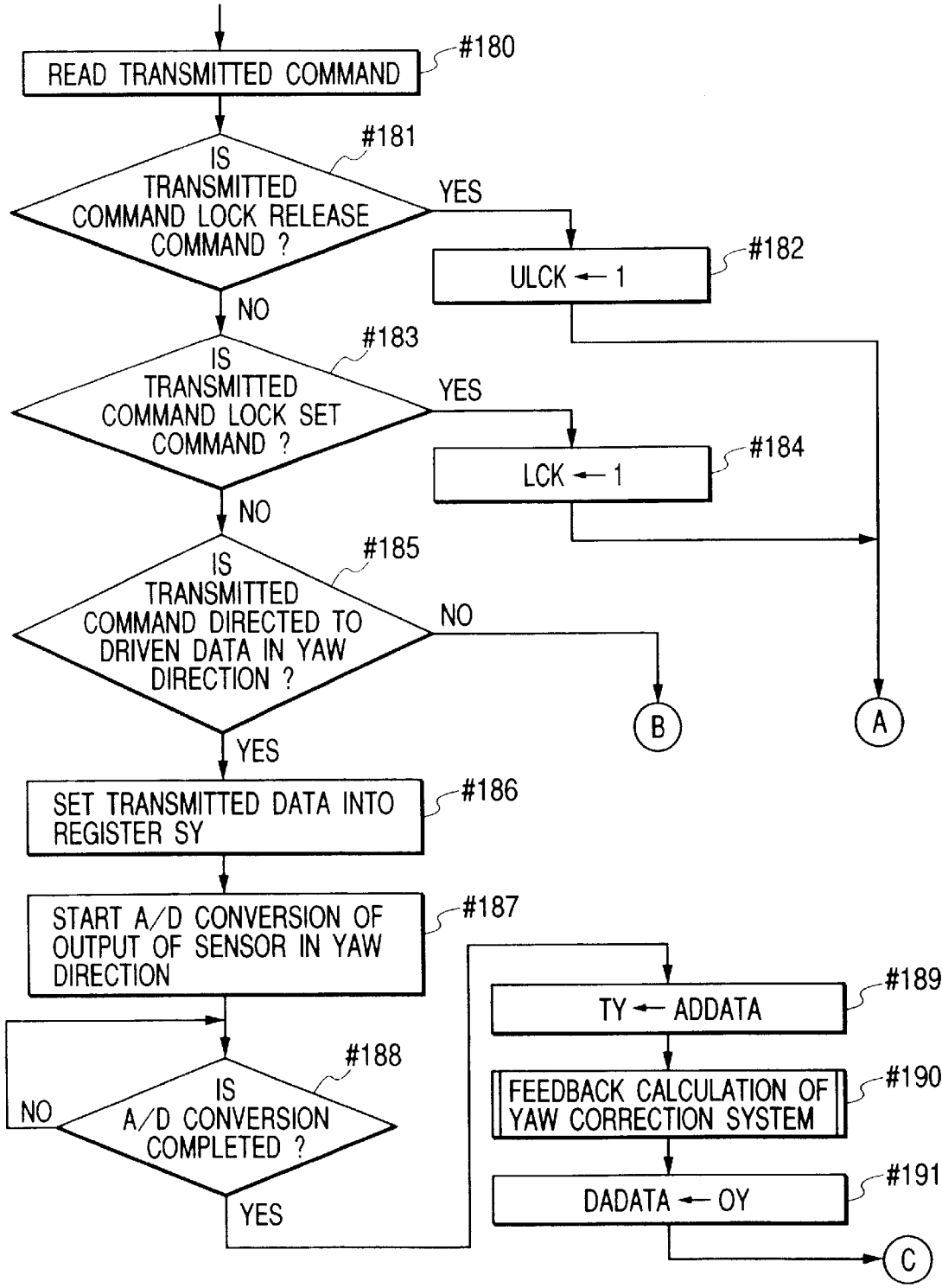

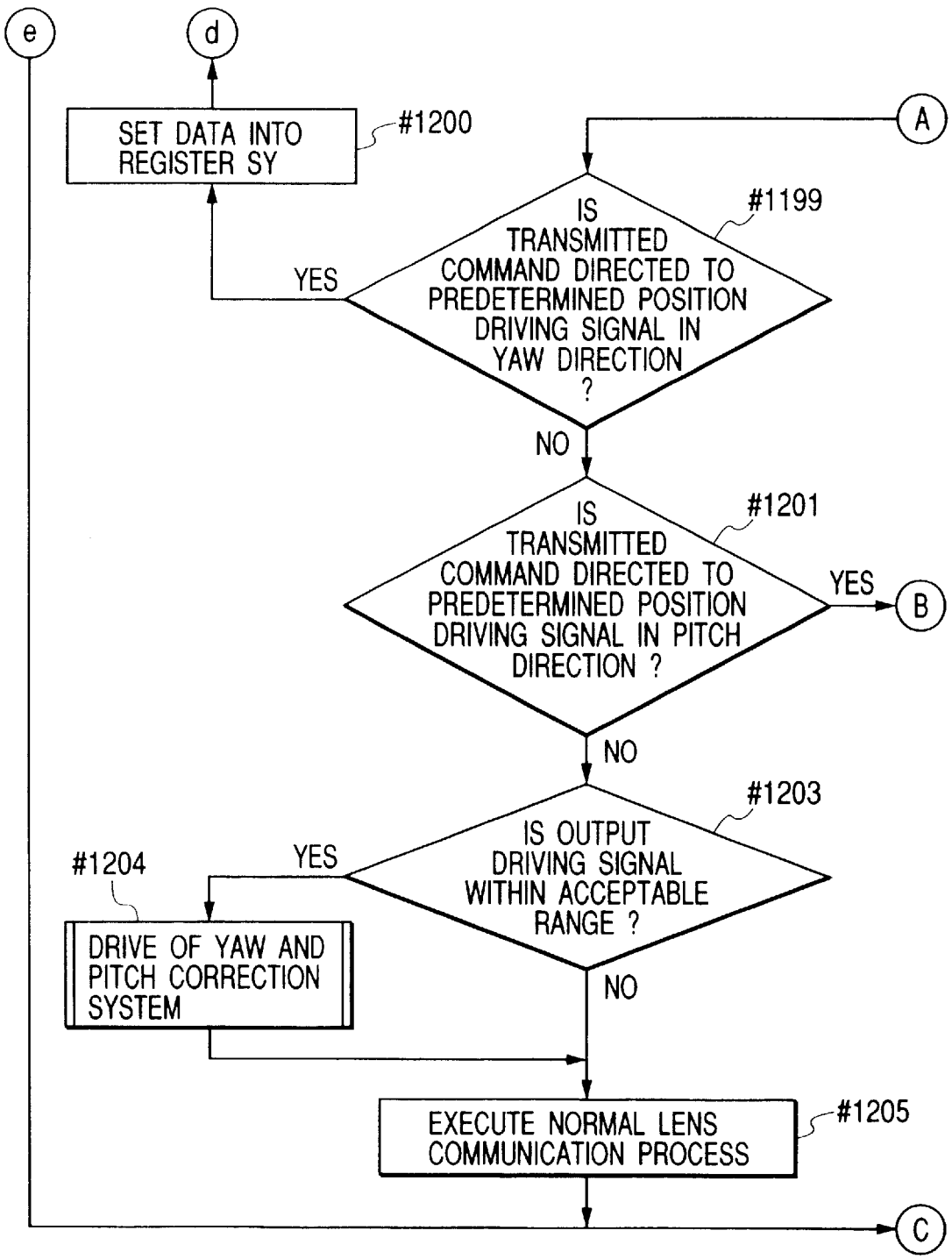

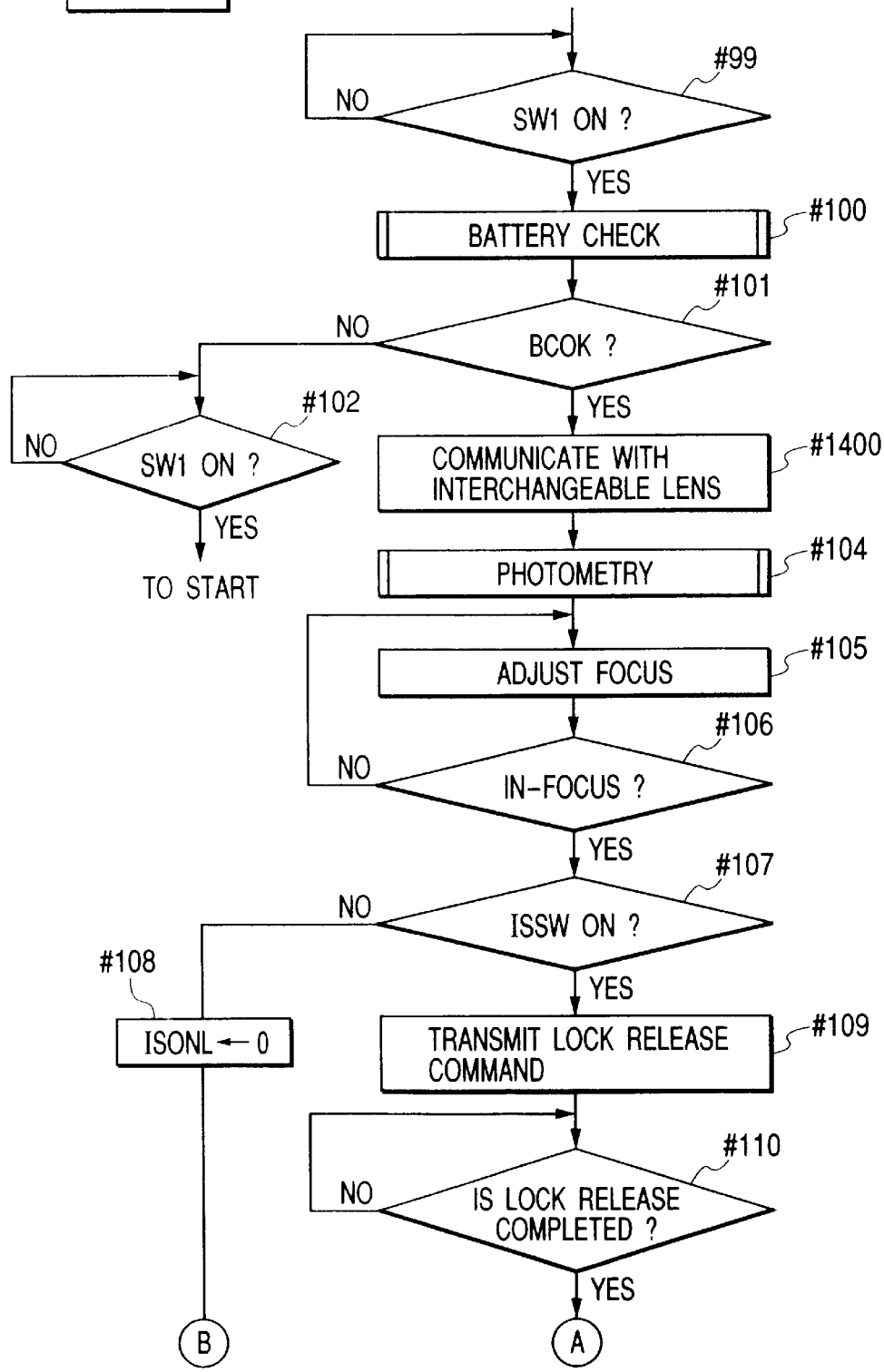

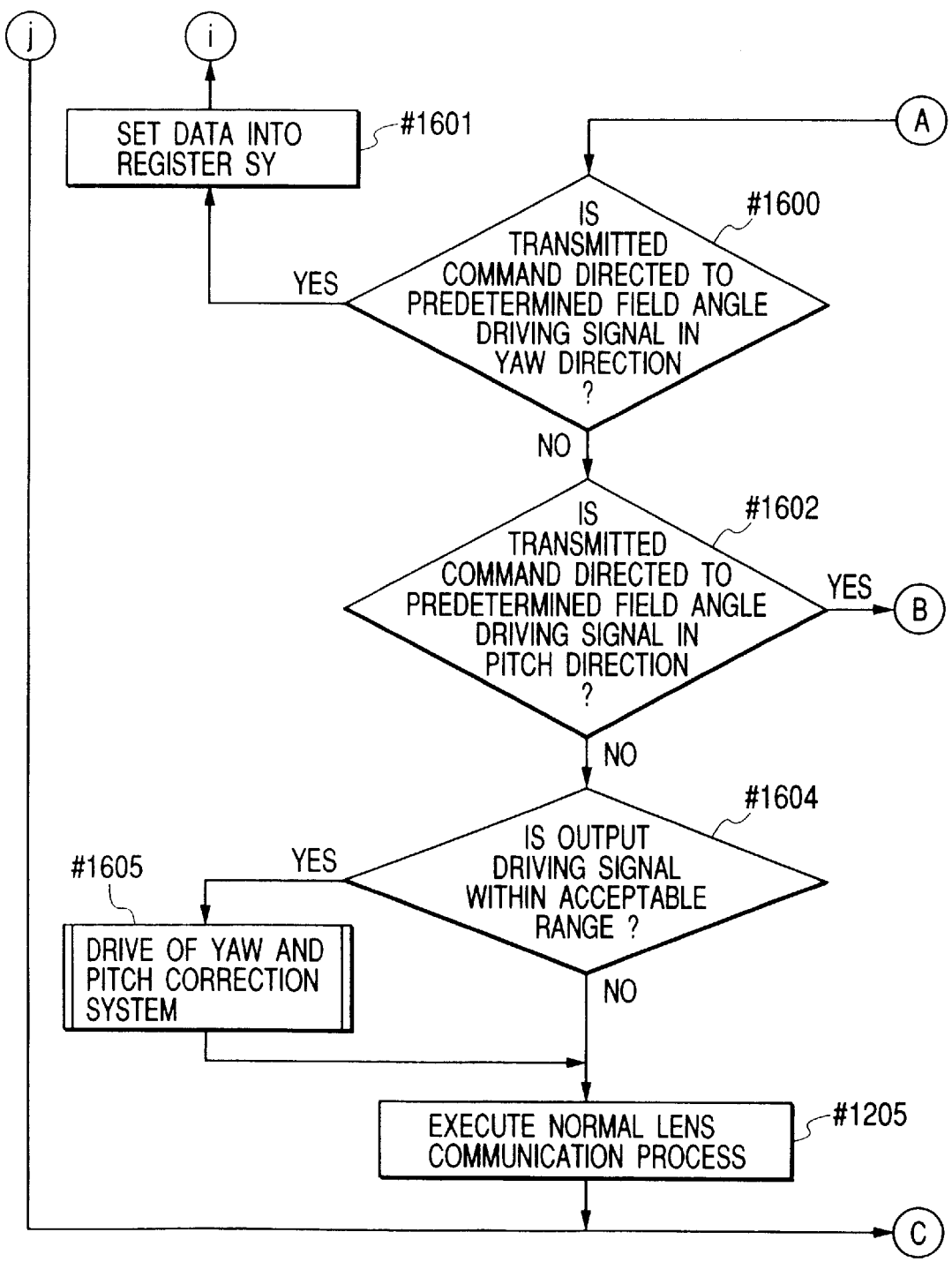

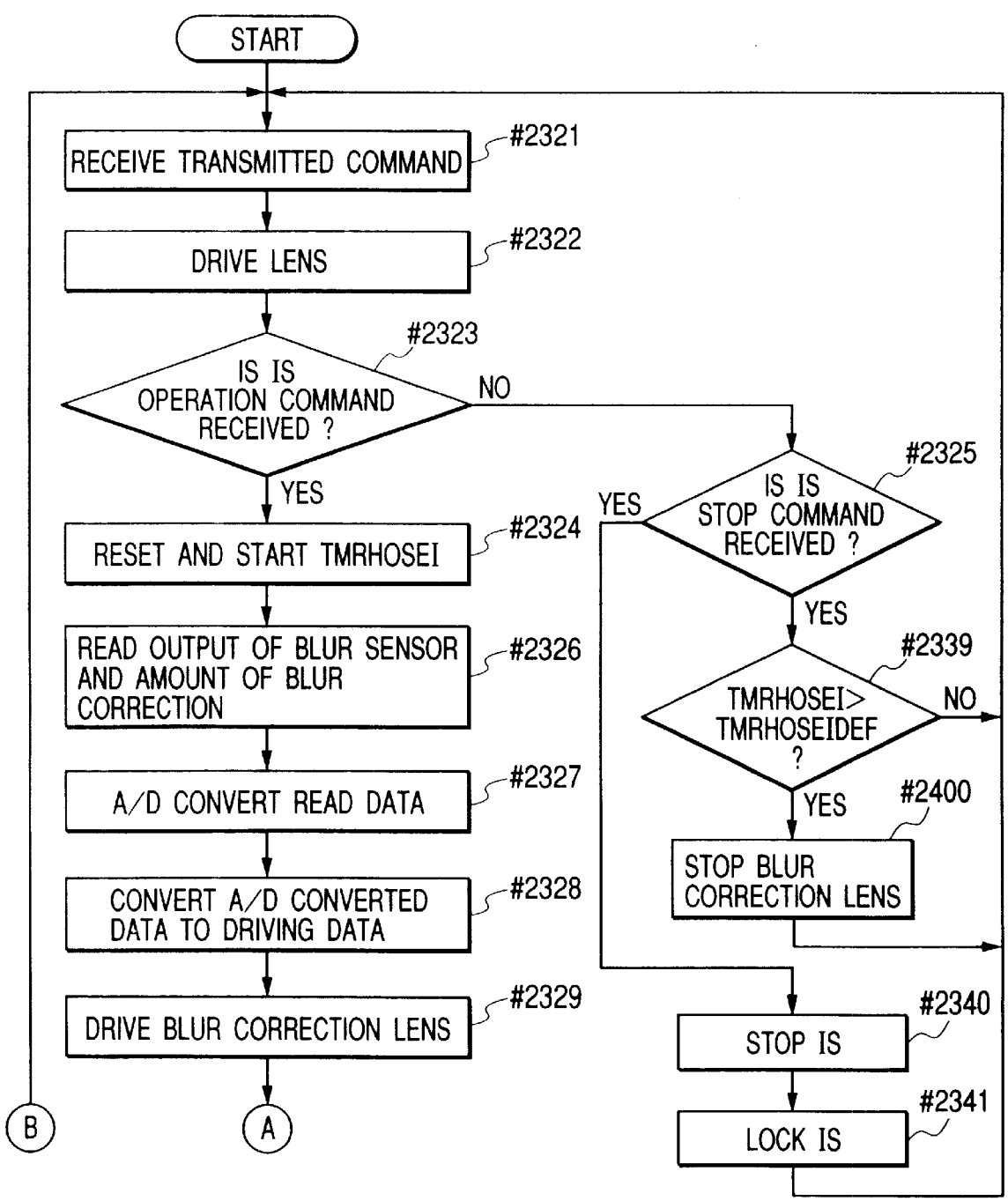

IMAGE BLUR CORRECTING SYSTEM

BACKGROUND OF THE INVENTION

1. Field of the Invention

The present invention relates to an improvement in an image blur correcting system, a camera system, a camera and an interchangeable lens which are structured by combination of a photographing device having a blur detecting means with an optical device having an image blur correcting means.

2. Related Background Art

Up to now, there has been known a blur prevention lens of the interchangeable lens, which is used for a camera. Also, there has been disclosed examples in which a blur detecting means for detecting an image blur is disposed in a camera and an image blur correcting means for correcting the image blur is disposed within the interchangeable lens in Japanese Patent Application Laid-open No. 6-250272, Japanese Patent Application Laid-open No. 7-191355 and so on.

The blur prevention sensitivity needs to be adjusted in order to appropriately conduct the image blur correcting operation by the above blur detecting means, the image blur correcting means and so on. The blur prevention sensitivity is directed to the ratio of the driven amount of the blur correction lens to the inclined amount of the device. That is, the blur prevention sensitivity is data pertaining to how many millimeters the blur correction lens needs to be shifted in order to correct the image blur caused by the hand fluctuated angular displacement of, for example, 1°. As disclosed in the above-described Japanese Patent Application Laid-open No. 6-250272, Japanese Patent Application Laid-open No. 7-191355 and so on, the blur prevention sensitivity changes in accordance with the zooming and focusing states.

In the systems disclosed in the above-described documents and so on, arithmetic operation for adjustment of the blur prevention sensitivity is conducted by a microcomputer equipped within a lens at an interchangeable lens side. In more detail, when a blur signal obtained by the blur detecting means equipped at the camera side is transmitted to the interchangeable lens side in a state where the above blur prevention sensitivity is not taken into consideration, the blur prevention sensitivity is determined on the basis of zoom information and focus information which have been detected by a zoom encoder and a focus encoder, respectively, by the microcomputer within the lens, and arithmetic operation that multiplies the blur prevention sensitivity by the blur signal transmitted from the camera side is conducted to obtain the driving displacement of the blur correction lens.

For that reason, a load of the arithmetic operation by the microcomputer within the lens at the interchangeable lens side becomes large.

Also, there has been proposed the communication of a coordinate position drive signal of the blur correction lens by the present applicant (Japanese Patent Application No. 11-373185).

In the system disclosed in the above-described Japanese Patent Application No. 11-373185, the coordinate position drive signal of the blur correction lens requires an accuracy of from 11 to 12 bits as the blur prevention accuracy assuming that the maximum size of a screen is 36 mm and the resolution is 100/mm. When this is applied to 8-bit transmission, the traffic becomes "drive command (8 bits)"+"driven amount superordination (8 bits)"+"driven amount subordination (8 bits)". In addition, since there are two yaw and pitch directions, the traffic becomes 6 bytes (6×8 bits). Then, in order to correct the hand fluctuation, it is necessary to conduct the transmission of 6 bytes for each of about 1 mS. For that reason, the traffic between the camera and the interchangeable lens becomes large.

Also, in the conventional system, because the driving of the image blur correcting means stops in response to a stop signal from the camera side, there is a case in which because the camera does not output a drive stop signal of the image blur correcting means if an operator does not operate a stop switch or the like, so that the image blur correcting means equipped within the interchangeable lens remains driven, resulting in a useless power consumption.

SUMMARY OF THE INVENTION

The present invention has been made to solve the above problems with the conventional system, and therefore an object of the present invention is to provide an image blur correcting system including a photographing device and an optical device which is capable of reducing an arithmetic operation load pertaining to an image blur correction at the optical device side.

In order to achieve the above object, according to one aspect of the present invention, there is provided an image blur correcting system formed of the combination of a photographing device having blur detecting means and an optical device having image blur correcting means, wherein the photographing device comprising:

arithmetically operating means for determining a relation between a detection output value of the blur detecting means and a driven amount of the image blur correcting means corresponding to the detection output value in accordance with information related to a blur prevention sensitivity transmitted from the optical device, conducting arithmetic operation on the basis of the determined relation to calculate a drive signal for driving the image blur correcting means in accordance with the detection output value of the blur detecting means; and transmitting means for transmitting the drive signal calculated by the arithmetically operating means to the optical device, and the optical device comprising:

transmitting means for transmitting the information related to the blur prevention sensitivity to the photographing device; and drive control means that receives the drive signal for controlling the driving of the image blur correcting means in accordance with the drive signal.

With the above structure, the photographing device side having the blur detecting means conducts the arithmetic operation on the basis of the relation between the detection output value of the blur detecting means and the driven amount of the image blur correcting means which corresponds to the detection output value, and the signal obtained by the arithmetic operation is transmitted to the optical device side having the image blur correcting means.

According to another aspect of the present invention, there is provided a camera system formed of the combination of a camera having blur detecting means and an interchangeable lens having image blur correcting means, wherein the camera comprising:

arithmetically operating means for determining a relation between a detection output value of the blur detecting means and a driven amount of the image blur correcting means corresponding to the detection output value in accordance with information related to a blur prevention sensitivity, conducting arithmetic operation on the basis of the determined relation to calculate a drive signal for driving the image blur correcting means in accordance with the detection output value of the blur detecting means; and transmitting means for transmitting the drive signal calculated by the arithmetically operating means to the interchangeable lens, and the interchangeable lens comprising:

transmitting means for transmitting the information related to the blur prevention sensitivity to the camera; and drive control means that receives the drive signal for controlling the driving of the image blur correcting means in accordance with the drive signal.

With the above structure, the arithmetic operation is conducted on the basis of the relation between the detection output value of the blur detecting means and the driven amount of the image blur correcting means which corresponds to the detection output value at the camera side having the blur detecting means, and the signal obtained by the arithmetic operation is transmitted to the interchangeable lens side having the image blur correcting means.

According to yet still another aspect of the present invention, there is provided a camera having blur detecting means used in combination with an interchangeable lens having image blur correcting means, the camera comprising:

arithmetically operating means for determining a relation between a detection output value of the blur detecting means and a driven amount of the image blur correcting means corresponding to the detection output value in accordance with information related to a blur prevention sensitivity, conducting predetermined arithmetic operation on the basis of the determined relation to calculate a drive signal for driving the image blur correcting means in accordance with the detection output value of the blur detecting means; and transmitting means for transmitting the drive signal calculated by the arithmetically operating means to the interchangeable lens.

With the above structure, the arithmetic operation is conducted at the camera side on the basis of the relation between the detection output value of the blur detecting means and the driven amount of the image blur correcting means which corresponds to the detection output value, and the signal obtained by the arithmetic operation is transmitted to the interchangeable lens side having the image blur correcting means.

According to yet still another aspect of the present invention, there is provided an interchangeable lens having image blur correcting means used in combination with a camera having blur detecting means, the interchangeable lens comprising:

transmitting means for transmitting information related to the blur prevention sensitivity to the camera; and drive control means for controlling the driving of the image blur correcting means in accordance with the drive signal transmitted from the camera.

With the above structure, the arithmetic operation is conducted at the camera side on the basis of the relation between the detection output value of the blur detecting means and the driven amount of the image blur correcting means which corresponds to the detection output value, and the signal obtained by the arithmetic operation is transmitted to control the driving of the image blur correcting means in accordance with the drive signal.

Also, another object of the present invention is to provide an image blur correcting system, a camera system, a camera and an interchangeable lens which are capable of reducing the communication load related to the drive depending on a drive target position of the image blur correcting means.

In order to achieve the above object, according to yet still another aspect of the present invention, there is provided an image blur correcting system formed of the combination of a photographing device having blur detecting means with an optical device having image blur correcting means, wherein the photographing device comprising:

transmitting means for transmitting to the optical device a given-position drive signal for driving the image blur correcting means to a given position or a coordinate position drive signal of the image blur correcting means which is calculated on the basis of an output of the blur detecting means; and the optical device comprising:

drive control means for controlling the driving of the image blur correcting means in accordance with the given-position drive signal transmitted from the transmitting means or the coordinate position drive signal.

According to yet still another aspect of the present invention, there is provided an image blur correcting system formed of the combination of a photographing device having blur detecting means with an optical device having image blur correcting means, wherein the photographing device comprising:

transmitting means for transmitting to the optical device a given-angle-of-view drive signal for driving the image blur correcting means to a given angle of view or a coordinate position drive signal of the image blur correcting means which is calculated on the basis of an output of the blur detecting means; and the optical device comprising:

drive control means for controlling the driving of the image blur correcting means in accordance with the given-angle-of-view drive signal transmitted from the transmitting means or the coordinate position drive signal.

According to yet still another aspect of the present invention, there is provided a camera system formed of the combination of a camera having blur detecting means with an interchangeable lens having image blur correcting means, wherein the camera comprising:

transmitting means for transmitting to the interchangeable lens a given-position drive signal for driving the image blur correcting means to a given position or a coordinate position drive signal of the image blur correcting means which is calculated on the basis of an output of the blur detecting means; and the interchangeable lens comprising:

drive control means for controlling the driving of the image blur correcting means in accordance with the given-position drive signal transmitted from the transmitting means or the coordinate position drive signal.

According to yet still another aspect of the present invention, there is provided a camera having blur detecting means which constitutes a camera system in combination with an interchangeable lens having image blur correcting means, the camera comprising:

transmitting means for transmitting to the interchangeable lens a given-position drive signal for driving the image blur correcting means to a given position or a coordinate position drive signal of the image blur correcting means which is calculated on the basis of an output of the blur detecting means.

According to yet still another aspect of the present invention, there is provided an interchangeable lens having image blur correcting means which constitutes a camera system in combination with the camera of the above aspect of the invention, the interchangeable lens comprising:

drive control means for controlling the driving of the image blur correcting means in accordance with the given-position drive signal transmitted from the camera or the coordinate position drive signal.

According to yet still another aspect of the present invention, there is provided a camera system formed of the combination of a camera having blur detecting means with an interchangeable lens having image blur correcting means, wherein the camera comprising:

transmitting means for transmitting to the interchangeable lens a given-angle-of-view drive signal for driving the image blur correcting means to a given angle of view or a coordinate position drive signal of the image blur correcting means which is calculated on the basis of an output of the blur detecting means; and the interchangeable lens comprising:

drive control means for controlling the driving of the image blur correcting means in accordance with the given-angle-of-view drive signal transmitted from the transmitting means or the coordinate position drive signal.

According to yet still another aspect of the present invention, there is provided a camera having a blur detecting means which constitutes a camera system in combination with an interchangeable lens having image blur correcting means, the camera comprising:

transmitting means for transmitting to the interchangeable lens a given-angle-of-view drive signal for driving the image blur correcting means to a given angle of view or a coordinate position drive signal of the image blur correcting means which is calculated on the basis of an output of the blur detecting means.

According to yet still another aspect of the present invention, there is provided an interchangeable lens which constitutes a camera system in combination with the camera as described above, the interchangeable lens comprising:

drive control means for controlling the driving of the image blur correcting means in accordance with the given-angle-of-view drive signal transmitted from the camera or the coordinate position drive signal.

Still another object of the present invention is to provide an image blur correcting system, a camera system and an interchangeable lens which are capable of suppressing a power consumption or reducing a power consumption by stopping the useless driving of the image blur correcting means in the case where a signal related to the driving of the image blur correcting means does not occur for a predetermined period of time.

According to yet still another aspect of the present invention, there is provided an image blur correcting system formed of the combination of a photographing device having blur detecting means with an optical device having image blur correcting means, wherein the photographing device comprising: transmitting means for transmitting a signal related to the driving of the image blur correcting means to the optical device; and the optical device comprising:

drive control means for controlling the driving of the image blur correcting means on the basis of the signal related to the driving of the image blur correcting means upon receiving the signal, and for stopping the driving of the image blur correcting means when not receiving the signal related to the driving of the image blur correcting means for a predetermined period of time.

According to yet still another aspect of the present invention, there is provided an image blur correcting system formed of the combination of a photographing device having blur detecting means with an optical device having image blur correcting means, wherein the photographing device comprising:

transmitting means for transmitting a signal related to the driving of the image blur correcting means to the optical device; and the optical device comprising:

drive control means for controlling the driving of the image blur correcting means on the basis of the signal related to the driving of the image blur correcting means upon receiving the signal and for driving the image blur correcting means to a predetermined position and stopping the driving of the image blur correcting means when not receiving the signal related to the driving of the image blur correcting means for a predetermined period of time.

According to yet still another aspect of the present invention, there is provided a camera system formed of the combination of a camera having blur detecting means with an interchangeable lens having image blur correcting means, wherein the camera comprising:

transmitting means for transmitting a signal related to the driving of the image blur correcting means to the camera; and the interchangeable lens comprising: drive control means for controlling the driving of the image blur correcting means on the basis of the signal related to the driving of the image blur correcting means upon receiving the signal and for stopping the driving of the image blur correcting means when not receiving the signal related to the driving of the image blur correcting means for a predetermined period of time.

According to yet still another aspect of the present invention, there is provided a camera system formed of the combination of a camera having blur detecting means with an interchangeable lens having image blur correcting means, wherein the camera comprising:

transmitting means for transmitting a signal related to the driving of the image blur correcting means to the optical device; and the interchangeable lens comprising:

drive control means for controlling the driving of the image blur correcting means on the basis of the signal related to the driving of the image blur correcting means upon receiving the signal and for driving the image blur correcting means to a predetermined position and stopping the driving of the image blur correcting means when not receiving the signal related to the driving of the image blur correcting means for a predetermined period of time.

According to yet still another aspect of the present invention, there is provided an interchangeable lens having image blur correcting means which constitutes a camera system in combination with a camera having blur detecting means, the interchangeable lens comprising:

drive control means for controlling the driving of the image blur correcting means on the basis of the signal related to the driving of the image blur correcting means upon receiving the signal from the camera and for stopping the driving of the image blur correcting means when not receiving the signal related to the driving of the image blur correcting means for a predetermined period of time.

According to yet still another aspect of the present invention, there is provided an interchangeable lens having image blur correcting means which constitutes a camera system in combination with a camera having blur detecting means, the interchangeable lens comprising:

drive control means for controlling the driving of the image blur correcting means on the basis of the signal related to the driving of the image blur correcting means upon receiving the signal, and for driving the image blur correcting means to a predetermined position and stopping the driving of the image blur correcting means when not receiving the signal related to the driving of the image blur correcting means for a predetermined period of time.

BRIEF DESCRIPTION OF THE DRAWINGS

These and other objects, features and advantages of this invention will become more fully apparent from the following detailed description taken with the accompanying drawings in which:

FIG. 3 is a perspective view showing the structure of a blur correction system 9 shown in FIG. 1;

FIGS. 7A and 7B are diagrams for explanation of communication in a camera system in accordance with the first embodiment of the present invention;

DESCRIPTION OF THE PREFERRED EMBODIMENTS

Now, a description will be given in more detail of preferred embodiments of the present invention with reference to the accompanying drawings.

Figure 1:
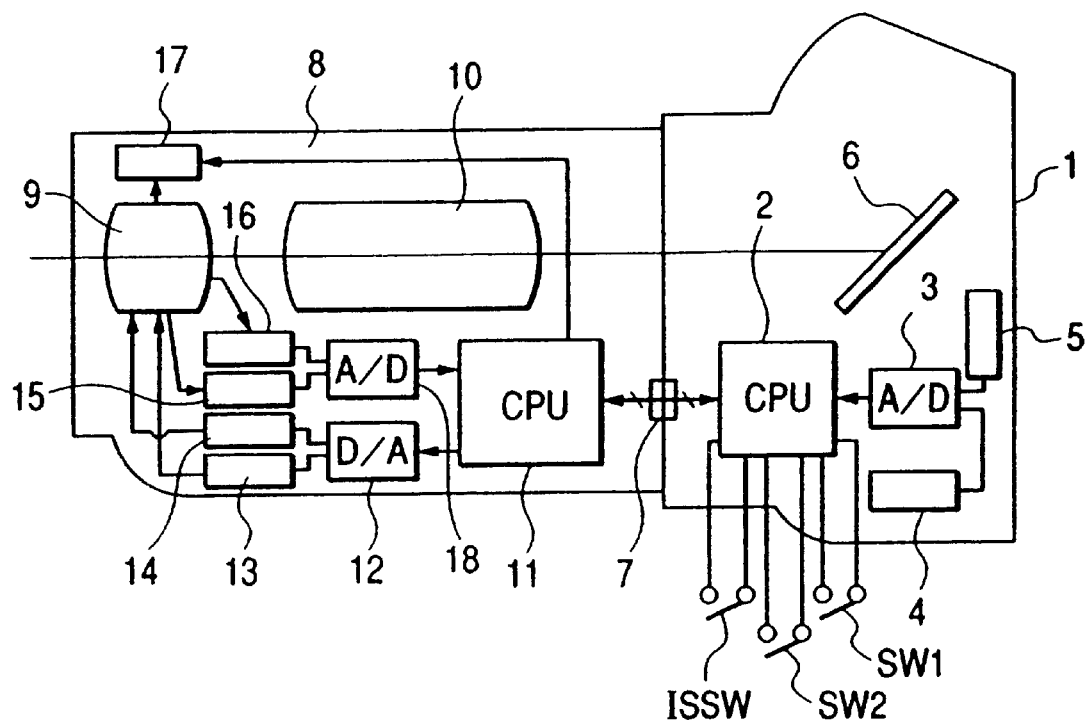
FIG. 1 is a structural diagram showing a camera system in accordance with the respective embodiments of the present invention.

FIG. 1 is a structural diagram showing a camera system made up of a camera (camera main body) and an interchangeable lens in accordance with the respective embodiments of the present invention. In the figure, a CPU 2 that controls the camera side is equipped within the camera 1, and blur sensors (or fluctuation sensor) 4 and 5 that output the blur or fluctuation in yaw and pitch directions of the camera are disposed as shown in the figure. Both of the outputs of the blur sensors 4 and 5 are converted into digital data by an A/D convertor 3 and then taken in as data within the CPU 2.

Figure 2:
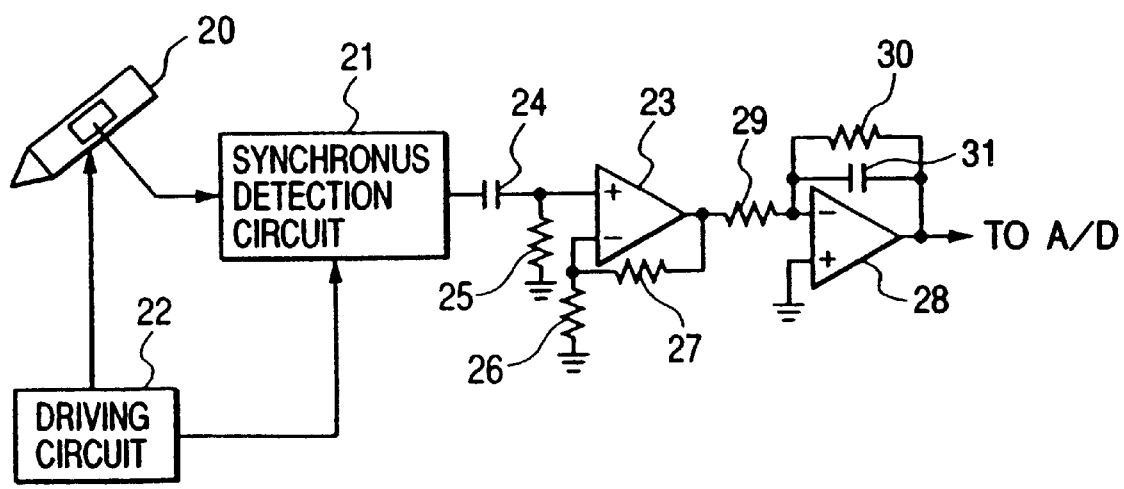
FIG. 2 is a circuit diagram showing a specific structure of the interiors of blur sensors 4 and 5 shown in FIG. 1.

As an example of the specific structure of the interior of the blur sensors 4 and 5, the blur sensors 4 and 5 are made up of a vibration gyro as an angular velocity sensor, an integrating circuit and so on as shown in FIG. 2.

In FIG. 2, the vibration gyro 20 is resonantly driven by a driving circuit 22, and its output is so converted as to be a given angular velocity output by a synchronous detection circuit 21 or the like. The output from the synchronous detection circuit 21 normally contains unnecessary d.c. offset, and the d.c. component is removed by a high-pass filter made up of a capacitor 24 and a resistor 25, and only the remaining blur signal is amplified by an amplifier made up of an operational amplifier 23 and resistors 26 and 27. In addition, an output of the amplifier is integrated by an integrating circuit made up of an operational amplifier 28, resistors 29, 30 and a capacitor 31 and then converted into an output which is proportional to a blur displacement. The integrated output is outputted to the A/D convertor 3 as described above.

Returning to FIG. 1, the sensor output taken within the CPU 2 becomes a blur correction lens driven amount which has been arithmetically operated on the basis of information from the interchangeable lens 8. Then, the data of the blur correction lens driven amount is transferred to the CPU 11 within the interchangeable lens 8 by the CPU 2 through a normal serial bus line 7 that conducts an interchange of information between the camera 1 and the interchangeable lens 8.

Within the interchangeable lens 8, outputs of position detecting sensors 15 and 16 that detect the absolute position of a blur correcting system 9 per se are converted into digital data by an A/D convertor 18 and then taken in the CPU 11. In the CPU 11, the data of the blur correction lens driven amount from the camera 1 is compared with the position of the blur correcting system 9, and the comparison result is transferred to a D/A convertor 12. Then, the blur correcting system 9 is driven through driver circuits 13 and 14 on the basis of the output result from the D/A convertor 12, to thereby correct an image blur.

A specific structural example of the blur correcting system 9 is shown in FIG. 3.

FIG. 3 shows the structure of a so-called shift optical system that corrects the angular blur of a camera by shifting the blur correction lens in parallel in x- and y- directions perpendicular to an optical axis. In the figure, reference numerals 50 and 51 respectively denote yoke portions as magnetic circuit units that become actual driving sources in x- and y- axial directions, respectively, and reference numeral 52 and 53 are coil portions corresponding to the respective yokes. Therefore, when a current is supplied to the coil portions 52 and 53 by the above-mentioned driver circuits 13 and 14, the correction lens 54 which is a part of the photographing lens is eccentrically driven in the x- and y- directions. Reference numeral 55 denotes a support arm and support frame for fixing the blur correction lens 54.

The movement of the blur correction lens 54 is detected in a non-contact manner by the combination of IREDs 56 and 57 that move integrally with the blur correction lens 54 with PSDs 62 and 63 fitted onto a tube portion 60 for retaining the entire shift lens. Also, reference numeral 58 denotes a mechanically locking mechanism for mechanically retaining the blur correction lens 54 to a position of substantially the center of the optical axis when the energization of the shift system stops, 59 is a charge pin, and 61 is a support sphere as a door stop for regulating the falling direction of the shift system, respectively.

Subsequently, the operation of the main portion in accordance with the first embodiment of the present invention will be described with reference to flowcharts shown in FIGS. 4A, 4B, 5, 6, 8, 9A, 9B and 10, a timing chart shown in FIGS. 7A and 7B and other figures.

Figure 4B:
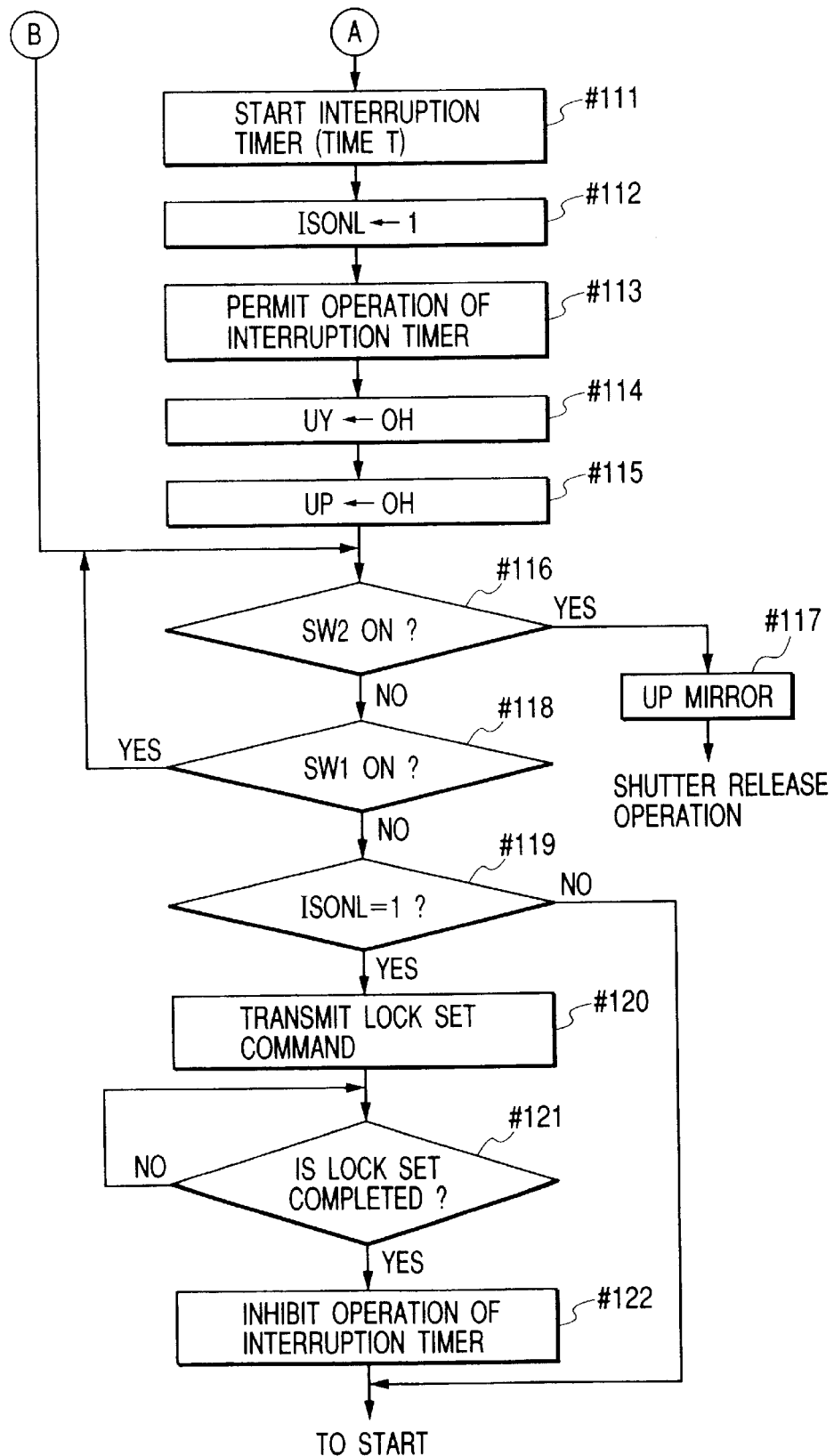
FIG. 4 is comprised of FIGS. 4A and 4B are flowcharts showing a main process of a camera side in accordance with a first embodiment of the present invention.

FIGS. 4A and 4B show the main process of the CPU 2 of the camera 1 which is related to the blur prevention (image blur correction) operation. In the figure, first in a step #99, it is judged whether a switch SW1 that instructs the start of the release operation of the camera 1 is on or not. If the switch SW1 is on, in steps #100 and 101, judgement of whether a supply voltage is sufficient for the insurance of the operation of the entire camera or not is executed by a battery checking circuit not shown. As a result, if it is judged that the supply voltage is insufficient, the control is advanced to a step #102 where waiting is performed until the switch SW1 turns off, and when the switch SW1 turns on, the operation returns to a start position again.

On the other hand, if it is judged in the step #101 that the result of the battery check is acceptable, the control is then advanced to a step #103 where the CPU 2 communicates with the CPU 11 within the interchangeable lens 8, to thereby obtain data used for photometric operation such as a photometry, a range finding, or a release iris value, data for adjusting the focal point such as a focal point adjustment sensitivity, and data corresponding to the blur prevention sensitivity. In the present specification, the blur prevention sensitivity is directed to a ratio of the driven amount of the blur correction lens to the inclined amount of the device as described above, which changes in accordance with a state of zoom and focus. The blur prevention sensitivity is used for arithmetic operation executed in a step #151 shown in FIG. 6 which will be described later. In this embodiment, zoom information is employed as data corresponding to the blur prevention sensitivity. A manner of transmitting and receiving the information is that when a given data request signal is transmitted toward the interchangeable lens 8 from the camera 1, the zoom information is transmitted to the camera 1 side as the data corresponding to the blur prevention sensitivity in response to the given data request signal at the interchangeable lens 8 side.

Then, in a step #104, normal photometric operation is conducted, and in a subsequent step #105, an actual focus control is executed by driving the focus lens through communication with an optical sensor not shown and the CPU 11. The focus control continues until in-focus can be detected in a step #106, and if in-focus can be detected, the control is advanced to a step #107 where it is judged whether a switch ISSW for starting the blur prevention is on or not. If the switch ISSW is off, the control is advanced to a step #108 assuming that the blur prevention operation is not necessary, and the flag ISONL within the CPU 11 is set to 0 and the control is immediately advanced to a step #116.

Also, if it is judged in the above step #107 that the switch ISSW is on, the control is advanced to a step #109 assuming that the blur prevention photographing operation is selected, and the lock release command is transferred to the CPU 11 of the interchangeable lens 8 side from the CPU 2 of the camera 1 side through the serial bus line 7.

An appearance of the above command communication is shown in the timing chart of FIGS. 7A and 7B, and in FIGS. 7A and 7B, reference SCK is a synchronous clock for serial communication, SD0 is serial data that is transferred to the interchangeable lens 8 side from the camera 1, and SD1 is serial data transmitted from the camera 1 side from the interchangeable lens 8 side at the same time.

As shown in FIGS. 7A and 7B, if a command of the mechanical lock release of at least 1 byte or more is transmitted to the interchangeable lens 8 from the camera 1, a BUSY signal indicating that the data has been received is detected from the SD1, as a result of which the CPU 2 judges in the step #110 that the mechanical lock release operation is completed (in fact, the mechanical lock release operation is temporally slightly delayed, but it is assumed that the release is completed upon the completion of the command reception in a sequential manner). Then, the control is advanced to a subsequent step #111 where a timer for conducting interruption for each of the given periods T is reset to newly start the counting operation. In a subsequent step #112, a flag ISONL within the CPU 2 indicative of the blur preventing state is set to 1, and in a subsequent step #113, the timer interruption operation is permitted.

In subsequent steps #114 and #115, arithmetic operation registers UY and UP which will be described later are set to OH, respectively, and thereafter the control is advanced to a step #116 where it is judged whether the switch SW2 equipped in the camera 1 accompanied by the actual shutter release operation is on or not. If on, the control is advanced to a step #117 assuming that the operator starts the release operation, and the up operation of the mirror 6 within the camera 1 shown in FIG. 1 is conducted to execute the shutter release operation.

On the other hand, if it is detected in the above step #116 that the switch SW2 has not been turned on yet, the control is advanced to a step #118 assuming that the operator is still conducting framing operation (determining the photographing composition), and in this step, it is judged whether the switch SW1 is still on or not. If on, the control is again returned to the step #116, and the above operation is repeated. Also, if it is detected in the above step #118 that the switch SW1 turns off, the CPU 2 judges that the operator per se has completed the photographing of the camera, and the control is advanced to a step #119 where the contents of the above-described flag ISONL are judged. In this step, if the contents of the flag ISONL are 0, the control is immediately returned to the step #99 assuming that the blur preventing operation is not executed. However, if the contents of the flag ISONL are 1, the control is advanced to a step #120 assuming that the blur preventing operation has been executed, and in this step, the lock setting command is transmitted. The lock setting command is transmitted to the CPU 11 from the CPU 2 as in the above-described lock release command (it is needless to say that the data contents are different) as shown in the timing chart of FIGS. 7A and 7B.

In a subsequent step #121, it is judged whether the above lock setting has been completed or not, and if the above lock setting has been completed, the control is advanced to a step #122 where the above-mentioned timer interruption operation is inhibited to complete those sequential operation.

Subsequently, the above-mentioned interruption operation occurring for each of the given periods T will be described with reference to a flowchart shown in FIG. 5.

Figure 5:
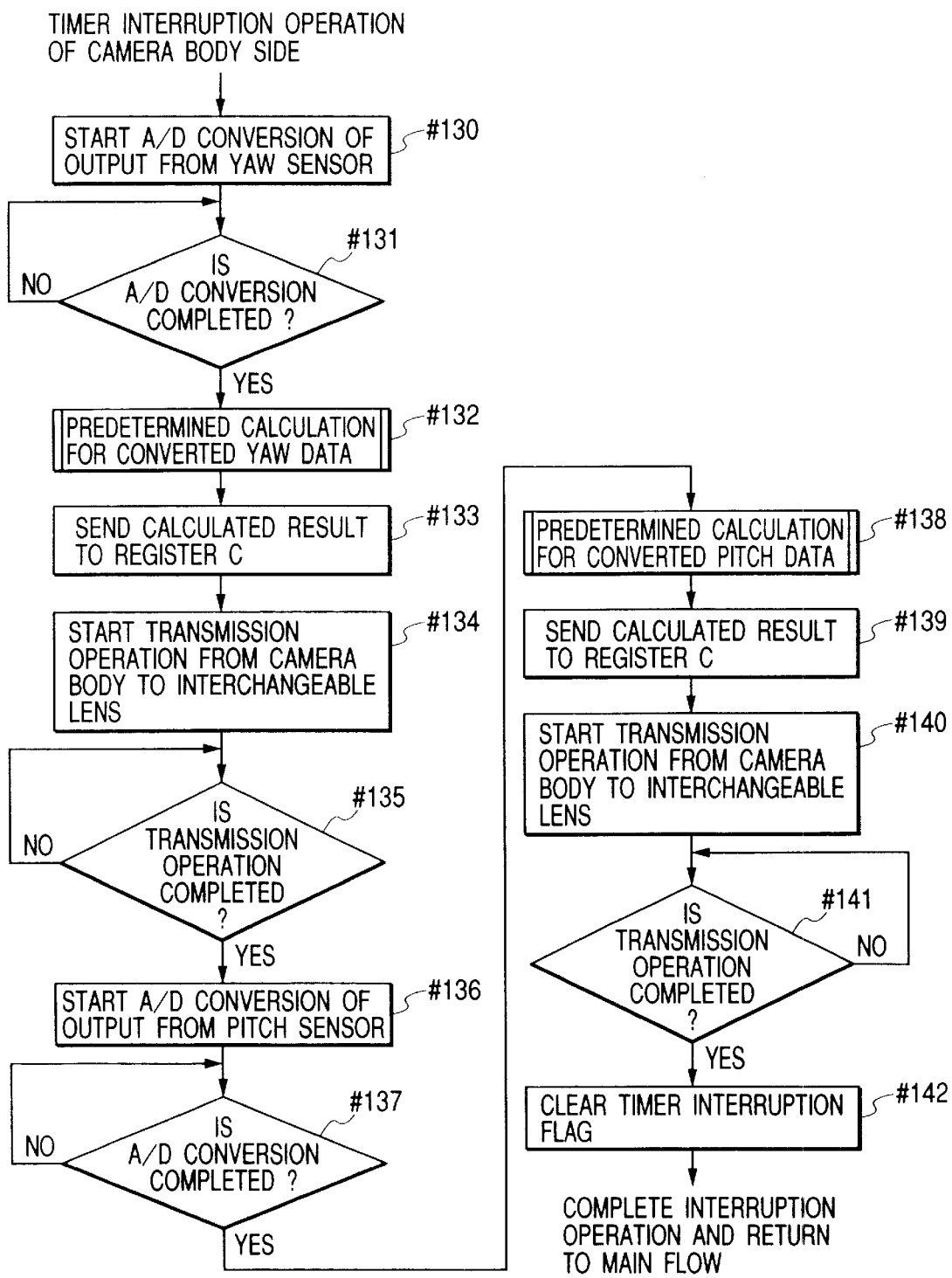
FIG. 5 is a flowchart showing a timer interruption operation of a camera side in accordance with the first embodiment of the present invention.

In FIG. 5, first in a step #130, the operation of converting an output from the blur sensor 5 in the yaw direction shown in FIG. 1 into digital data by the A/D convertor 3 starts. Then, in a subsequent step #131, if it is detected that the above conversion operation has been completed, the control is advanced to a step #132, and a given arithmetic operation is conducted on the conversion result. The data converting operation will be described with reference to the sub-routine "data conversion" shown in FIG. 6.

Figure 6:
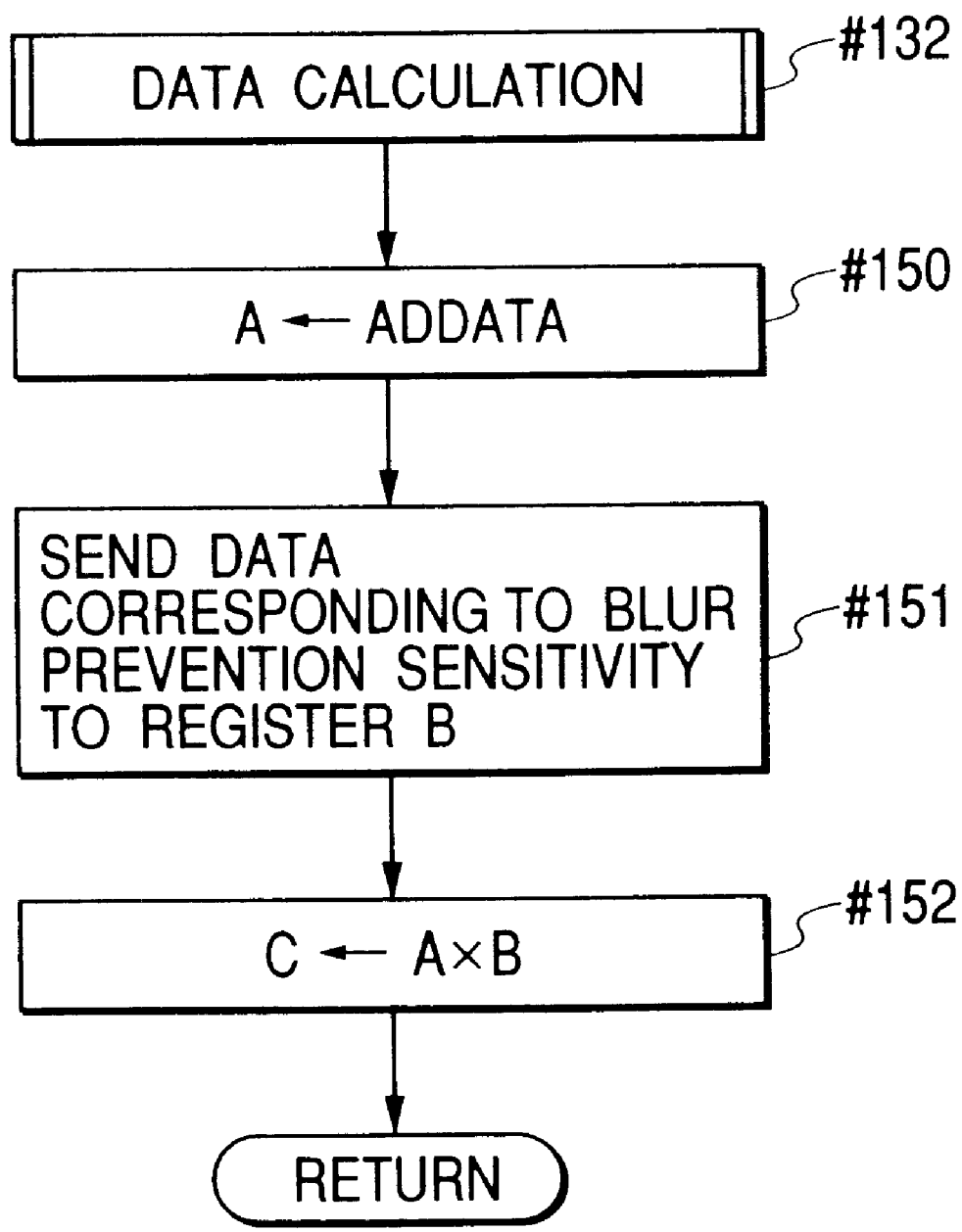
FIG. 6 is a flowchart showing the detailed operation in a step #132 shown in FIG. 5.

In the sub-routine "data conversion" shown in FIG. 6, first in a step #150, the contents of the ADDATA resistor in which the A/D conversion result is stored are transferred to the general-purpose arithmetic operation register A within the CPU 2, and in a subsequent step #151, data corresponding to the blur prevention sensitivity indicative of a relation between "blur sensor output" and "correction lens driven amount" (or data corresponding to the blur prevention sensitivity indicative of a relation between "image moving amount on an image face" and "correction lens driven amount") which is transmitted from the CPU 11 within the interchangeable lens 8, that is, in this embodiment, data corresponding to the blur prevention sensitivity which reflects the zoom state which has been already set is received, and then transferred to a general-purpose arithmetic operation register B within the CPU 2. In a subsequent step #152, the CPU 2 multiplies two general-purpose arithmetic operation registers and sets its result at a register C. The data corresponding to the blur prevention sensitivity which is transferred to the general-purpose arithmetic operation register B is obtained through the communication with the interchangeable lens 8 in the step #103 shown in FIGS. 4A and 4B. Since the data is updated at given time intervals as will be described later, the arithmetic operation using the latest blur prevention sensitivity can be conducted at the respective time points of the above arithmetic operation. Thereafter, the control is returned to the step #133 of FIG. 5.

In the step #133 of FIG. 5, the contents of the above arithmetic operation result are transferred to the transmission data register C, and in a subsequent step #134, the operation of actually transmitting the data from the camera 1 to the interchangeable lens 8 starts. In the actual data transmitting method of the blur correction lens driven amount, as shown in the timing chart of FIGS. 7A and 7B, a command indicative of the output of the blur sensor is first transmitted (of course this command includes flags for discrimination of the yaw and pitch and the like), and the contents of the register C corresponding to the output of the blur sensor are transferred as the serial data of at least 1 byte or more. Upon receiving the signal, the interchangeable lens 8 side transmits the data corresponding to the blur prevention sensitivity to the camera 1 side at that time as will be described later (a step #186 in FIGS. 9A and 9B).

If it is detected in a step #135 that the data transfer of the blur correction lens driven amount has been completed, the A/D converting operation of the sensor output in the pitch direction then starts in the step #136. Since the steps #136 to #141 which is the data transmitting process of the blur correction lens driven amount in the pitch direction are entirely identical with the process of the sensor output in the yaw direction (steps #130 to #135), their description will be omitted. Finally, in the step #142, the timer interruption flag is set to 0, the interruption operation is completed, and the control is returned to the main process shown in FIGS. 4A and 4B.

As described above, the interruption operation occurs for each of the given periods T on the process of the CPU 2, and the latest data output of the blur correction lens driven amount in the yaw and pitch directions disposed within the camera 1 is transmitted to the interchangeable lens 8 side every time the interruption is made.

Subsequently, the operation of the interchangeable lens 8 side will be described with reference to the flowcharts shown in FIGS. 8, 9A and 9B.

First, the main process of the CPU 11 at the interchangeable lens 8 side will be described with reference to the flowchart shown in FIG. 8.

In subsequent steps #160 and #161, the correction arithmetic operation internal registers CY and CP for lens control are set to OH, respectively. In a subsequent step #162, an LCK flag indicative of the lock setting control is set to 0, and similarly, in a subsequent step #163, a ULCK flag indicative of the lock release control is set to 0. In a subsequent step #164, the above-described interruption operation of the serial interface for receiving the data transmitted from the camera 1 is permitted, and in a step #165, it is judged whether a command that accelerates the lock release is received or not in the serial interface communication interruption operation which will be described later, and if the flag ULCK is 0, the control is then advanced to a step #168 as it is, assuming the lock release command is not received. On the other hand, if the flag UCLK is set to 1, the control is then advanced to a step #166 as it is, assuming the lock release command has been received, and the lock release operation is immediately conducted. In this case, a current is supplied to the plunger 58 in the mechanical lock mechanism shown in FIG. 3 in a given direction through a mechanical lock driver not shown in accordance with a control signal from the CPU 11, to thereby release the engagement of the blur correction lens 54 which is a shift lens. Then, in a subsequent step #167, the above-mentioned flag ULCK is set to 0.

In a subsequent step #168, it is judged whether the flag LCK indicative of the lock setting is 1 or not, and if the flag LCK is 0, the control is returned to the step #165 as it is assuming that the lock setting command has not been received. On the contrary, if the flag LCK is 1, the control is advanced to a step #169 assuming that the lock setting command has been received, and the lock setting operation is immediately conducted. In this case, as in the above-mentioned lock release operation, a current is supplied to the plunger 58 in the mechanical lock mechanism in a counter direction to that in case of the lock release in accordance with the control signal from the CPU 11, to thereby forcedly stop the movement of the blur correction lens 54 by a lever. Finally, the flag LCK is set to 0 in the step #170, and the control is returned to the step #165 again, to thereby repeat the above-mentioned operation.

Subsequently, the process of the serial communication at the interchangeable lens 8 side will be described with reference to a flowchart shown in FIGS. 9A and 9B.

First in a step #180, a command as the communication contents which is transmitted from the camera 1 side is decoded, and in a subsequent step #181, it is judged whether the communication contents is a lock release command or not. As a result, if the communication contents are the lock release command, the control is advanced to a step #182, where the flag ULCK 1 for accelerating the lock release operation within the CPU 11 is set to 1, and the control is immediately advanced to a step #200 where a flag for serial interruption is set to 0, and the interruption operation is completed. Therefore, in this case, the lock release operation is executed on the main process shown in FIG. 8 as described above.

On the other hand, if it is judged in the above step #181 that the communication contents are not the lock release command, the control is advanced to a step #183 where it is judged whether the communication contents are the lock setting command or not, and if the communication contents are the lock setting command, the control is advanced to a step #184 where the flag LCK for accelerating the lock setting command within the CPU 11 is set to 1, and the control is advanced to the step #200 as in the case where the lock release command is received, and the interruption operation is completed.

Also, if it is judged in the above step #183 that the communication contents are not also the lock setting command, the control is advanced to a step #185 where it is judged whether the communication contents are data of the blur correction lens driven amount in the yaw direction or not, and in this step, if the received command is identical with the command for the yaw-side correction lens driven amount reception, the control is then advanced to a step #186, where the contents of the serial data in the format shown in the timing chart of FIGS. 7A and 7B are set at the SY register within the CPU 11. At the same time, data corresponding to the blur prevention sensitivity indicative of a relation between "blur sensor output" and "correction lens driven amount" (or data corresponding to the blur prevention sensitivity indicative of a relation between "image moving amount on an image face" and "correction lens driven amount") is transmitted to the camera 1 side. The data corresponding to the blur prevention sensitivity is data that reflects both of the zoom lens setting state and the focus lens setting state during the data transmission. Then, in a subsequent step #187, the operation of converting an output from the position detecting sensor 15 (made up of an IRED, a PSD, and a processing circuit) which detects the movement of the blur correction system 9 in the yaw direction shown in FIG. 1 into digital data by the A/D convertor 18 starts, and in a subsequent step #188, it is judged whether the above A/D conversion operation has been completed or not. In this step, if it is judged whether the above A/D conversion operation has been completed, the control is advanced to a step #189, and its result is transferred to the TY register within the CPU 11. In a subsequent step #190, the feedback arithmetic operation in the yaw correction system is executed so that the contents of the SY register in which the data corresponding to the output from the position detecting sensor 15 is stored are identical with the contents of the TY register in which the data corresponding to the position output of the correction system is stored, and in a subsequent step #191, the arithmetic operation result is transferred to an OY register within the CPU 11. Upon the completion of the control operation, the control is immediately advanced to a step #200 where the interruption operation is completed.

On the other hand, if it is judged that the communication contents are not the command for the yaw-direction blur correction lens driven amount data reception, the control is advanced to a step #192 where it is judged whether the communication contents are the command for the pitch-direction blur correction lens driven amount data reception or not. If the communication contents are the command for the pitch-direction blur correction lens driven amount data reception, the steps #193 to #198 are executed, and the drive control of the blur correction system 9 in the pitch direction is conducted. Since this process is entirely identical with the above-mentioned drive control in the yaw direction (steps #186 to #191), its description will be omitted.

Also, if it is judged that the communication contents are not also the command for the pitch-direction blur correction lens driven amount data reception, the control is advanced to a step #199 where a normal lens communication (for example, focus or iris control, the operation of obtaining a photometry, a range finding, and a blur prevention sensitivity, etc.) is conducted, and after that operation has been completed, in a step #200, the serial communication interruption flag is cleared, and all the serial interruption operation is terminated.

As described above, in the first embodiment of the present invention, the camera 1 side receives the data corresponding to the blur prevention sensitivity from the interchangeable lens 8 side at any time while the blur preventing operation continues, calculates the latest blur correction lens driven amount in accordance with the data and the detection output of the blur sensor, and transmits the calculated result to the interchangeable lens 8 side alternately in the yaw and pitch directions. The interchangeable lens 8 side executes the control of the blur correction system 9 every time the latest blur correction lens driven amount is received. Therefore, the arithmetic operation load of the CPU 11 within the interchangeable lens 8 is reduced, and the interchangeable lens 8 can be made advantageous from the viewpoint of the costs. Also, as described above, the latest blur correction lens driven amount is calculated, to thereby conduct the blur preventing operation (blur correcting operation) thus being capable of always conducting the optimum blur correction.

Now, an example in which a part of FIGS. 4A and 4B is changed in the above-mentioned first embodiment will be described with reference to FIG. 10. Since differences from FIGS. 4A and 4B reside in only the parts of steps #400 and #401, only those parts will be described.

Figure 10:
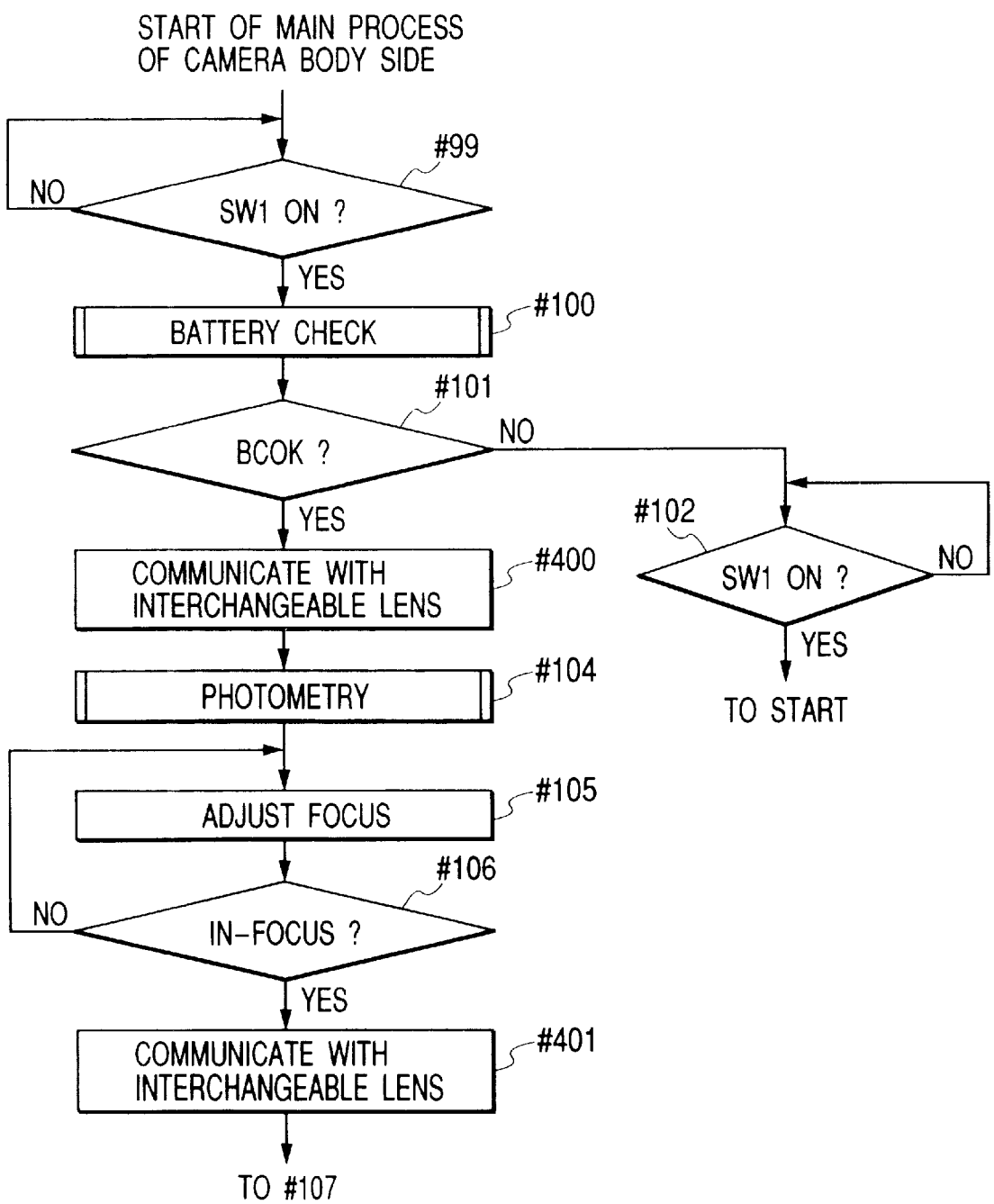
FIG. 10 is a flowchart showing an example in which the flowchart shown in FIGS. 4A and 4B is partially changed.

In the step #400 of FIG. 10, data used for calculating the photometry such as an open iris value and data for adjusting a focal point such as the focal point adjustment sensitivity are obtained. In the next step #104, photometry operation is conducted, and at steps #105 and #106, focus adjustment operations are conducted, respectively. Then, in a subsequent step #401, the blur prevention sensitivity that reflects both of the zoom lens setting state and the focus lens setting state in a state where in-focus is obtained, is obtained. As the transmitting and receiving manner, when a given data request signal is transmitted toward the interchangeable lens 8 from the camera 1, the interchangeable lens 8 side transmits the blur prevention sensitivity that reflects both of the zoom lens setting state and the focus lens setting lens in a state where in-focus is obtained as the data corresponding to the blur prevention sensitivity toward the camera 1 side in accordance with the given data request signal.

As described above, the data corresponding to the blur prevention sensitivity after in-focus has been made is used as the calculation of the blur correction lens driven amount, thereby being capable of conducting the blur correcting operation higher in precision.

The data corresponding to the zoom lens setting state and data corresponding to the focus lens setting state may be transmitted to the camera 1 side from the interchangeable lens 8 as different data, respectively, and those data are integrated together at the camera 1 side to form the blur prevention sensitivity. Alternatively, the data corresponding to the blur prevention sensitivity obtained by integrating both of the data corresponding to the zoom lens setting state and data corresponding to the focus lens setting state together may be formed at the interchangeable lens 8 side and then transmitted to the camera 1 in that format.

Subsequently, a second embodiment of the present invention will be described with reference to the flowcharts shown in FIGS. 11 to 14. The mechanical and circuitry structure of the entire camera system are as shown in FIGS. 1 and 2. Also, since the main process of the CPU 2 at the camera 1 side is entirely identical with that shown in FIGS. 4A and 4B, its description will be omitted.

Figure 11:
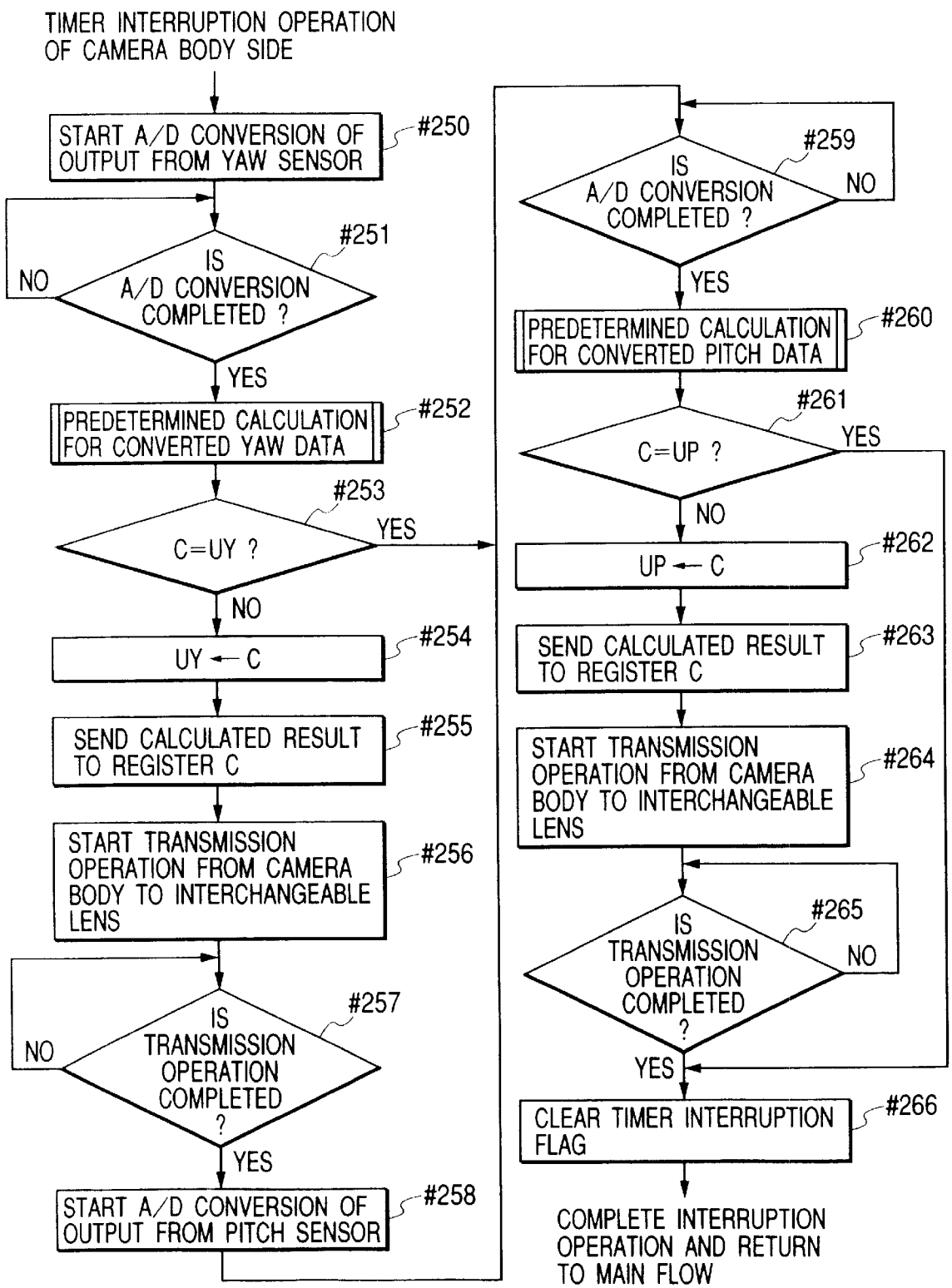
FIG. 11 is a flowchart showing a timer interruption operation of a camera side in accordance with a second embodiment of the present invention.

FIG. 11 shows the timer interruption operation in which the interruption occurs for each of the given periods T at the camera side. First in a step #250, the operation of converting an output from the yaw-direction blur sensor 5 shown in FIG. 1 into digital data by the A/D convertor 3 starts. Then, in a subsequent step #251, it is judged whether the above A/D conversion operation has been completed or not. If it is judged that the above A/D conversion operation has been completed, the control is advanced to a step #252, and its result is subjected to a given arithmetic operation. Since the data conversion arithmetic operation is entirely identical with that shown in FIG. 6 which was described in the above first embodiment, its description will be omitted.

In a subsequent step #253, a value of the register C within the CPU 2 in which the above arithmetic operation result is stored and a value of the internal register UY (the register UY is reset to OH during an initial operation and stores the contents of the register C which is determined during a previous sampling operation) are compared with each other, and if both values are identical with each other, the control is advanced to a step #258, and the control is immediately shifted to the control of the pitch-direction sensor output detection.

On the other hand, if both values are not identical with each other in step #253, the control is advanced to a step #254, where the contents of the register C are set at the UY register for a succeeding interruption operation. Then, in a subsequent step #255, the contents of the register C are transferred to the transmission data register, and in a subsequent step #256, the contents are transmitted to the interchangeable lens 8 side in accordance with the timing chart shown in FIGS. 7A and 7B. In a subsequent step #257, it is judged whether the transmission of the given number of bytes has been entirely completed or not, and if it is detected that the transmission has been completed, the control is advanced to a step #258, where the converting and transfer operation of the data of the pitch-direction blur correction lens driven amount starts. Since the operation of the steps #258 to #264 is entirely identical with the operation of the steps #250 to #257, its description will be omitted. Finally, in a step #265, the timer interruption flag is cleared, and the interruption operation is completed.

Subsequently, the operation of the interchangeable lens 8 side will be described with reference to the flowchart shown in FIG. 12.

Figure 12:
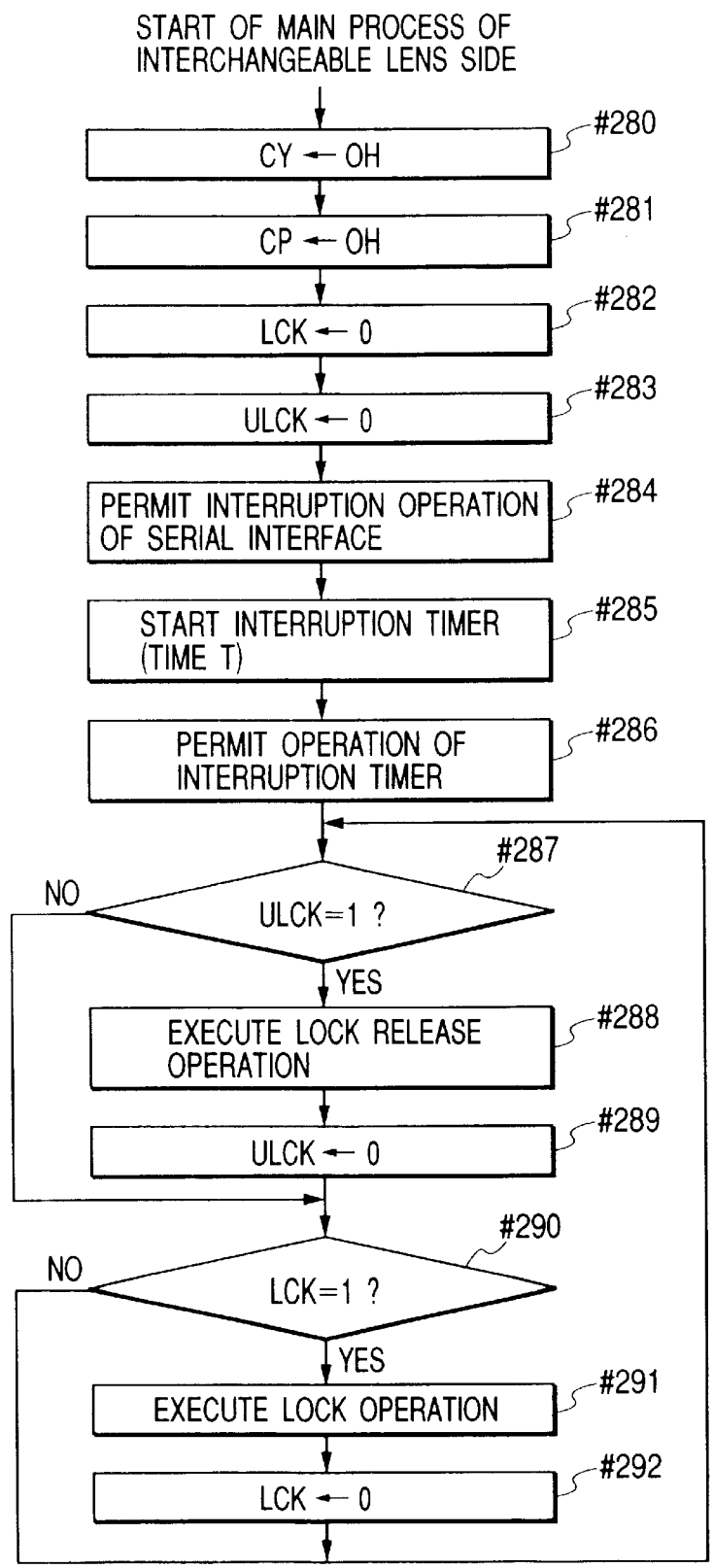
FIG. 12 is a flowchart showing the operation of the camera side in accordance with the second embodiment of the present invention.

FIG. 12 is a flowchart showing the main process of the CPU 11 at the interchangeable lens 8 side. This operation is basically entirely identical with that of FIG. 8 which is described in the above first embodiment except for a part thereof, and differences from FIG. 8 reside only in that steps #285 and #286 are newly added.

Similarly, a timer that generates the interruption for each of the given periods T is disposed at the interchangeable lens 8 side. In a step #285, the timer starts, and in a subsequent step #286, the interruption is permitted. Therefore, the main process of the CPU 11 at the interchangeable lens 8 side waits for the timer interruption where the data of the blur correction lens driven amount transmitted from the camera 1 side is received, and the blur correction system 9 is controlled for each of the given periods.

Figure 13:
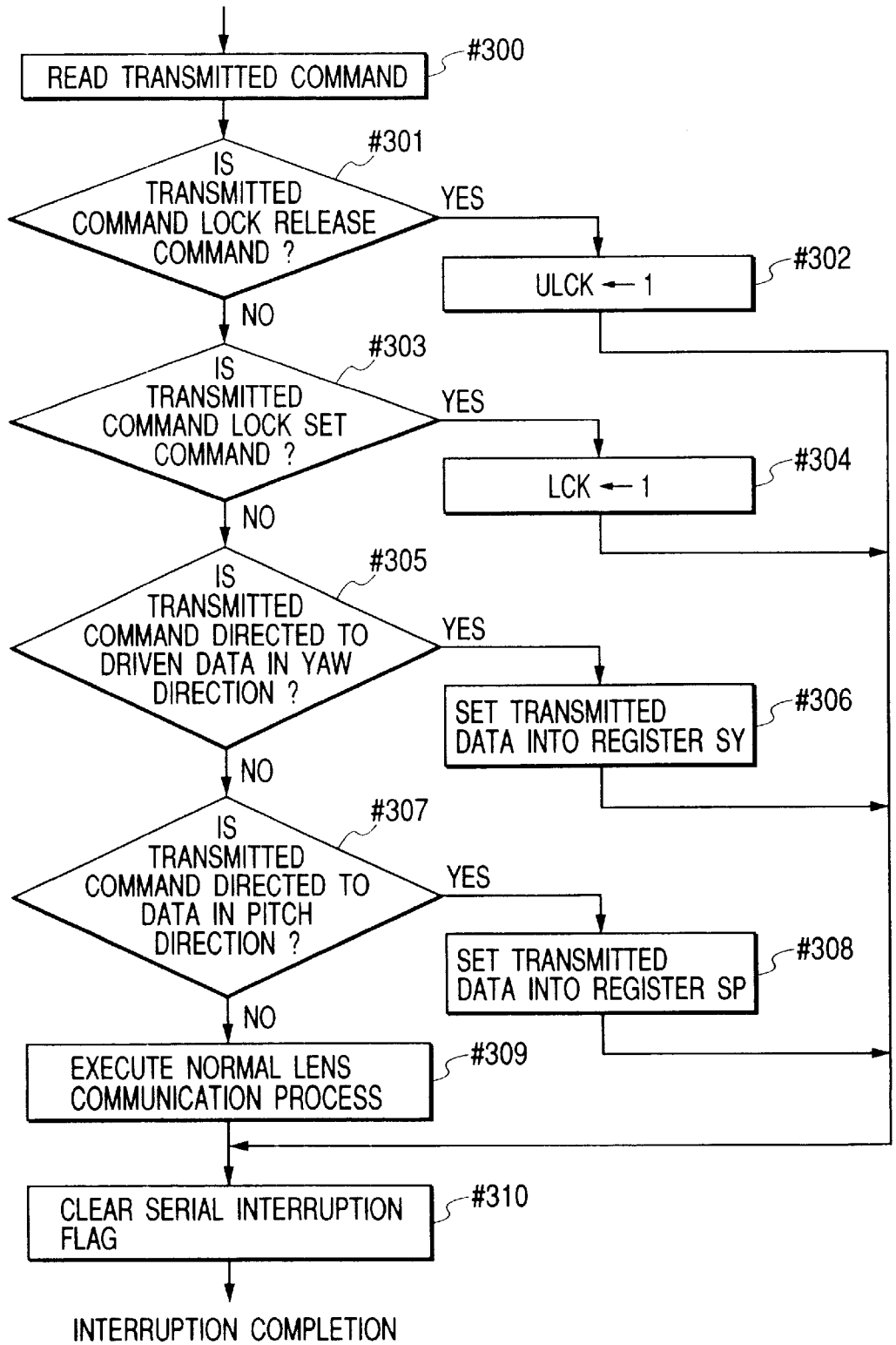
FIG. 13 is a flowchart showing the operation of an interchangeable lens in accordance with the second embodiment of the present invention.

Subsequently, the interruption operation of the serial interface at the interchangeable lens 8 side will be described with reference to the flowchart shown in FIG. 13.

First in a step #300, the communication contents of a command transmitted from the camera 1 side is decoded, and if it is judged in a subsequent step #301 that the communication contents are the lock release command, the control is advanced to a step #302, where the flag ULCK for accelerating the lock release operation in the main process within the CPU 11 is set to 1, and the control is thereafter advanced to a step #310 where a flag for serial interruption is set to 0, and the interruption operation is completed.

On the other hand, if it is judged in the above step #301 that the communication contents are not the lock release command, the control is advanced to a step #303 where it is judged whether the communication contents are the lock setting command or not, and if the communication contents are the lock setting command, in a subsequent step #304, the flag LCK for accelerating the lock setting command in the main process within the CPU 11 is set to 1, and in a step #310, the interruption flag of the serial communication is cleared, and the interruption operation is completed.

Also, if it is judged in the above step #303 that the communication contents are not also the lock setting command, the control is advanced to a step #305 where it is judged whether the communication contents are the received data of the yaw-direction sensor or not, and if the communication contents are the data of the blur correction lens driven amount in the yaw direction, the control is then advanced to a step #306, where the contents of the yaw-direction received data is set at the SY register within the CPU 11, and the interruption flag of the serial communication is cleared, and the interruption operation is completed.

Also, if it is judged in the above step #305 that the communication contents are not the received data of the yaw direction, the control is then advanced to a step #307, where it is judged whether the communication contents are the pitch received data or not. If it is judged that the communication contents are the received data of the pitch side sensor, the control is advanced to a step #308, and the contents of the pitch sensor received data is set at the SP register, and the interruption operation is completed through the step #310.

Also, in the above step 307, if the communication contents are not also the pitch received data, it is judged that the communication contents are a normal lens communication, the control is advanced to a step #309 where the normal lens communication process is executed, and in a step #310, the interruption flag of the serial communication is cleared, and the interruption operation is completed.

Figure 14:
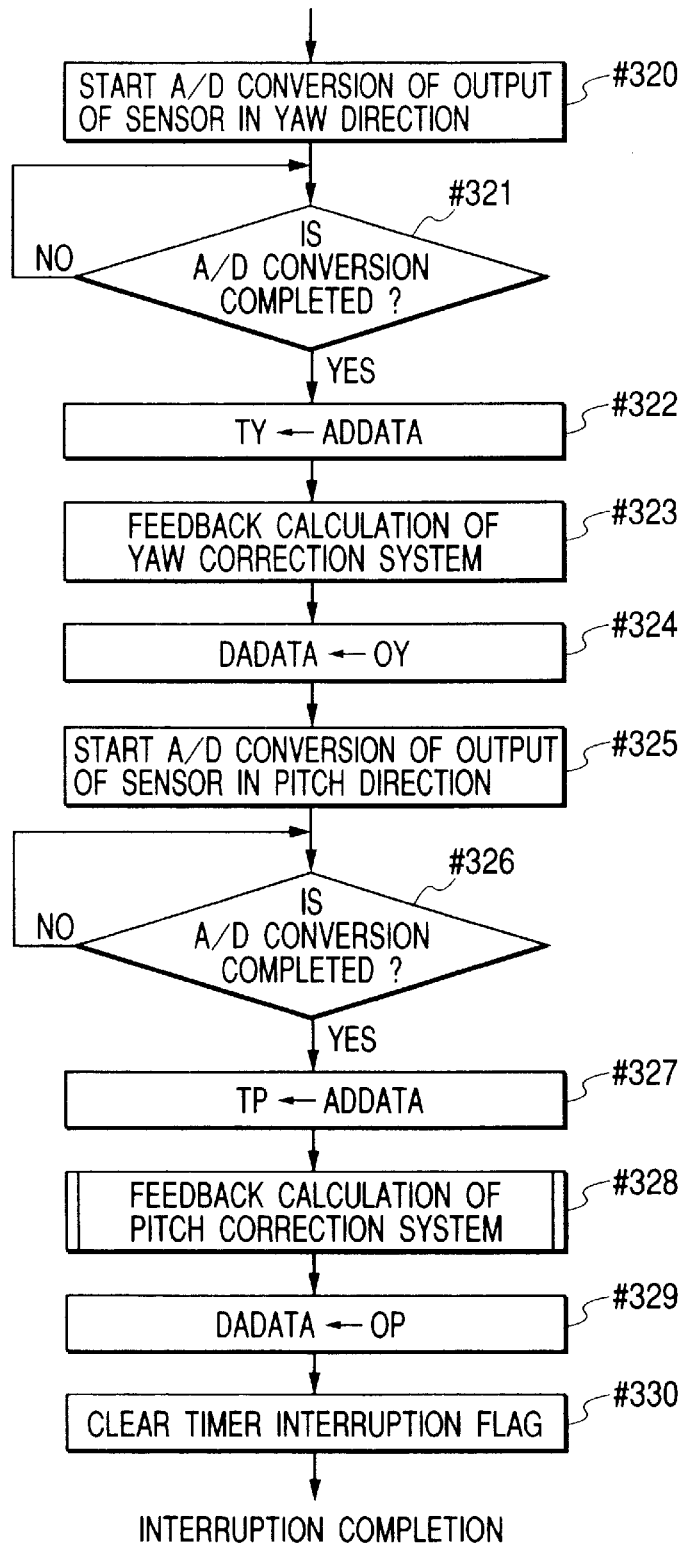
FIG. 14 is a flowchart showing a timer interruption operation of the interchangeable lens in accordance with the second embodiment of the present invention.

Subsequently, the process of the timer interruption operation in which the interruption occurs for each of the given periods T at the interchangeable lens 8 side will be described with reference to the flowchart shown in FIG. 14.

First in a step #320, the operation of converting an output from the position detecting sensor that detects the movement of the blur correction system 9 in the yaw direction as shown in FIG. 1 into digital data by the A/D convertor 18 starts. Then, in a subsequent step #321, it is judged whether the above A/D conversion operation has been completed or not. If it is judged that the above A/D conversion operation has been completed, the control is advanced to a step #322, and its conversion result is set at the TY register within the CPU 11. In a subsequent step #323, the feedback arithmetic operation for following the blur correction system 9 to the output of the position detecting sensor in the yaw-direction is executed by using the SY register in which a value corresponding to the data of the yaw-direction blur correction lens driven amount is stored by using the above-mentioned TY register. Then, the contents of the OY register corresponding to the arithmetic operation result are transferred to the D/A convertor 12 as DADATA in a subsequent step #324, and the blur correction system 9 is driven through the driving circuit 13 on the basis of the above result. The same is applied to the pitch direction (steps #327 to #330).

As described above, according to the present invention, there can be provided the image blur correcting system formed of the photographing device and the optical device which is capable of reducing the arithmetic operation load related to the image blur correction at the optical device side.

Also, according to the present invention, there can be provided the camera system formed of a camera and an interchangeable lens which are capable of reducing the arithmetic operation load related to the image blur correction at the interchangeable lens side.

Further, according to the present invention, there can be provided the camera that can exhibit the image blur correction function in combination with the interchangeable lens, which are capable of reducing the arithmetic operation load related to the image blur correction on the interchangeable lens side.

Further, according to the present invention, there can be provided the interchangeable lens that can exhibit the image blur correcting function in combination with the camera which are capable of exhibiting the image blur correcting function without receiving the arithmetic operation load related to the image blur correction.

Subsequently, the operation of the main portion in accordance with a third embodiment of the present invention will be described with reference to the flowcharts shown in FIGS. 15A, 15B, 16, 17, 18, 19, 20, 21A and 21B, a timing chart shown in FIGS. 7A and 7B and so on.

Figures 15, 15A:
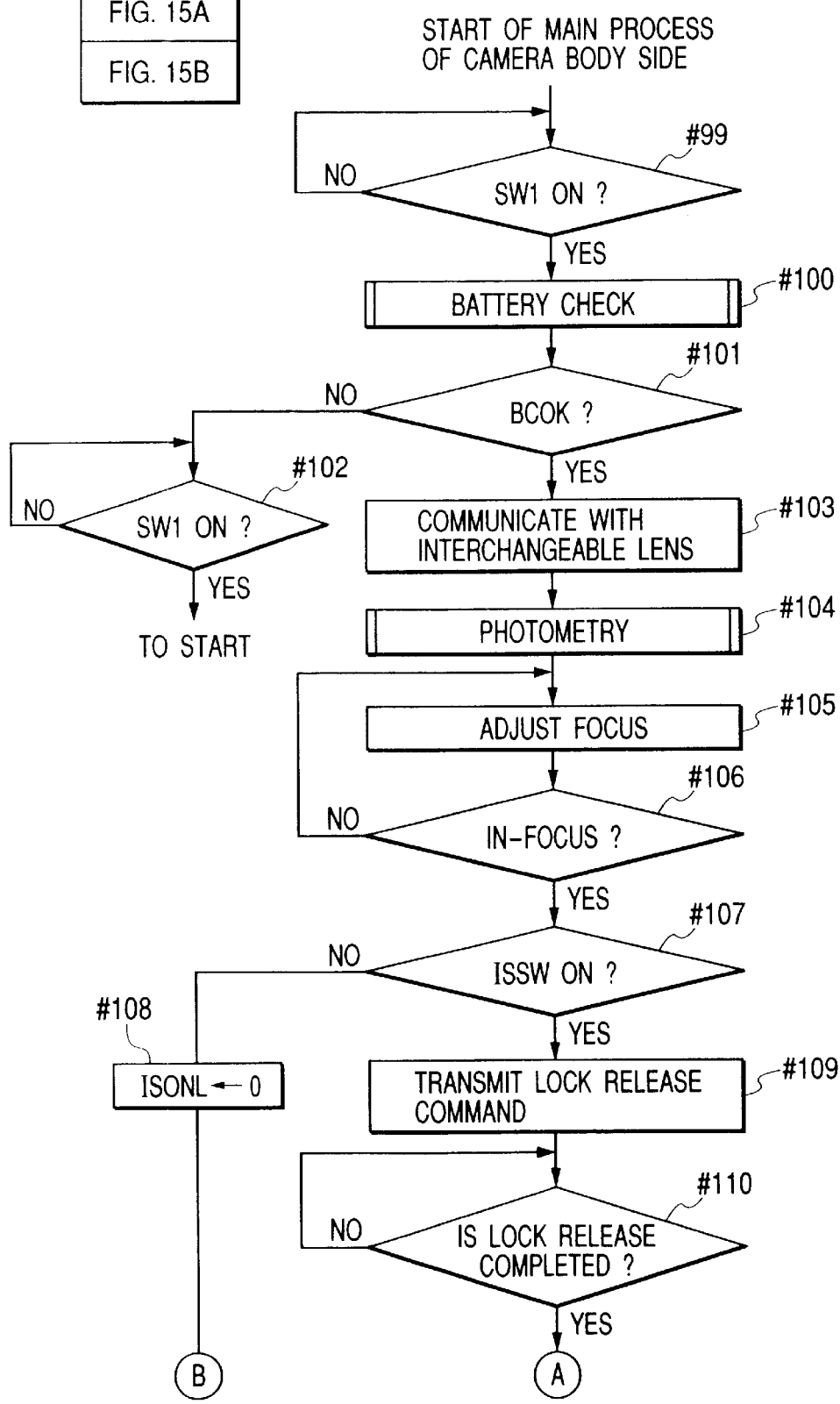
FIG. 15 is comprised of FIGS. 15A and 15B are flowcharts showing a main process of a camera side in accordance with a third embodiment of the present invention.
Figure 15B:
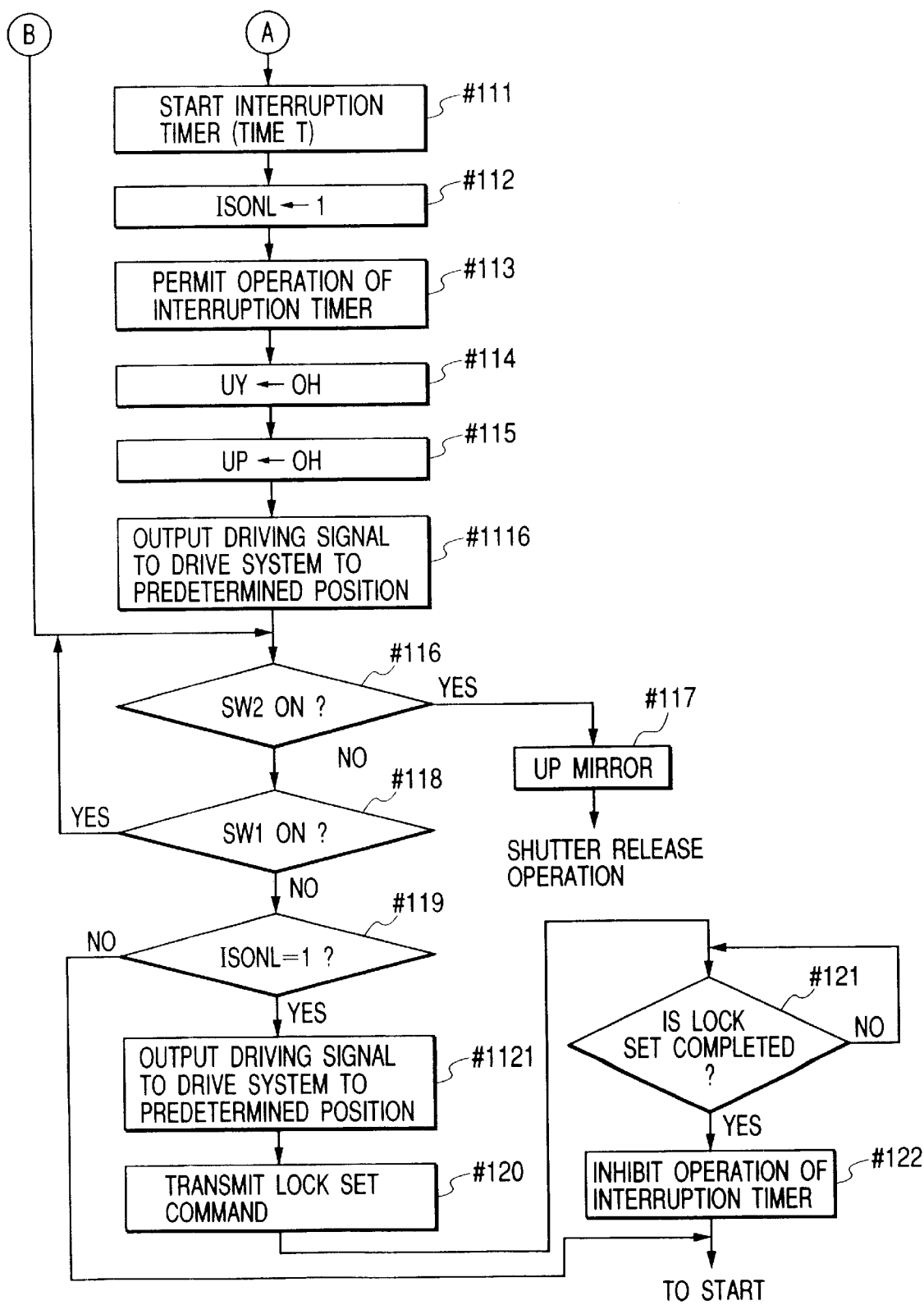

FIGS. 15A and 15B show the main process of the CPU 2 within the camera body 1 related to the blur prevention (image blur correction) operation, and since steps #99 to #115 are identical with that in FIGS. 4A and 4B, their description will be omitted.

In a step #1116, a given-position drive signal that drives the image blur correcting means to a given position (in this example, the given position means an initial position or a center position related to both of the pitch and yaw directions is transmitted to the lens. For example, assuming that the image blur correcting means drive command in the yaw direction is 40H, and the image blur correcting means drive command in the pitch direction is 41H, in order to drive the image blur correcting means to a certain coordinate position, 40H, H, H (**H is a drive signal of 8 bits)

41H, H, H (**H is a drive signal of 8 bits)

and data of 6 bytes (6×8 bits) (coordinate position drive signal) need to be transmitted.

Also, in order to drive the image blur correcting means to the center position, 40H, 00H, 00H 41H, 00H, 00H are required. If the above data is set to 42H (a command for driving the image blur correcting means to the center position), only data of 1 byte (a given-position drive signal) may be transmitted.

Similarly, in order to drive the image blur correcting means to the initial position, the data may be set to 43H. There is a case where those positions take different values depending on the lens individual or the lens state, that is, the optical characteristic of the interchangeable lens 8, in accordance with the position setting information of the image blur correcting means which is received in the step #103 of FIGS. 4A and 4B.

Thereafter, as in FIGS. 4A and 4B, the control is advanced to a step #116 where it is judged whether the switch SW2 equipped in the camera body 1 accompanied by the actual shutter release operation is on or not, and if on, the control is advanced to a step #117 assuming that the operator starts the actual release operation, and the up-operation of the mirror 6 within the camera body 1 shown in FIG. 1 is conducted, and the shutter release operation is executed.

On the other hand, if it is judged in the above step #116 that the switch SW2 is not yet on, the control is advanced to a step #118 assuming that the operator is still conducting framing operation (determining the photographing composition), and in the step, it is judged whether the switch SW1 is still on or not, if the switch SW1 is on, the control is again returned to the step #117, and the above operation is repeated. Also, if it is detected in the above step #118 that the switch SW1 becomes off, the CPU 2 judges that the operator per se has completed the photographing of the camera, and the control is advanced to the step #119, and the contents of the above-mentioned flag ISONL are judged. If the contents of the flag ISONL are 0, the control is immediately returned to the step #99 assuming that the blur preventing operation is not executed. On the other hand, if the contents of the flag ISONL are 1, the control is advanced to the step #121 assuming that the blur preventing operation has been executed. In the step #121, a given-position drive signal of 1 byte which drives the image blur correcting means to the initial position or the center position is transmitted to the lens.

Then, the control is advanced to a step #120 where a lock setting command is transmitted. The lock setting command is transmitted from the CPU 2 to the CPU 11 as shown in the timing chart of FIGS. 7A and 7B as in the above-described lock release command (it is needless to say that the data contents are different). In a subsequent step #121, it is judged whether the above lock setting has been completed or not, and if it is judged that the lock setting has been completed, the control is advanced to a step #124 where the above-mentioned timer interruption operation is inhibited, and then the sequential operation is completed.

Subsequently, the interruption operation occurring for each of the above-mentioned given periods T will be described with reference to a flowchart shown in FIGS. 16 and 17.

Figure 16:
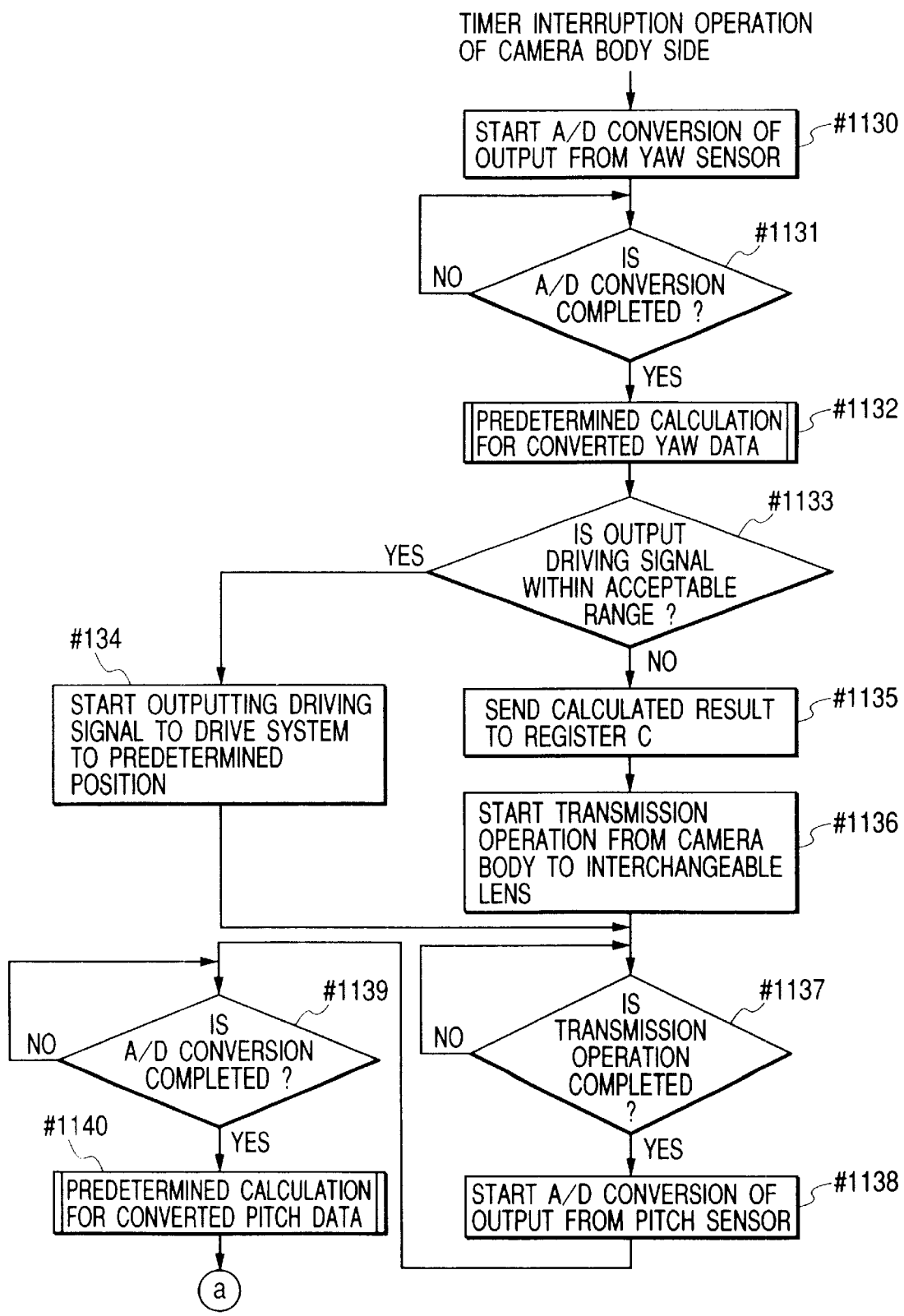
FIG. 16 is a flowchart showing a partial timer interruption operation of the camera side in accordance with the third embodiment of the present invention.

In FIG. 16, first in the step #1130, the operation of converting the output from the blur sensor 5 in the yaw direction as shown in FIG. 1 into the digital data by the A/D convertor 3 is started. Then, if it is judged in a subsequent step #1131 that a fact that the above converting operation has been completed, the control is advanced to a step #1132, and a given arithmetic operation is conducted on the converting result. The data converting operation will be described with reference to the sub-routine "data conversion" shown in FIG. 18.

Figure 18:
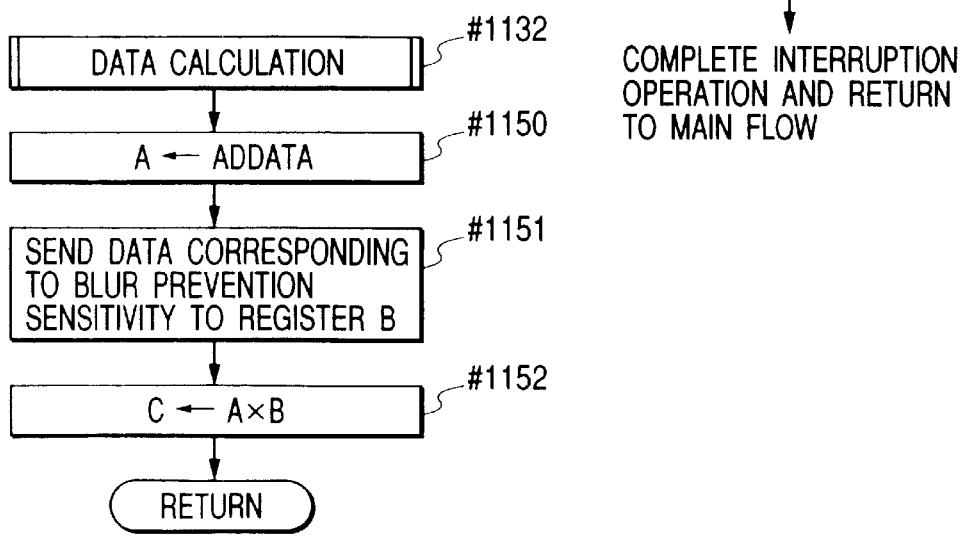
FIG. 18 is a flowchart showing the detailed operation in a step #132 shown in FIG. 17.

In the sub-routine "data conversion" shown in FIG. 18, first in a step #1150, the contents of an ADDATA register in which the A/D conversion result is stored is transferred to a general-purpose arithmetic operation register A in the interior of the CPU 2, and in a subsequent step #1151, data corresponding to the blur prevention sensitivity indicative of a relation between "blur sensor output" and "correction lens driven amount" which is transmitted from the CPU 11 within the interchangeable lens 8 (or data corresponding to the blur prevention sensitivity indicative of a relation between "image moving amount on an image face" and "correction lens driven amount"), that is, in this embodiment, data corresponding to the blur prevention sensitivity which reflects the zoom state which has been already set is received and then transferred to a general-purpose arithmetic operation register B within the CPU 2. In a subsequent step #1152, the CPU 2 multiplies those two general-purpose arithmetic operation registers by each other, and its result is set to the register C (corresponding to a coordinate position drive signal of 3 bytes). Data corresponding to the blur prevention sensitivity which is transferred to the general-purpose arithmetic operation register B is obtained through communication with the interchangeable lens 8 in the step #1103 shown in FIGS. 15A and 15B, and since the data is updated at given time intervals as will be described later, arithmetic operation using the latest blur prevention sensitivity can be executed at the respective time points of the above arithmetic operation. Thereafter, the control is returned to the step #1133 shown in FIG. 16.

In the step #1133 shown in FIG. 16, as compared with the data of the above step #1152 (the coordinate position drive signal of 3 bytes), it is judged whether a given-position drive signal of 1 byte is outputted or not. For example, the given-position drive command of the image blur correcting means in the yaw direction is set as follows:

44H=40H, 00H, 00H (0)

45H=40H, 01H, 00H (+256)

46H=40H, 2FH, FFH (+12287)

47H=40H, FFH, 00H (−256)

48H=40H, D0H, 00H (−12288)

where it is assumed that the center position is 0, and a direction of moving the image in the right direction of the photographed image is a positive direction. Although 45H is +256 and 46H is +12287 (the end portion on the optical performance, the end portion on the blur prevention control, or the like) in this example, it may be set to a position high in the application frequency.

There is a case in which those positions take different values depending on the lens individual or the lens state in accordance with the position setting information received in the step #103 of FIGS. 15A and 15B.

If it is judged that the data of the above step #1152 is equal to or close to those values, in more detail, if it is judged that the coordinate position drive signal of 3 bytes which becomes the drive target position to which the image blur correcting means is situated is identical with a predetermined given-position drive signal of 1 byte (in this example, any one of 44H to 48H) or they are substantially the same within a permissible range (within a range where the blur correction is not adversely affected), the control is advanced from the step #1133 to the step #1134 where the output of the given-position drive signal of 1 byte starts instead of the above-described coordinate position drive signal, and the control is then advanced to a step #1137. The conditions where it is judged that those signals are close to each other are changed in accordance with the observing time, the photographing time, the zoom position, the focus position, the camera mode setting, other traffic and so on. Therefore, although the data transmission of 3 bytes (3×8 bits) is conventionally required, only the data transmission of 1 byte can be permitted, thereby being capable of reducing the communication load.

Also, if it is judged that the coordinate position drive signal of 3 bytes and the predetermined given-position drive signal of 1 byte are not equal to each other (not substantially equal to each other), the control is advanced to a step #1135 from the step #1133 where the contents of the above-mentioned arithmetic operation result (the coordinate position drive signal of 3 bytes) are transferred to the transmission data register C, and in a subsequent step #1136, the actual transmitting operation of the data from the camera body 1 to the interchangeable lens 8 starts. In an actual data transmitting method of the blur correction lens drive amount, as shown in the timing chart of FIGS. 7A and 7B, a command indicative of output of the blur sensor is first transmitted (it is needless to say that the command includes a flag for discrimination of the yaw, the pitch and so on), and the contents of the above register C which correspond to the next output of the blur sensor is then transferred as the serial data of at least 1 byte or more. Upon receiving the signal at the interchangeable lens 8 side, the data corresponding to the blur prevention sensitivity at that time is transmitted to the camera body 1 side as will be described later (the step #1186 in FIG. 20).

If it is detected in a step #1137 that the transfer of the given-position drive signal or the coordinate position drive signal has been completed, the A/D converting operation with respect to the sensor output in the pitch direction starts. Since the steps #1138 to #1145 shown in FIGS. 16 and 17 which are the data transmitting process with respect to the driving of the blur correction lens in the pitch direction are completely identical with the process with respect to the sensor output in the yaw direction (the steps #1130 to #1137 in FIG. 16), their description will be omitted. Finally, in a step #1146, a timer interruption flag is set to 0, the interruption operation is completed and the control is returned to the main process shown in FIGS. 15A and 15B.

As described above, the interruption occurs for each of the given periods T on the process of the CPU 2, the latest data output related to the driving of the blur correction lens in the yaw and pitch directions disposed within the camera body 1 is transmitted to the interchangeable lens 8 side every time the interruption occurs.

Subsequently, the operation of the interchangeable lens 8 side will be described with reference to the flowcharts shown in FIGS. 19, 20, 21A and 21B.

Figure 8:
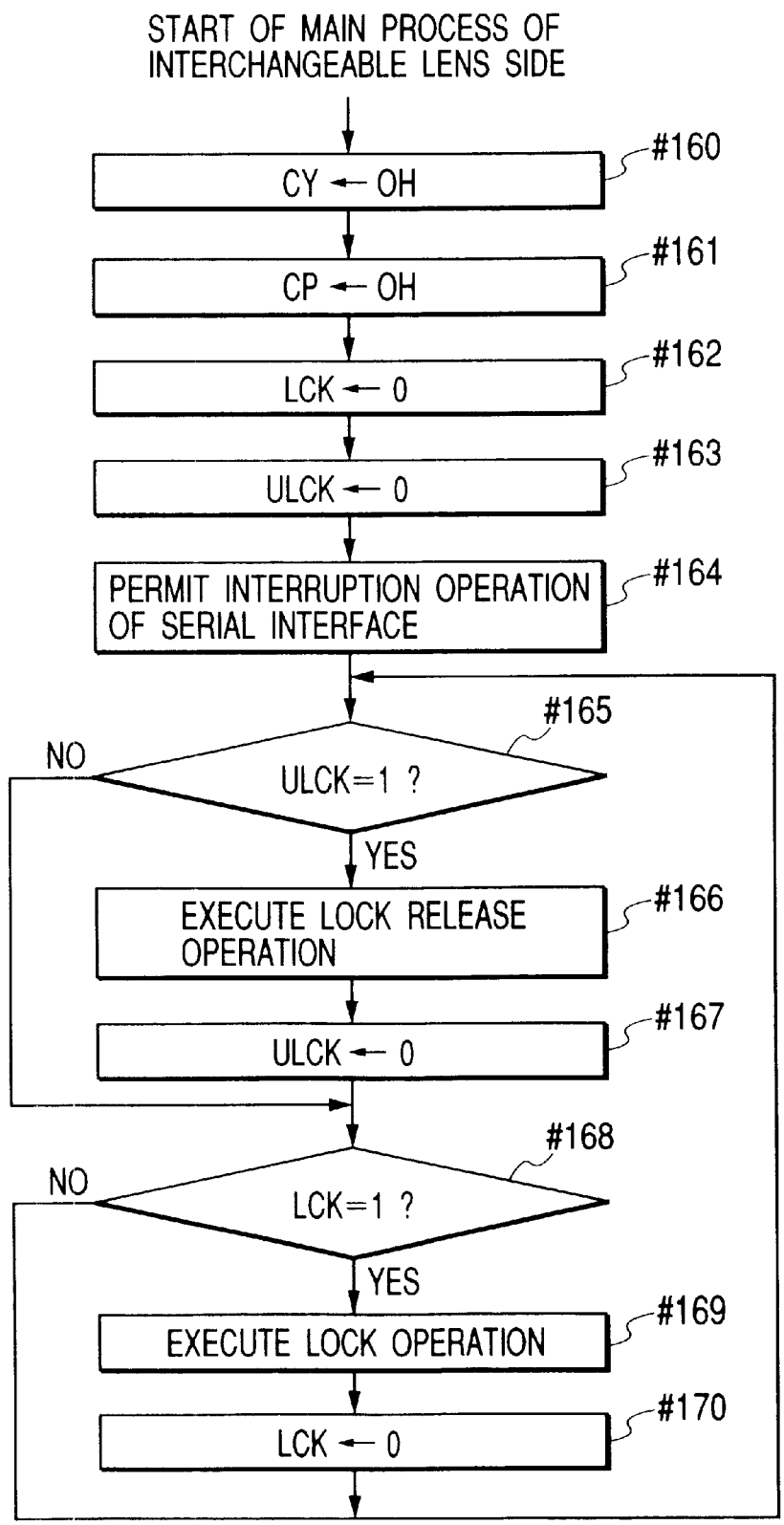
FIG. 8 is a flowchart showing a main process of an interchangeable lens in accordance with the first embodiment of the present invention.
Figure 19:
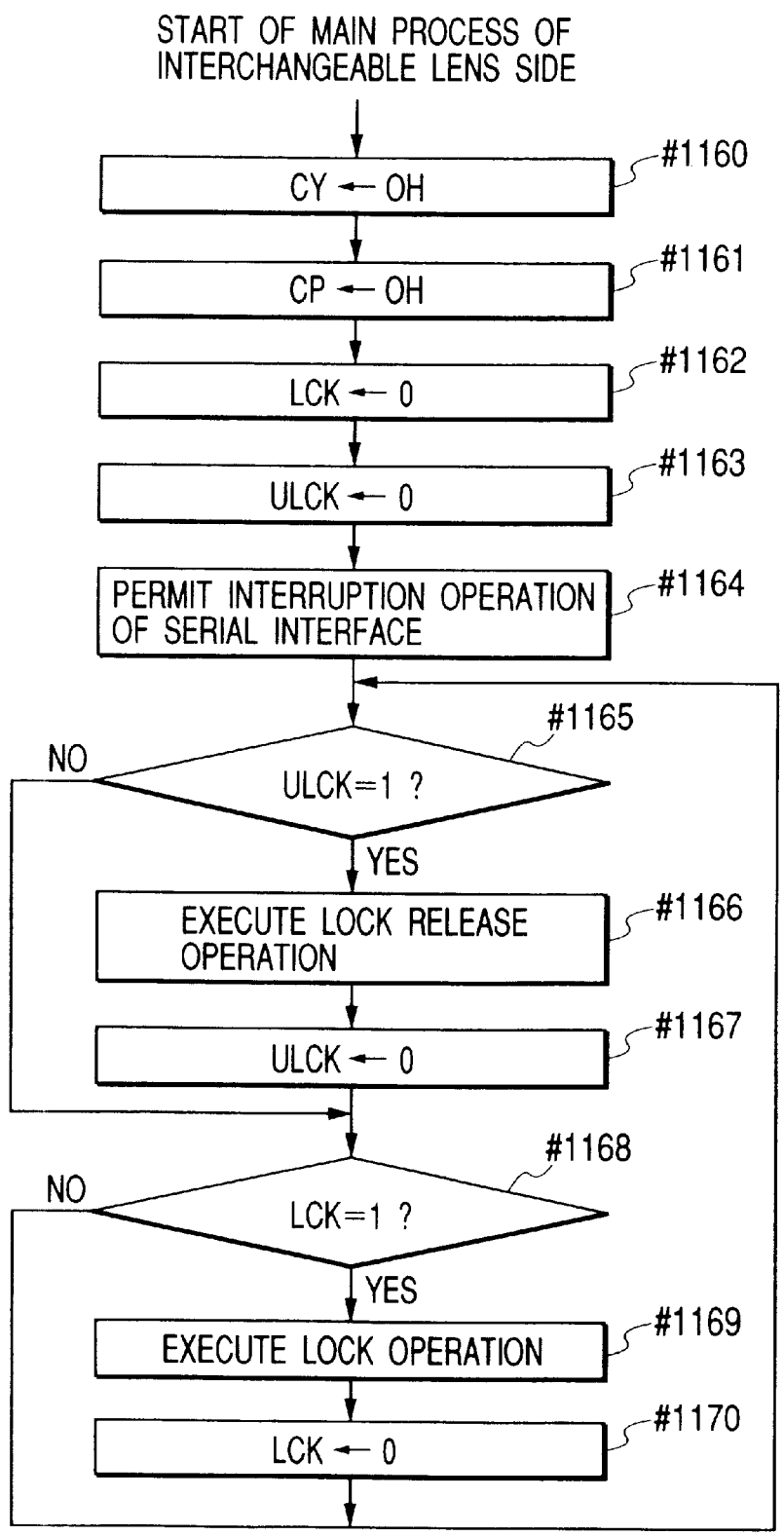
FIG. 19 is a flowchart showing a main process of an interchangeable lens in accordance with the third embodiment of the present invention.

Since the flowchart shown in FIG. 19 is identical with the steps #160 to #170 in FIG. 8, the description will be omitted.

Then, the process of the serial communication at the interchangeable lens 8 side will be described with reference to the flowcharts shown in FIGS. 20, 21A and 21B.

First in a step #1180, a command as the communication contents transmitted from the camera body 1 side is decoded, and it is judged in a subsequent step #1181 whether the communication contents are the lock release command or not. As a result, if it is judged that the communication contents are lock release command, the control is then advanced to the step #1182 where the flag ULCK for accelerating the lock release operation within the CPU 11 is set to 1, and the control is immediately advanced to a step #1206 of FIGS. 21A and 21B where a flag for serial interruption is set to 0, to thereby complete the interruption operation. Therefore, in this case, the lock release operation is executed on the main process of FIG. 19 as described above.

On the other hand, if it is judged in the step #1181 that the communication contents are not the lock release command, the control is advanced to a step #1183 where it is judged whether the communication contents are a lock setting command or not. If the communication contents are the lock setting command, the control is advanced to a step #1184 where the flag LCK for accelerating the lock setting command within the CPU 11 is set to 1, and the control is advanced to a step #1206 of FIGS. 21A and 21B as in the case where the lock release command is received, to thereby complete the interruption operation.

Also, if it is judged in the step #1183 that the communication contents are not the lock setting command, the control is advanced to a step #1185 where it is judged whether the communication contents are the coordinate position drive signal of the blur correction lens in the yaw direction or not. If the received command is identical with the command for the coordinate position drive signal reception on the yaw direction side, the control is advanced to a step #1186. In the step #1186, the contents of the serial data in the format shown in the flowchart of FIGS. 7A and 7B is set at the SY register within the CPU 11. At the same time, data corresponding to the blur prevention sensitivity indicative of a relation between "blur sensor output" and "correction lens driven amount" (or data corresponding to the blur prevention sensitivity indicative of a relation between "image moving amount on an image face" and "coordinate position drive signal") is transmitted to the camera body 1 side. The data corresponding to the blur prevention sensitivity is directed to data that reflects both of the setting state of the zoom lens and the setting state of the focus lens during the data transmission. Then, the operation of converting the output of the position detecting sensor 15 (essentially consisting of an IRED, a PSD, and a processing circuit) which detects the movement of the blur correction system 9 shown in FIG. 1 in the yaw direction into the digital data by the A/D convertor 18 is started. Then, it is judged in a subsequent step #1188 whether the operation of the A/D converting operation has been completed or not. If it is judged that the A/D converting operation has been completed, the control is advanced to a step #1189, and its result is transferred to the TY register within the CPU 11. The feedback calculation of the yaw correction system is executed in a subsequent step #1190 so that the contents of the SY register in which the data corresponding to the output from the position detecting sensor 15 is stored are identical with the contents of the TY register in which the data corresponding to the position output of the correction system is stored, and in a subsequent step #1191, the arithmetic operation result is transferred to the OY register within the CPU 11. The control is advanced to a step #1206 of FIGS. 21A and 21B immediately after the control operation has been completed, to thereby complete the interruption operation.

On the other hand, if it is judged in the step #1185 that the data is not the command of the coordinate position drive signal reception of the blur correction lens in the yaw direction, the control is advanced to a step #1192 where it is judged whether the data is not the command of the coordinate position drive signal reception of the blur correction lens in the pitch direction. If so, the steps #1193 to #1198 are executed to conduct the drive control of the blur correction system 9 in the pitch direction. Since this process is completely identical with the drive control in the yaw direction (the steps #1186 to #1191), its description will be omitted.

Also, if it is judged that the data is not also the coordinate position drive signal reception command in the pitch direction, the control is advanced to a step #1199. Then, in the step #1199, it is judged whether the data is the given-position drive signal in the yaw direction or not, and if so, the control is advanced to a step #1200 where the data corresponding to the given-position drive signal in the yaw direction is set at the SY register within the CPU 11, and the control is advanced to a step #1187 of FIG. 20.

For example, the given-position drive command in the yaw direction is set as follows:

44H=40H, 00H, 00H (0)
45H=40H, 01H, 00H (+256)
46H=40H, 2FH, FFH (+12287)

47H=40H, FFH, 00H (−256)
48H=40H, D0H, 00H (−12288)

Also, if the data is not the given-position drive signal in the yaw direction, the control is advanced to a step #1201 from the step #1199 where it is judged whether the data is the given-position drive signal in the pitch direction or not, and if so, the control is advanced to a step #1202 where the data corresponding to the given-position drive signal in the pitch direction is set at the SP register within the CPU 11, and the control is advanced to a step #1194.

Further, if the data is not the given-position drive signal in the pitch direction, the control is advanced to a step #1203 from the step #1201 where it is judged whether or not the data is the given-position drive signal in both of the pitch and yaw directions (for example, 42H that drives the image blur correcting means at the center position). As a result, if the data is the given-position drive signal in both of the pitch and yaw directions, the control is advanced to a step #1204 where the data corresponding to the given-position drive signal is set at the SY register within the CPU 11, and the same operation as that of the above steps #1187 to #1191 is executed, and the data corresponding to the given-position drive signal is set at the SP register within the CPU 11, and the same operation as that of the above steps #1194 to #1198 is executed.

If the operation of the above step #1204 is completed or it is judged in the above step #1203 that the data is not the given-position drive signal, the control is advanced to a step #1205 where the communication of the normal lens communication (for example, a focus or iris control, a photometry, a range finding, the operation of obtaining the blur prevention sensitivity, etc.) is conducted, and after the operation has been completed, a serial communication interruption flag is cleared in a step #1206, to thereby complete all the serial interruption operation.

As described above, in the third embodiment of the present invention, if the coordinate position drive signal of 3 bytes which is obtained as the target position of the image blur correcting means on the basis of the output of the blur sensor is equal to or substantially equal to the predetermined given-position drive signal of 1 byte, the image blur correcting means is driven by using the latter signal instead of the former signal. Therefore, the communication load can be reduced to 1/3 of the normal load during the communication under the above circumstances.

Subsequently, a fourth embodiment of the present invention will be described with reference to flowcharts shown in FIGS. 22A, 22B, 23, 24, 25, 26A and 26B. The mechanical and circuitry structure of the entire camera system is identical with that shown in FIGS. 1 and 2. Also, since the sub-routine "data conversion" of the CPU 2 at the camera body 1 side is entirely identical with that shown in FIG. 18, its description will be omitted.

Figure 22B:
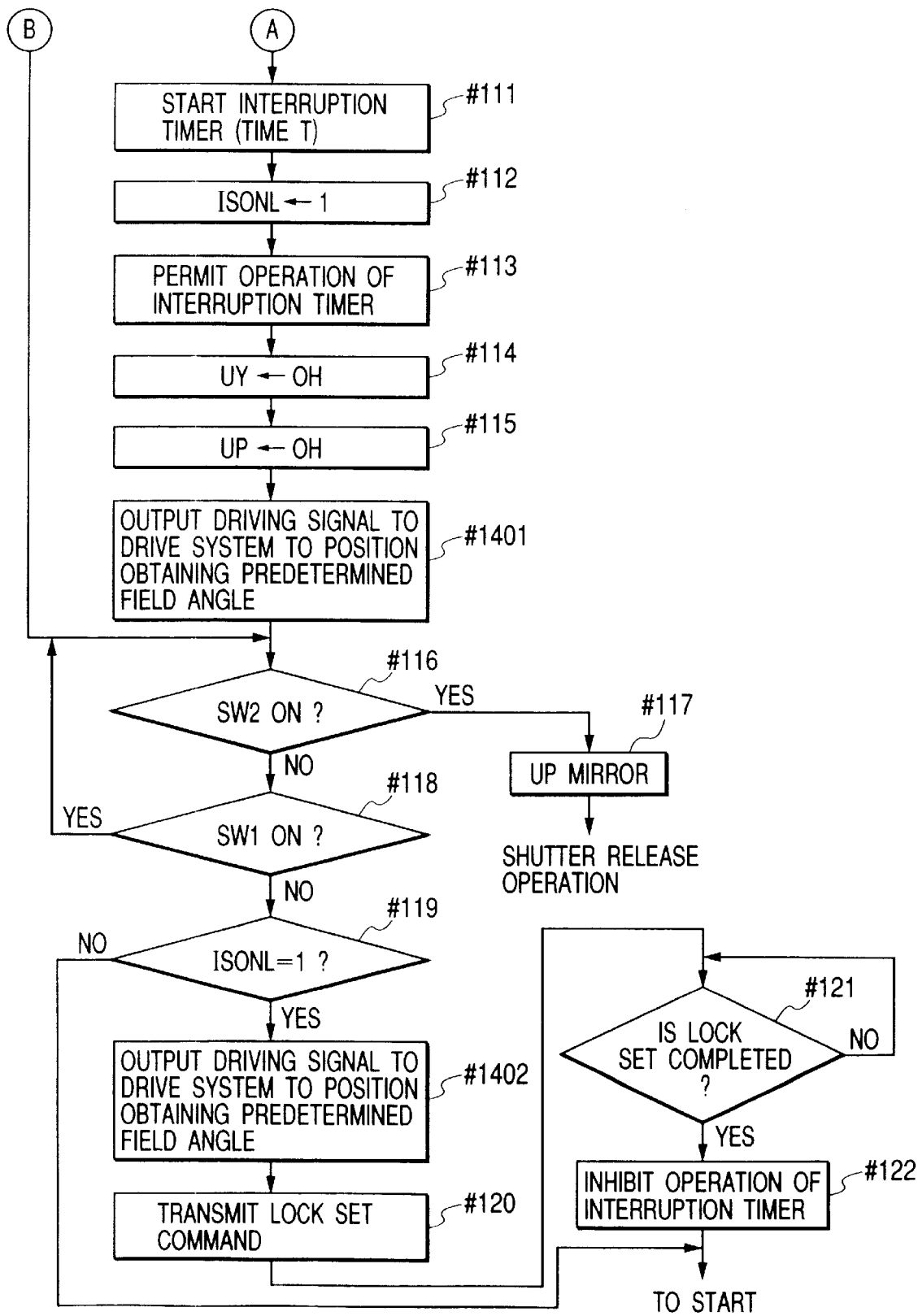
FIG. 22 is comprised of FIGS. 22A and 22B are flowcharts showing a main process of a camera side in accordance with a fourth embodiment of the present invention.

FIGS. 22A and 22B correspond to FIGS. 15A and 15B in the above third embodiment in which the step #103 is changed to a step #1400, the step #1116 is changed to a step #1401, and the step #1121 is changed to a step #1402, respectively. Hereinafter, only those changed steps will be described.

In the step #1400 of FIGS. 22A and 22B, communication with the CPU 11 within the interchangeable lens 8 is conducted to obtain data used for photometric operation such as photometry or release iris value, data for focal point adjustment such as the focal point adjustment sensitivity, and data corresponding to the blur prevention sensitivity. In the present specification, the blur prevention sensitivity is directed to a ratio of the coordinate position drive signal of the blur correction lens with respect to the inclined amount of the device as described above, which changes in accordance with a state of zoom and focus. The blur prevention sensitivity is used for arithmetic operation executed in the step #1151 shown in FIG. 18 which is described in the above. In this embodiment, zoom information is employed as data corresponding to the blur prevention sensitivity. A manner of transmitting and receiving the information is that when a given data request signal is transmitted toward the interchangeable lens 8 from the camera body 1, the zoom information is transmitted to the camera body 1 side as the data corresponding to the blur prevention sensitivity in response to the given data request signal at the interchangeable lens 8 side.

Also, there is a case in which the data includes information related to a given-angle-of-view drive signal that drives to a given angle of view (which means an angle of an object to be photographed from the camera) which includes the angle-of-view setting information of the image blur correcting means that sets the position of the image blur correcting means in accordance with the received given-angle-of-view drive signal.

The angle-of-view drive information can be employed with high efficiency by changing the drive angle of view of the image blur correcting means due to a difference in the focal distance of the lens, a difference in the blur prevention sensitivity and a difference in the drive range of the image blur correcting means, for example, even if the same given-angle-of-view drive signal is transmitted to the lens.

In the steps #1401 and #1402, the given-angle-of-view drive signal that drives the image blur correcting means to the initial angle of view or the center angle of view is transmitted to the lens.

For example, assuming that the image blur correcting means drive command in the yaw direction is 40 H and the image blur correcting means drive command in the pitch direction is 41 H, in order to drive the image blur correcting means to a certain coordinate position, it is necessary to transmit 40H, H, H (**H is an 8-bit drive signal)
41H, H, H (**H is an 8-bit drive signal)

and data of 6 bytes (6×8 bits) (a coordinate position drive signal).

Also, in order to drive the image blur correcting means at a center angle of view, the following is satisfied.

40H, 00H, 00H (0) 0 degree (angle of view)
41H, 00H, 00H (0) 0 degree (angle of view)

Assuming that the above is changed to 42H, only data of 1 byte (given-angle-of-view drive signal) is transmitted.

Similarly, in order to drive the image blur correcting means to the initial angle of view, the angle of view can be set to 43H.

There is a case in which those positions take different values in accordance with the lens individual or the lens state depending on the image blur correcting means angle-of-view setting information which is received in the step #1400 of FIGS. 22A and 22B.

Figure 17:
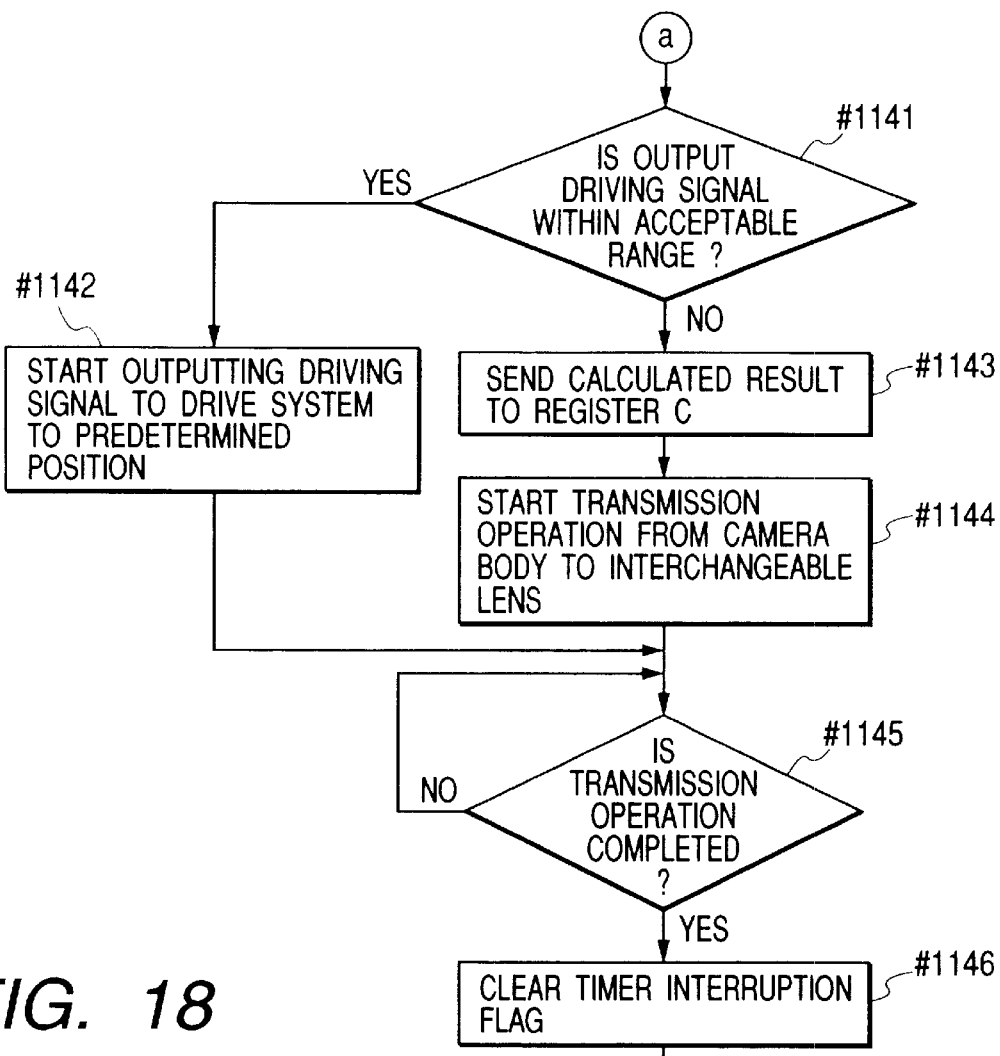
FIG. 17 is a flowchart showing the continuation of the operation shown in FIG. 16.
Figure 23:
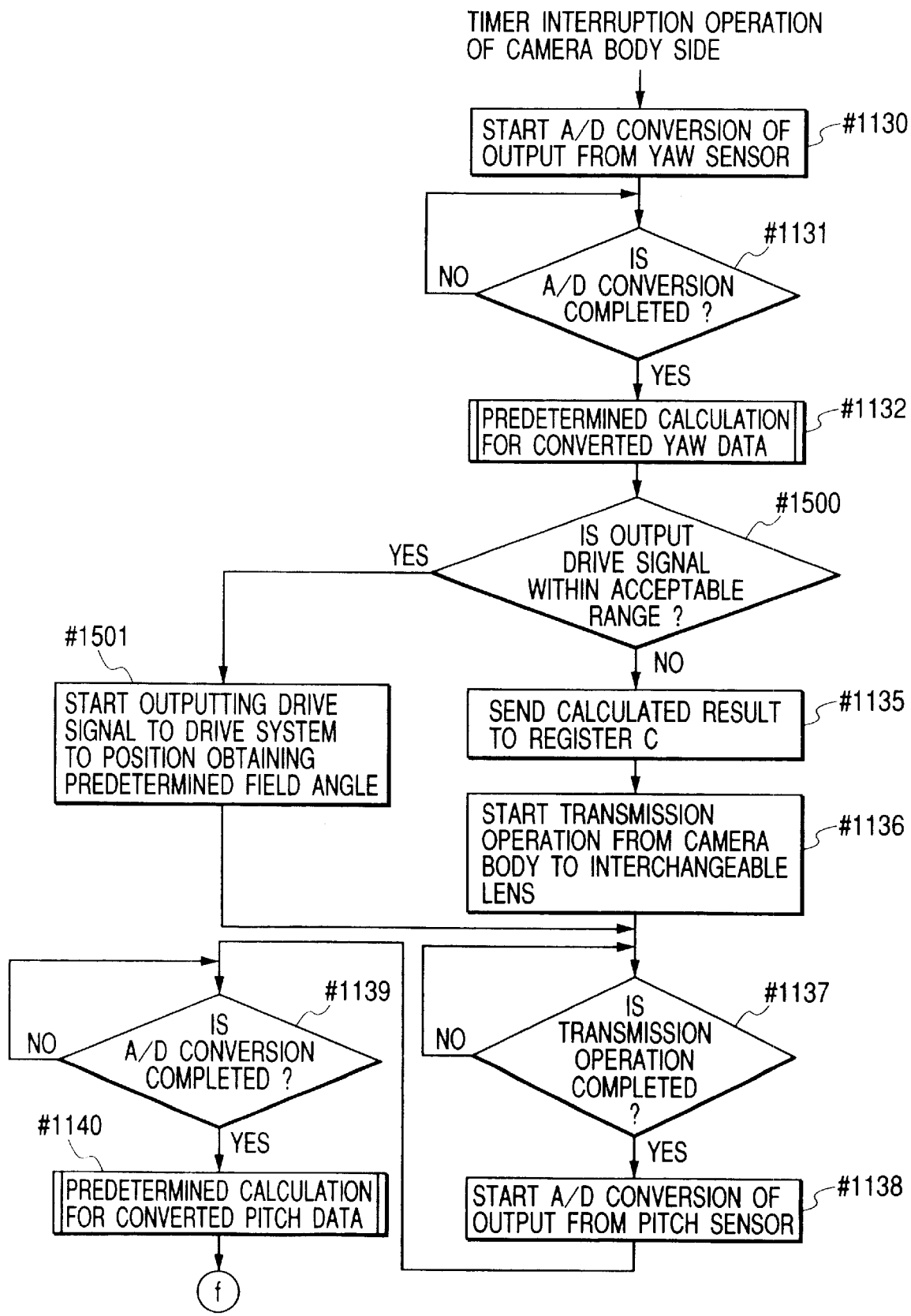
FIG. 23 is a flowchart showing a partial timer interruption operation of the camera side in accordance with the fourth embodiment of the present invention.
Figure 24:
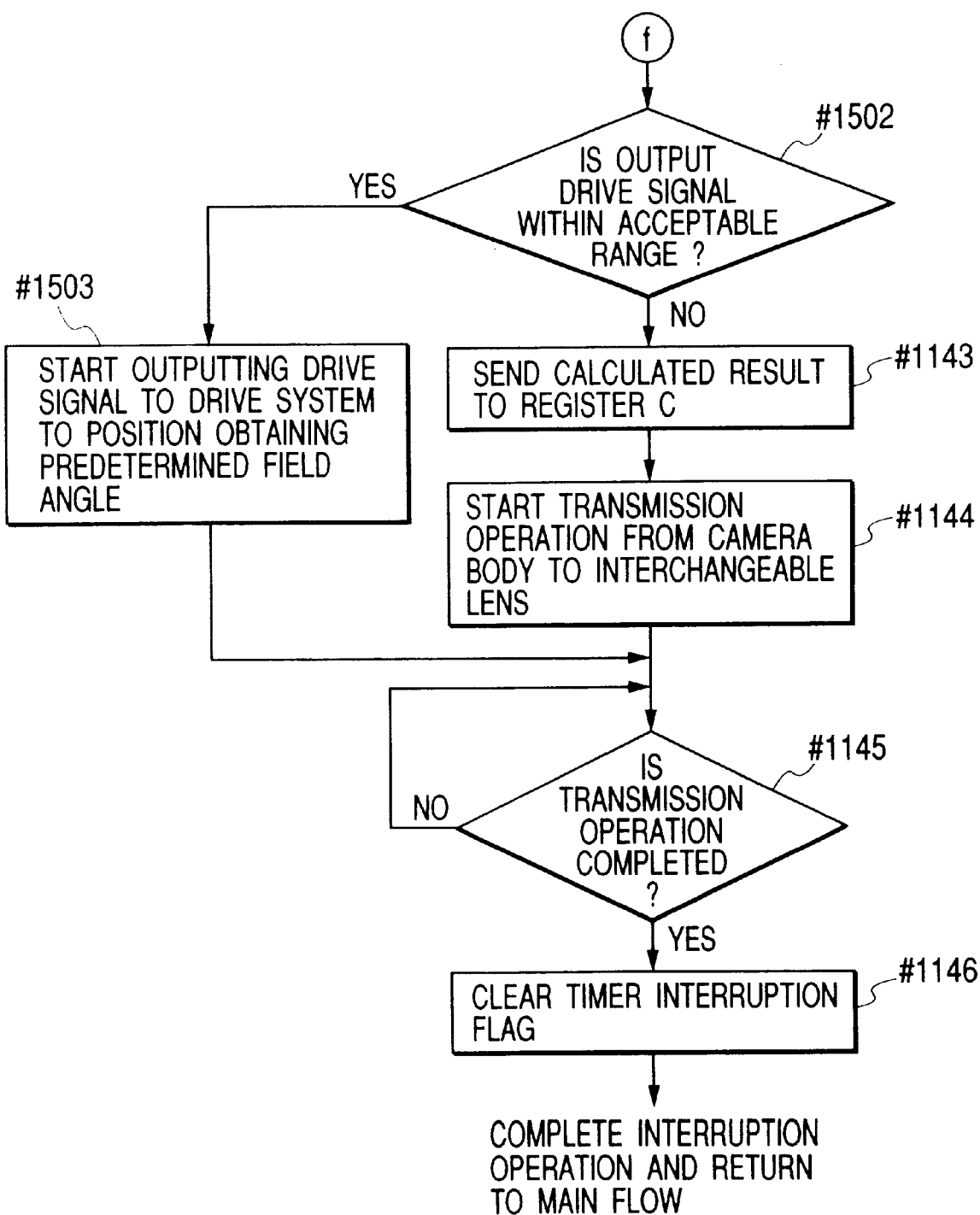
FIG. 24 is a flowchart showing the continuation of the operation shown in FIG. 23.

FIGS. 23 and 24 correspond to FIGS. 16 and 17 in the above third embodiment in which the step #1133 is changed to a step #1500, the step #1134 is changed to a step #1501, the step #1141 is changed to a step #1502, and the step #1142 is changed to a step #1503, respectively. Hereinafter, only those changed steps will be described.

In the step #1500 of FIG. 23, as compared with the data in a step #1152, it is judged whether or not the given angle-of-view drive signal of 1 byte is outputted. For example, the given angle-of-view drive command in the yaw direction is set as follows:

| | |
|---|---|
| 44H = 40H, 00H, 00H (0) | 0 degree |
| 45H = 40H, 01H, 00H (+256) | 0.0256 degrees |
| 46H = 40H, 2FH, FFH (+12287) | 1.2287 degrees |
| 47H = 40H, FFH, 00H (−256) | −0.0256 degrees |
| 48H = 40H, D0H, 00H (−12288) | −1.2288 degrees | where it is assumed that the center position is 0, and a direction of moving the image in the right direction of the photographed image is a positive direction. Although 45H is +0.0256 degrees and 46H is +1.2287 degrees (the end portion on the optical performance, the end portion on the blur prevention control, or the like) in this example, it may be set to an angle of view high in the application frequency.

There is a case in which those angle of views take different values depending on the lens individual or the lens state in accordance with the angle-of-view setting information received in the step #1400 of FIGS. 22A and 22B.

If it is judged that the data of the above step #1152 is equal to or close to those values, the control is advanced from the step #1500 to a step #1501 where the output of the given-angle-of-view drive signal of 1 byte starts, and the control is then advanced to a step #1137. The conditions where it is judged that those signals are close to each other are changed in accordance with the observing time, the photographing time, the zoom position, the focus position, the camera mode setting, other traffic and so on. Therefore, only the data transmission of 1 byte can be permitted as compared with the data transmission of 3 bytes (3×8 bits) conventionally required, thereby being capable of reducing the communication load.

Since the steps #1502 and #1503 of FIG. 24 are substantially the same operation as that of the step #1500 and #1501 of the above FIG. 23, although there are differences in the yaw and the pitch, their description will be omitted.

Figure 20:
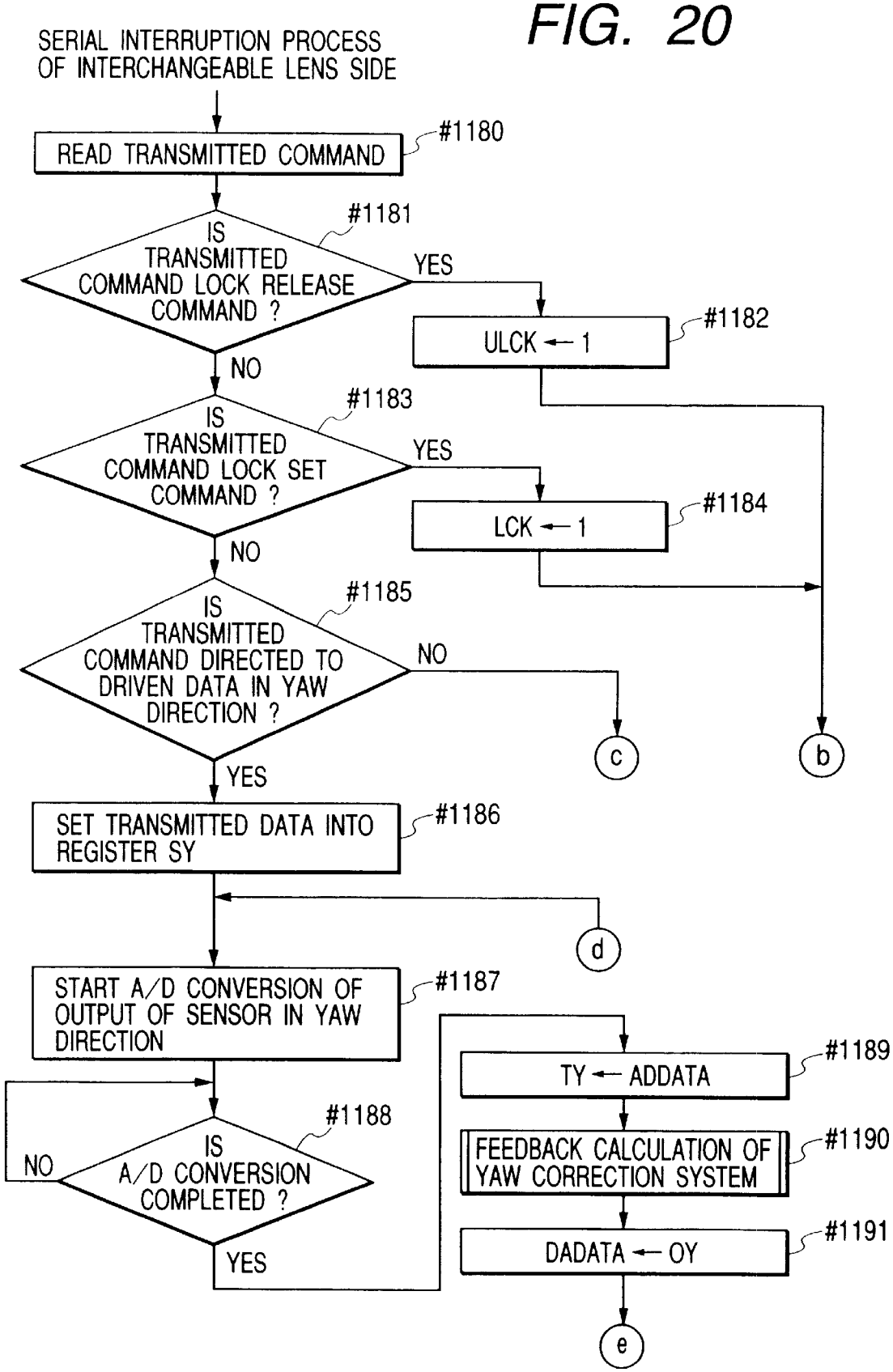
FIG. 20 is a flowchart showing a partial serial interruption operation of the interchangeable lens in accordance with the third embodiment of the present invention.
Figure 21B:
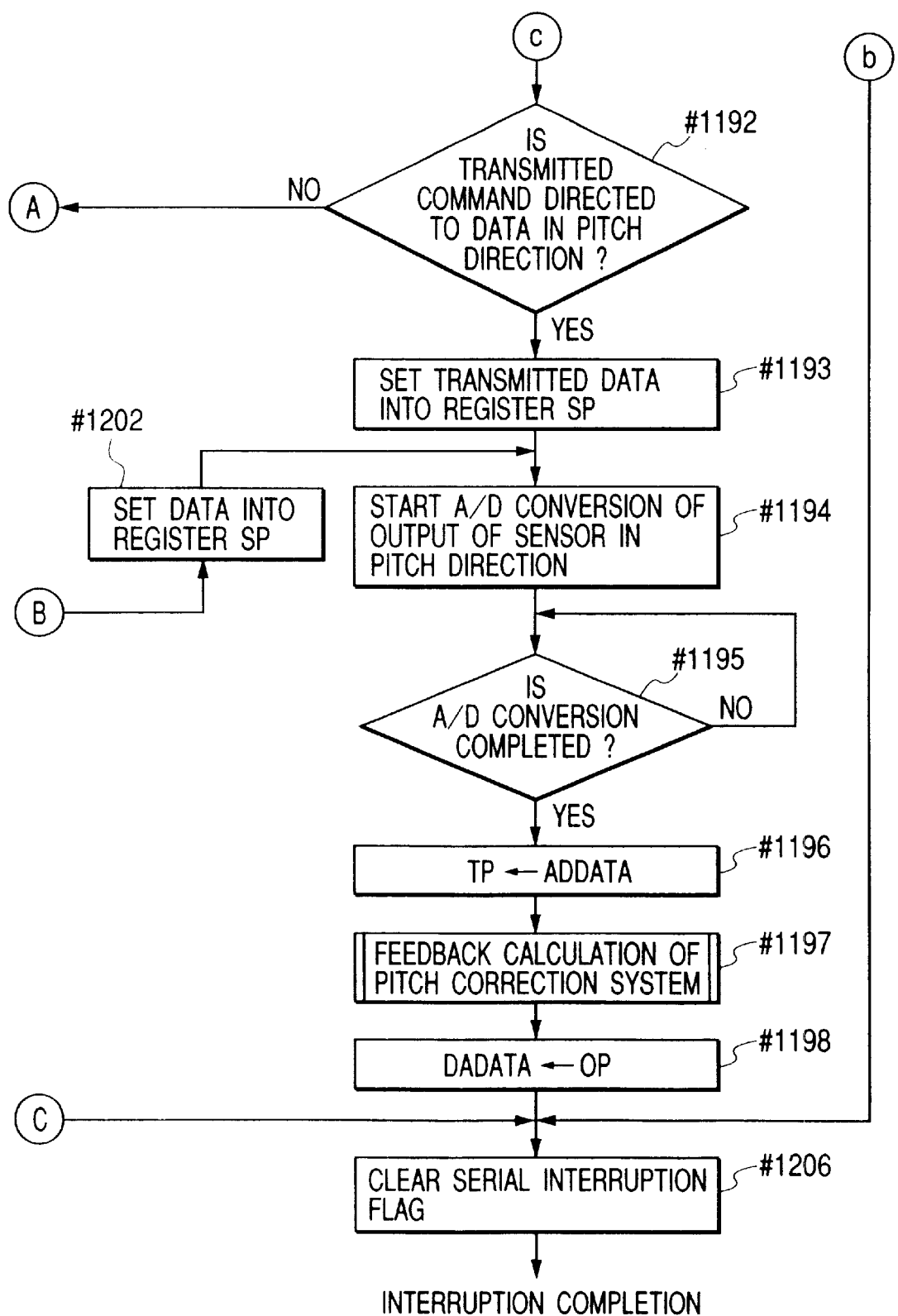
FIG. 21 is comprised of FIGS. 21A and 21B are flowcharts showing the continuation of the operation shown in FIG. 20.
Figure 25:
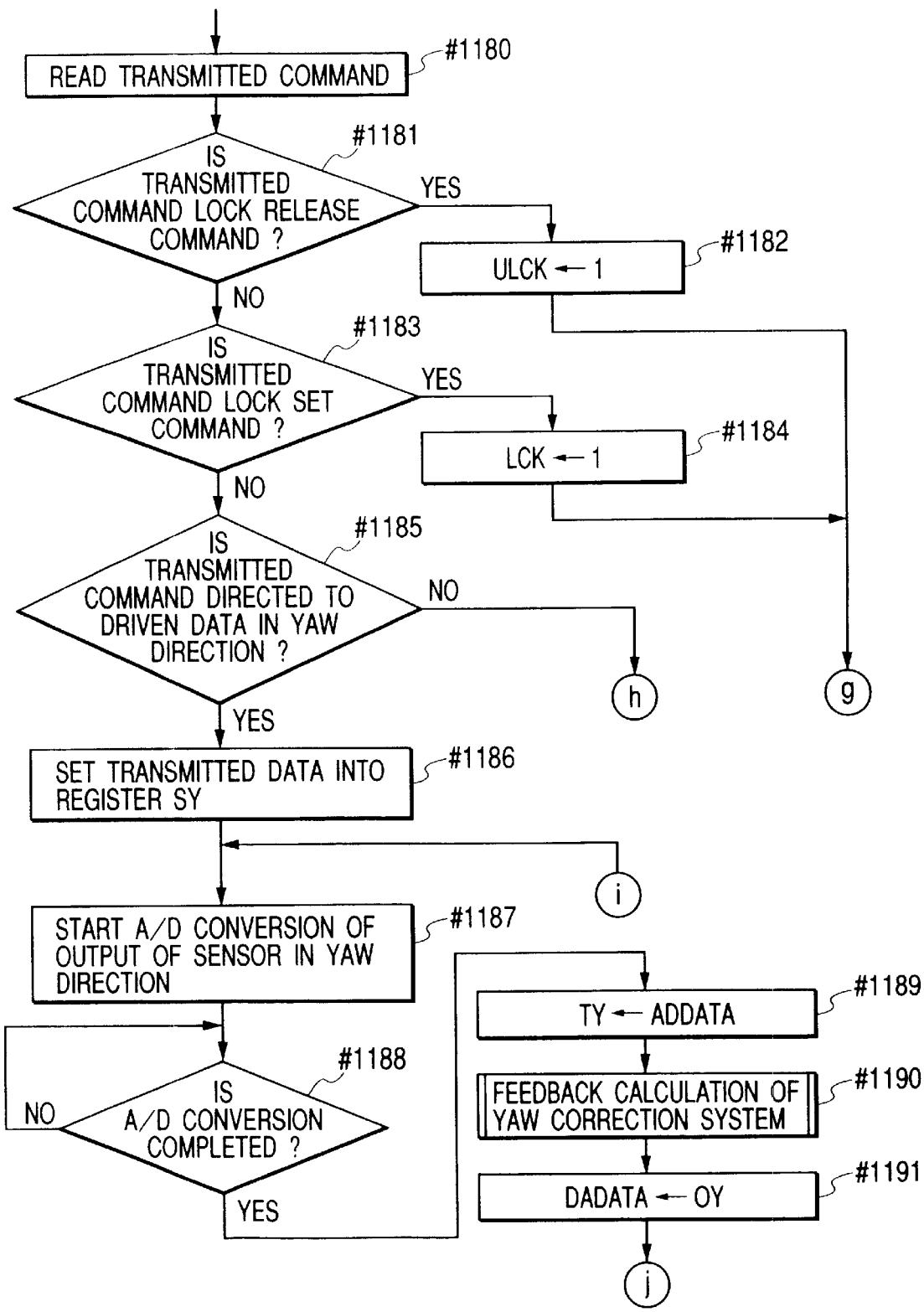
FIG. 25 is a flowchart showing a partial serial interruption operation of the interchangeable lens in accordance with the fourth embodiment of the present invention.
Figure 26B:
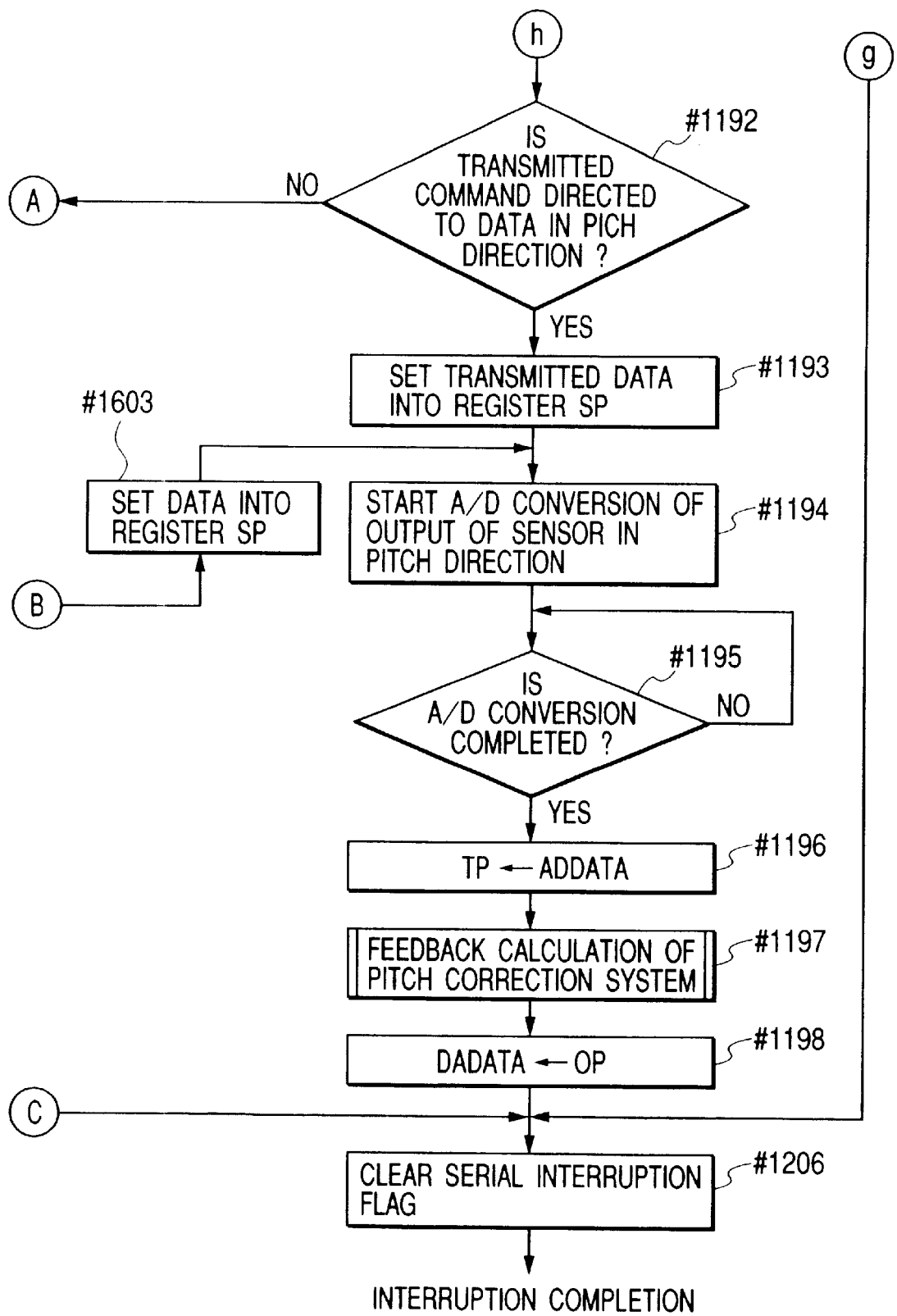
FIG. 26 is comprised of FIGS. 26A and 26B are flowcharts showing the continuation of the operation shown in FIG. 25.

FIGS. 25, 26A and 26B correspond to FIGS. 20, 21A and 21B in the above third embodiment in which the step #1199 is changed to a step #1600, the step #1200 is changed to a step #1601, the step #1201 is changed to a step #1602, the step #1202 is changed to a step #1603, the step #1203 is changed to a step #1604, and the step #1204 is changed to a step #1605, respectively. Hereinafter, only those changed steps will be described.

In the step #1600 of FIGS. 26A and 26B, it is judged whether the data is the given-angle-of-view drive signal in the yaw direction or not, and if so, the control is advanced to a step #1601 where the data corresponding to the given-angle-of-view drive signal in the yaw direction is set at the SY register within the CPU 11, and the control is advanced to a step #1187 of FIG. 25.

For example, the given angle-of-view drive command in the yaw direction is set as follows:

| | |
|---|---|
| 44H = 40H, 00H, 00H (0) | 0 degree |
| 45H = 40H, 01H, 00H (+256) | 0.0256 degrees |
| 46H = 40H, 2FH, FFH (+12287) | 1.2287 degrees |
| 47H = 40H, FFH, 00H (−256) | −0.0256 degrees |
| 48H = 40H, D0H, 00H (−12288) | −1.2288 degrees |

In the step #1602 of FIGS. 26A and 26B, it is judged whether the data is the given-angle-of-view drive signal in the pitch direction or not, and if so, the control is advanced to a step #1603 where the data corresponding to the given-angle-of-view drive signal is set at the SP register within the CPU 11, and the control is advanced to step #1194.

If it is judged in step #1602 that the data is not the given-angle-of-view drive signal in the pitch direction, the control is advanced to a step #1604 where it is judged whether the data is the given-angle-of-view drive signal in the yaw direction, and if so, the control is advanced to step #1605 where the data corresponding to the given-angle-of-view drive signal is set at the SY register within the CPU 11, and the same operation as that of the steps #1187 to #1191 is executed, and the data corresponding to the given-angle-of-view drive signal is set at the SP register within the CPU 11, and the same operation as that of the steps #1194 to #1198 is executed.

As described above, in the fourth embodiment of the present invention, if the coordinate position drive signal of 3 bytes which is obtained as the target position of the image blur correcting means on the basis of the output of the blur sensor is equal to or substantially equal to the predetermined given-angle-of-view drive signal of 1 byte, the image blur correcting means is driven by using the latter signal instead of the former signal. Therefore, the communication load can be reduced to ⅓ of the normal load during the communication under the above circumstances.

Subsequently, the operation of the main portion in accordance with a fifth embodiment of the present invention will be described with reference to the flowcharts shown in FIGS. 4A, 4B, 5, 6, 9A, 9B and 27, a timing chart shown in FIGS. 7A and 7B and so on.

Since FIGS. 4A, 4B, 5, 6 and 9 have been already described, those description will be omitted.

The operation on the interchangeable lens 8 side will be described with reference to flowcharts of FIG. 27.

Figure 27:
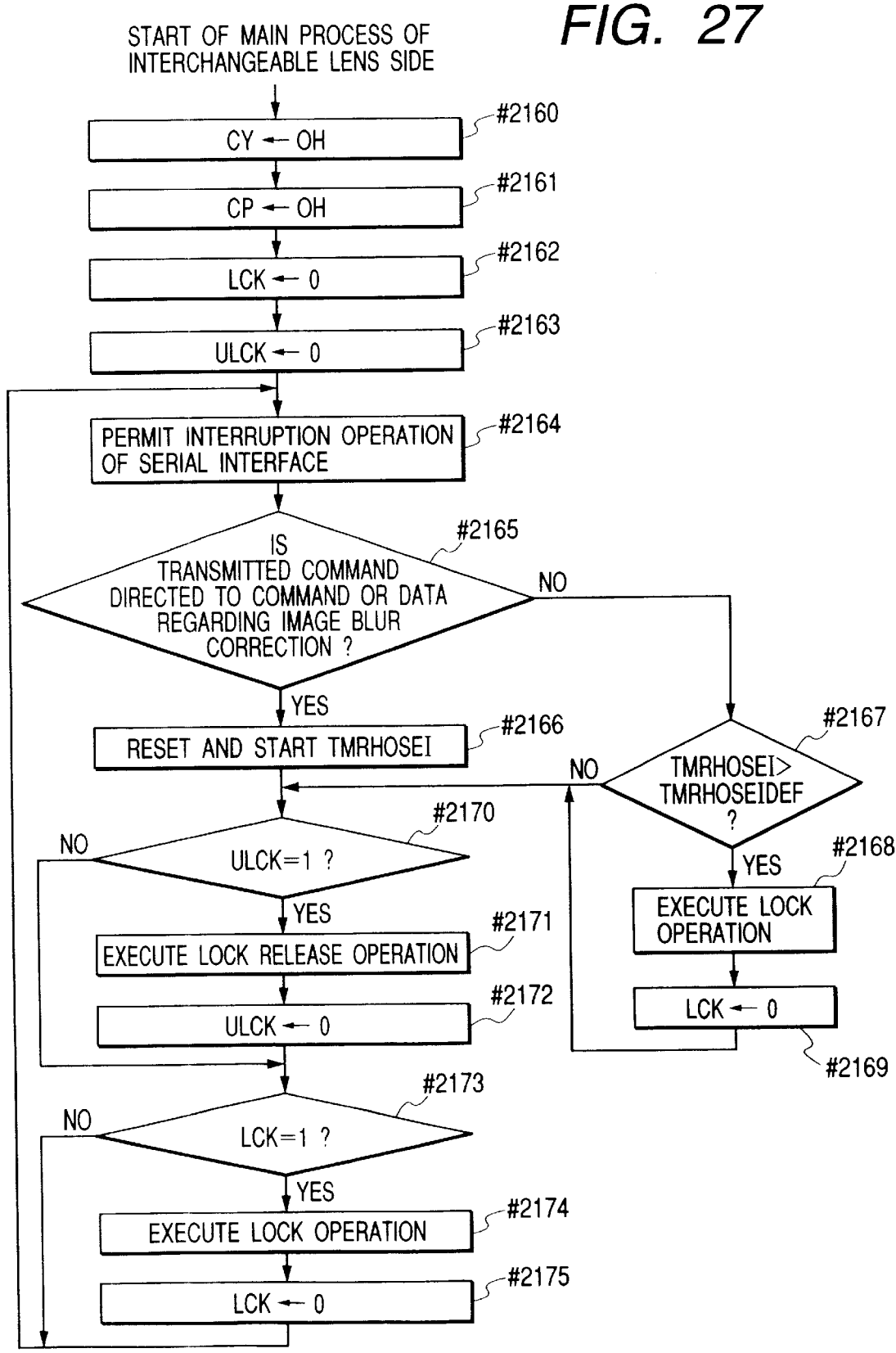
FIG. 27 is a flowchart showing a main process of an interchangeable lens side in accordance with a fifth embodiment of the present invention.

In steps #2160 and #2161 of FIG. 27, the correction arithmetic operation internal registers for lens control CY and CP are reset to OH, respectively. In a succeeding step #2162, the LCK flag indicative of the lock setting control is set to 0, and likewise in a step #2163, the ULCK flag indicative of the lock release control is set to 0. In a succeeding step #2164, the interruption operation of a serial interface for receiving data transmitted from the camera body 1 as described above is permitted.

In a subsequent step #2165, it is judged whether the command previously received from the camera body 1 is a command or data related to the image blur correction such as a command for driving the blur correction lens 54 (in more detail, which is an image blur correcting means made up of the blur correction lens 54 and its support member) or not, and if so, the control is advanced to a step #2166 where a timer TMRHOSEI is reset and started, and the control is advanced to a step #2170.

Also, if it is judged that the command is not the command or data related to the image blur correction, the control is advanced to a step #2167 from the step #2165 where it is judged whether a value of the timer TMRHOSEI is larger than a predetermined period of time TMRHOSEIDEF or not, and if larger, since the command or data related to the image blur correction has not been received for the predetermined period of time (TMRHOSEIDEF), the control is advanced to a step #2168 in order to stop the driving of the image blur correcting means where the lock operation is conducted. Specifically, the blur correction lens 54 is moved to a lockable position in accordance with a control signal from the CPU 11, and a current is supplied to the plunger 58 in the mechanical lock mechanism by the actuator driver circuit 17 of the mechanical lock mechanism, to thereby forcedly stop the movement of the blur correction lens 54 by a lever. Then, the control is advanced to a step #2169 where the flag LCK is set to 0, and the control is advanced to a step #2170.

The above operation may be identical with the operation of a step #2174 which will be described later, but the image blur correcting means may be driven with an electric power that reduces the power consumption or may be driven for a shorter period of time, taking into consideration that more electric power is required due to a frictional force or a loss of a coil resistance is applied if the image blur correcting means is moved more quickly.

The control is advanced to a step #2170 where it is judged whether a command that accelerates the lock release has been received during the serial interface communication interruption operation which will be described later or not, and if the flag ULCK is 0, the control is advanced to a step #2173 as it is, assuming that the lock release command has not been received.

On the other hand, if the flag ULCK is set to 1, the control is advanced to a step #2171 from the step #2170 assuming that the lock release command has been received, and the lock release operation is immediately conducted. In this case, the blur correction lens 54 is moved to a lockable position in accordance with a control signal from the CPU 11, and a current is supplied to the plunger 58 in the mechanical lock mechanism shown in FIG. 3 in a given direction by the actuator driver circuit 17 of the mechanical lock mechanism through a mechanical lock driver not shown, to thereby release the engagement of the blur correction lens 54 which is a shift lens. Then, in a subsequent step #2172, the above-mentioned flag ULCK is set to 0.

In a subsequent step #2173, it is judged whether the flag LCK indicative of the lock setting is 1 or not, and if the flag LCK is 0, the control is returned to the step #2164 as it is, assuming that the lock setting command has not been received. On the contrary, if the flag LCK is 1, the control is advanced to a step #2174 assuming that the lock setting command has been received, and the lock setting operation is immediately conducted. In this case, as in the above-mentioned lock release operation, a current is supplied to the plunger 58 in the mechanical lock mechanism in a counter direction to that in case of lock release by the actuator driver circuit 17 of the mechanical lock mechanism in accordance with a control signal from the CPU 11, to thereby forcedly stop the movement of the blur correction lens 54 by a lever. Finally, the flag LCK is set to 0 in the step #2175, and the control is returned to the step #2164 again, to thereby repeat the above-mentioned operation.

As described above, even if the driving of the image blur correcting means stops without receiving the command or data related to the image blur correction for a given period of time in step #2167, if the command or data related to the image blur correction is received again, the image blur correcting means is driven.

Figure 9B:
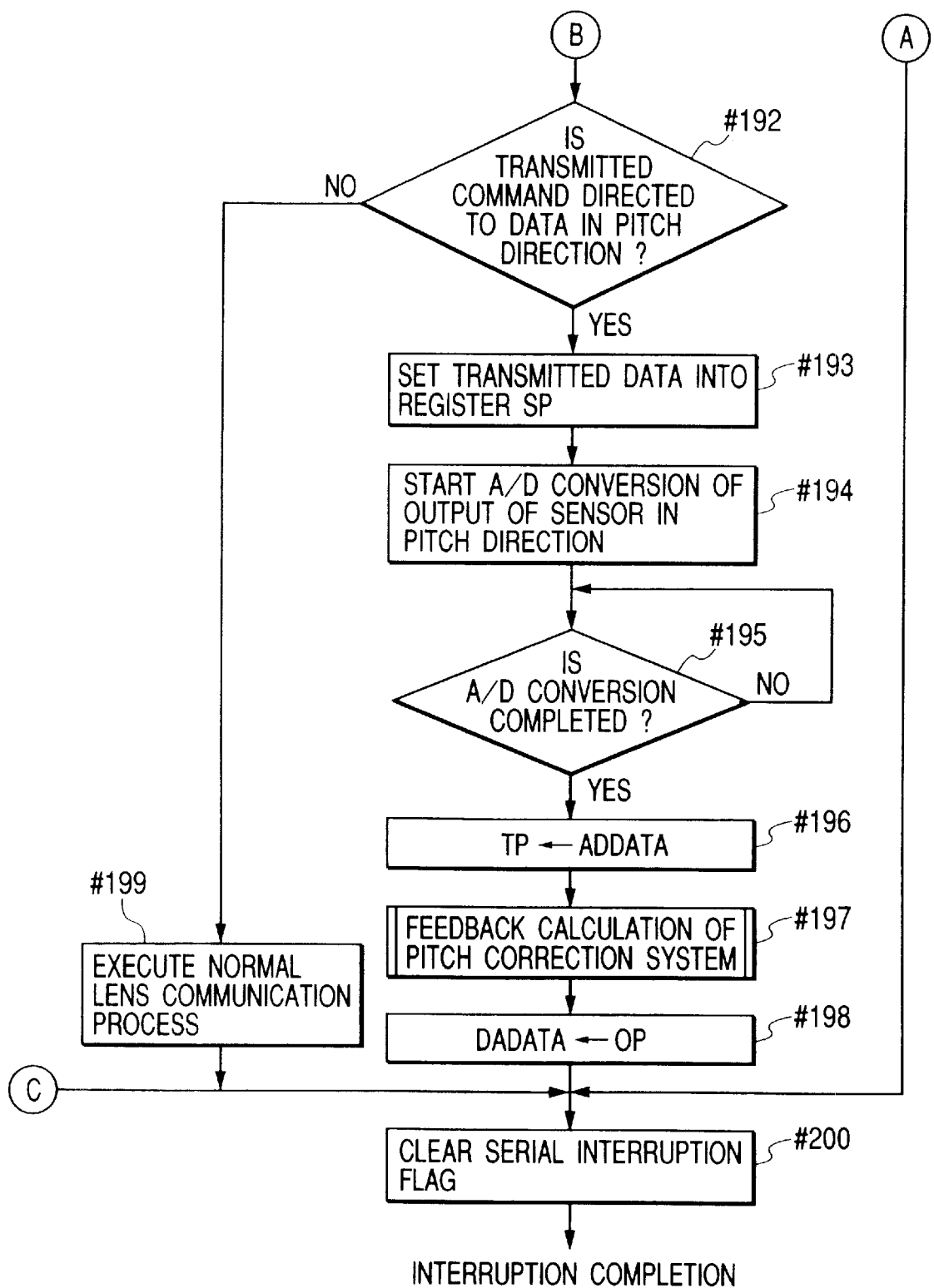
FIG. 9 is comprised of FIGS. 9A and 9B are flowcharts showing a serial interruption operation of the interchangeable lens in accordance with the first embodiment of the present invention.

Since the operation of the serial communication at the interchangeable lens 8 side was described in the above with reference to a flowchart shown in FIGS. 9A and 9B, its description will be omitted.

As described above, in the fifth embodiment of the present invention, when the command or data related to the driving of the blur correction lens 54 from the camera body 1 side to the interchangeable lens 8 side does not occur for a given period of time (not received by the interchangeable lens 8) as shown in the steps #2167 to #2169 of FIG. 27, since the driving of the image blur correcting means is locked at a given position by locking means made up of a mechanical structure, the useless driving of the image blur correcting means is prevented, thereby being capable of suppressing the power consumption related to the blur correction to substantially 0.

Figure 28:
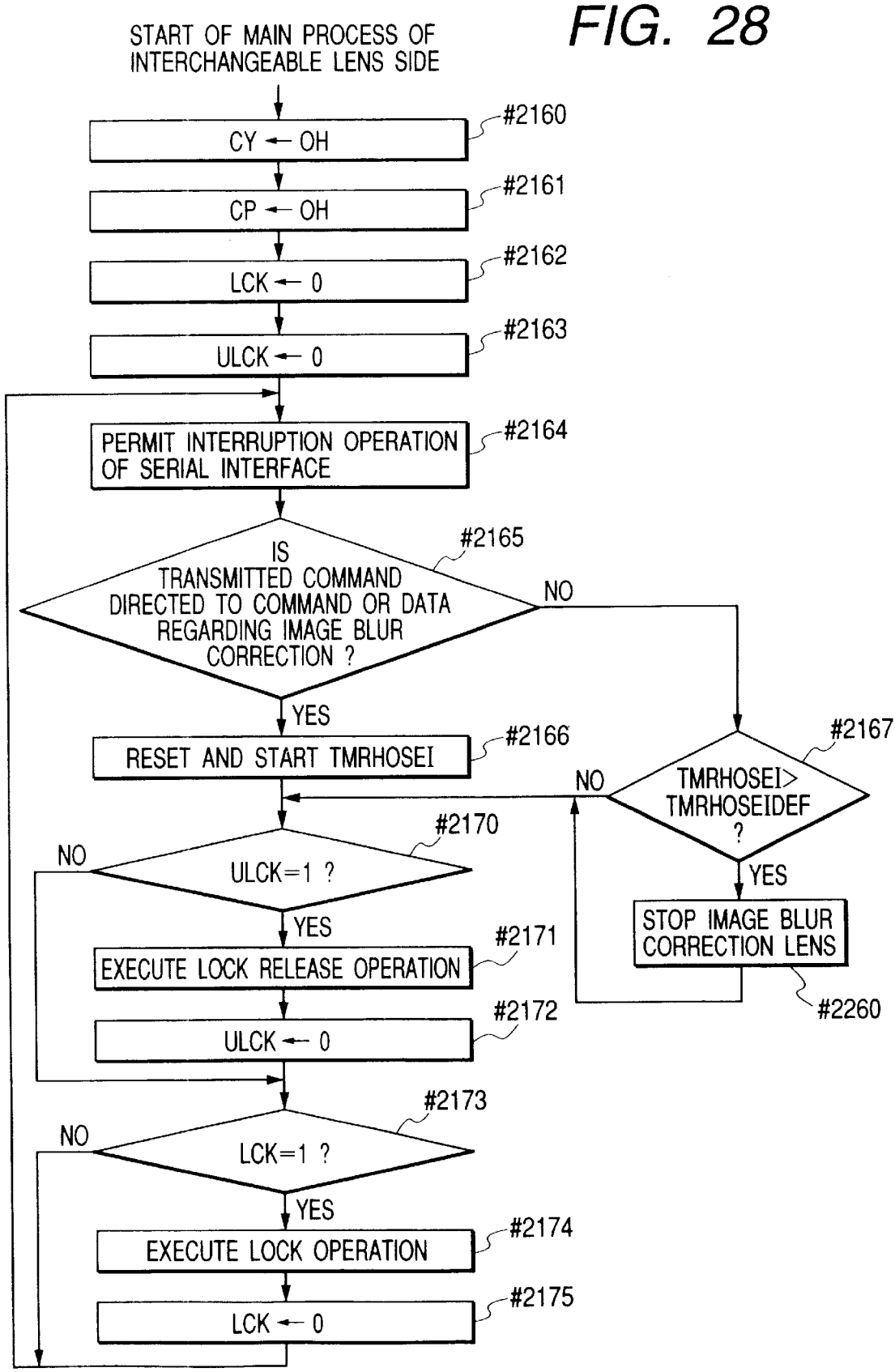
FIG. 28 is a flowchart showing a main process of an interchangeable lens side in accordance with a sixth embodiment of the present invention.

FIG. 28 is a flowchart showing a main process of an interchangeable lens in accordance with a sixth embodiment of the present invention, which corresponds to the flowchart of FIG. 27 in the above-described fifth embodiment. Since other parts are identical with those in the above-mentioned first embodiment, their description will be omitted.

In FIG. 28, parts of the steps #2168 and #2169 of FIG. 27 are changed to a step #2260.

In the step #2167, it is judged whether the value of the timer TMRHOSEI is larger for a given period of time TMRHOSEIDEF as described above, and if larger, since the command or data related to the image blur correction has not been received for the predetermined period of time TMRHOSEIDEF, the control is advanced to a step #2260 in order to stop the driving of the image blur correcting means, where the blur correction lens 54 is driven to the given position and then stopped at that position. As the stopping manner, there are proposed that the blur correction lens 54 stops in that state, that the blur correction lens 54 stops at a movable center position, that the blur correction lens 54 stops after the retained energy is driven to a minimum position (a position where the blur correction lens or the like drops due to the gravity from the movable center position), and so on. Also, in order to stop the blur correction lens 54 at this position, it is necessary to continuously output the drive signal in the pitch and yaw directions to the driving means formed of a coil and so on for driving the blur correction lens (such means for retaining the blur correction lens at a given position by energization is called "electrically locking means"). In this case, the power consumption is slight, and the power consumption can be reduced more than that at the normal blur correction time.

Figure 29:
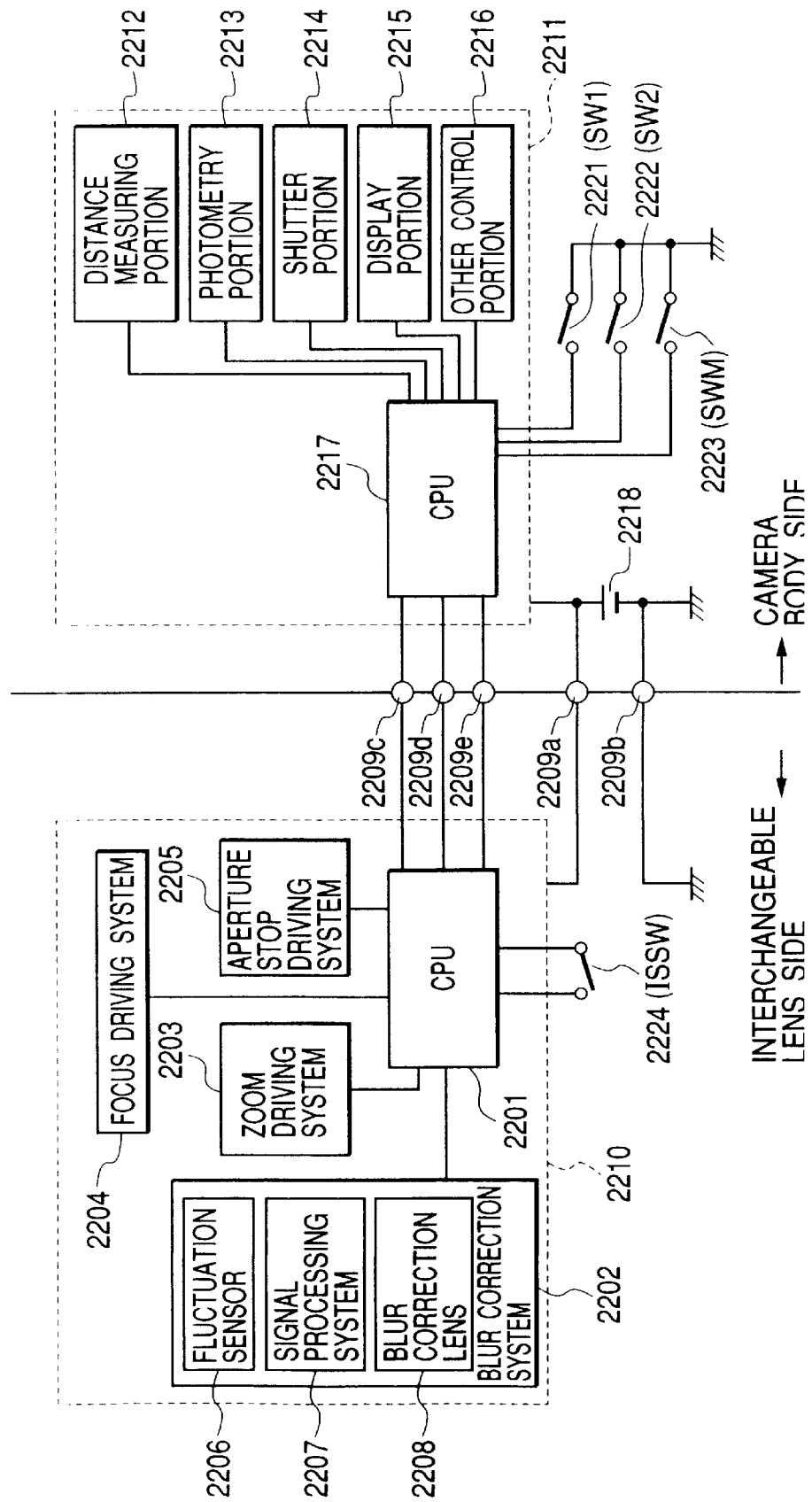
FIG. 29 is a block diagram showing the electric structure of a single-lens reflex camera in accordance with a seventh embodiment of the present invention.

FIG. 29 is a diagram showing a camera system in accordance with a seventh embodiment of the present invention, specifically a block diagram showing the electric structure of a state where an interchangeable lens equipped with the image blur correcting means is attached onto the camera body.

Referring to FIG. 29, reference numeral 2201 denotes a lens CPU that receives communication from the camera body side through communication contacts 2209c (for a clock signal) and 2209d (for signal transmission from the camera body to the lens signal), and actuates a blur correction system 2202, a zoom driving system 2203, a focus driving system 2204 and an aperture stop driving system 2205 in accordance with a command value from the camera body side or controls a blur correction system 2202.

The blur correction system 2202 is made up of a fluctuation sensor 2206 for detecting the blur or fluctuation, a signal processing system 2207 for conducting feedback control on the basis of a signal from the blur sensor 2206, and a blur correction lens 2208 for conducting an actual blur correcting operation in accordance with a control signal from the signal processing system 2207 (the image blur correcting means is made up of the blur correction lens 2208 and its support member).

The zoom drive system 2203 drives a lens barrel that changes a focal distance of the lens in accordance with the command value from the CPU 2201 or upon depression of a switch not shown by an operator. The lens for adjustment of a focal point is driven in accordance with a command value from the CPU 2201 to conduct focusing. The aperture stor driving system 2205 closes the iris or stop to a set position in accordance with the command value from the CPU 2201 or returns the iris to an open state.

Also, the CPU 2201 transmits a state of the interior of the lens (states of the zoom position, the focus position, the iris value, etc.) and information related to the lens (data necessary for calculation of the release iris value, the focal distance and the distance measuring calculation, etc.) to the camera body side through the communication contact 2209e (for transmitting the signal from the interchangeable lens to the camera body), likewise.

A lens electric system 2210 is made up of the CPU 2201, the blur correction system 2202, the zoom driving system 2203, the focus driving system 2204 and the aperture driving system 2205, and a current is supplied to the lens electric system 2210 from a power supply 2218 within the camera body through a mount portion contact 2209a and a GND contact 2209b.

The interior of the camera body includes, as an electric system 2211 within the body, a distance measuring portion 2212, a photometry portion 2213, a shutter portion 2214, a display portion 2215, another control portion 2216 as well as a camera CPU 2217 for conducting management such as start or stop of those operation, exposure calculation, distance measuring calculation and so on. The electric power is supplied to the above electric system 2211 within the body from the power supply 2218 within the body.

Also, reference numeral 2221 (SW1) denotes a switch that conducts photometry and range finding, and 2222 (SW2) is a release switch. Those switches 2221 and 2222 are generally formed of two-stage stroke switches which are structured so that the switch SW1 turns on by a first stroke of the release bottom, and the switch SW2 turns on by a second stroke. Reference numeral 2223 (SWM) denotes an exposure mode select switch, and the mode change may be conducted by turning on or of the switch 2223 or by operating the switch 2223 and another operating member at the same time.

In case of the system having the above blur correction system 2202, the blur correction system 2202 is equipped within the interchangeable lens side in FIG. 29. However, an adaptor may be disposed between the camera body and the interchangeable lens. The structure of the blur correction system 202 may be identical with, for example, that shown in FIG. 3.

Subsequently, the operation of the respective CPUs will be described with reference to the flowcharts shown in FIGS. 30, 31A and 31B.

First, the operation of the CPU 2217 equipped within the camera will be described with reference to the flowchart shown in FIG. 30.

First, in a step #2301, a state of the switch SW1 is detected, and if the switch SW1 is off, the control remains in this step, and thereafter if the switch SW1 turns on, the control is advanced to a step #2302. In the step #2302, the CPU 2217 conducts the communication with the interchangeable lens. This communication is made to obtain information necessary to conduct AE and AF, and when the CPU 217 transmits a communication command to the CPU 2201 equipped within the interchangeable lens, the CPU 2201 transmits information such as the focal distance, the AF sensitivity or the open F number. In a subsequent step #2303, an IS actuation start command is transmitted to the interchangeable lens side. Then, in the subsequent steps #2304 and #2305, the sub-routine such as known photometry and distance measurement is executed.

In a subsequent step #2306, it is judged whether it is in-focus or not, and if not in-focus, the control is returned to the step #2301, and the same operation is repeated.

On the other hand, if in-focus, the control is advanced to a step #2307 from the step #2306 where it is judged whether the switch SW2 is on or not, and if off, the control is returned to the step #2301, but if on, the control is advanced to a step #2308 where the mirror-up operation is conducted. Then, in a subsequent step #2309, the leading curtain of the shutter not shown runs through the shutter portion 2214, to thereby start the exposure. Then, in a subsequent step #2310, the exposure is conducted for only a set shutter speed time, and thereafter the control is advanced to a step #2311 where the trailing curtain of the shutter runs to complete the exposure. Finally, in a step #2312, mirror-down operation is conducted to complete sequential photographing operation.

Subsequently, the operation of the CPU 2201 equipped within the interchangeable lens will be described with reference to a flowchart shown in FIGS. 31A and 31B.

Figure 30:
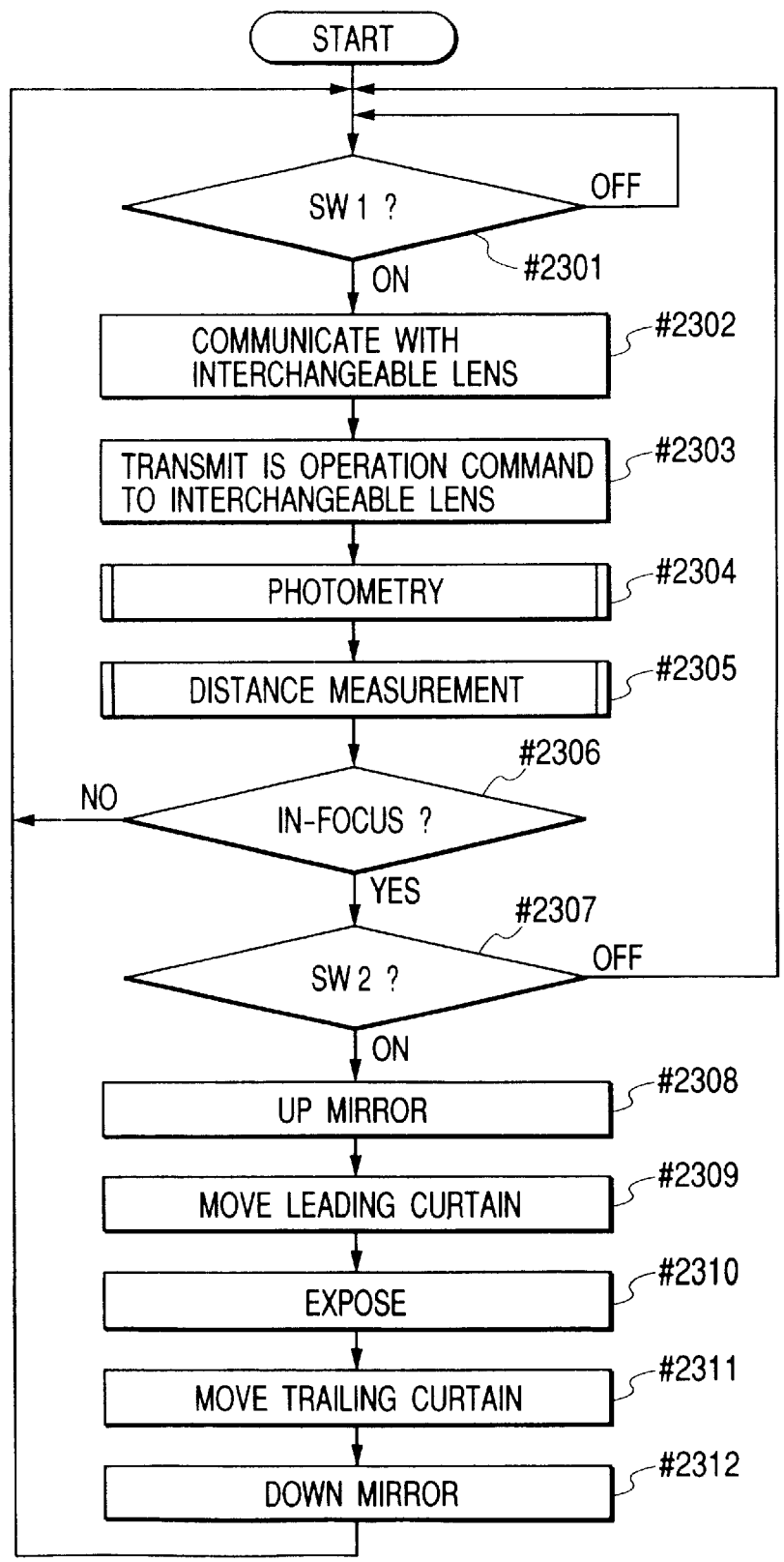
FIG. 30 is a flowchart showing the operation of a camera main body side in accordance with the seventh embodiment of the present invention.

First, in a step #2321, in the communication for AE and AF shown in the step #2302 of FIG. 30, upon receiving the communication command from the CPU 2217 equipped in the camera body, the CPU 2201 transmits the information such as the focal distance, the AF sensitivity or the open F number. Then, in a subsequent step #2322, the measured distance is calculated by the CPU 2217, and the focal point adjustment lens is driven on the basis of the transmitted focal point adjustment lens moving amount.

In a subsequent step #2323, the reception of the IS actuation command is detected, and if the IS actuation command is not received, the control is advanced to a step #2325 where the reception of the IS stop command is detected. In this step, if the IS stop command is received, the control is immediately advanced to a step #2340, but if the IS stop command is not received, the control is advanced to a step #2339 where it is judged whether the timer TMRHOSEI is larger than a predetermined period of time TMRHOSEIDEF or not. If smaller, the control is returned to the step #2321. Also, if the timer TMRHOSEI is larger than a predetermined period of time TMRHOSEIDEF, the control is advanced to a step #2340 from the step #2339, and since the command or data related to the image blur correction has not been received for the predetermined period of time TMRHOSEIDEF, the blur correction lens 2208 is driven to a predetermined lockable position in order to stop the driving of the image blur correction lens 2208. In a subsequent step #2341, the locking operation is conducted. Specifically, a current is supplied to the plunger 58 in the mechanical lock mechanism, for example, shown in FIG. 3 by the actuator driver circuit of the mechanical lock mechanism (included in the signal processing system 2207 in FIG. 29), to thereby forcedly stop the movement of the blur correction lens 54 by a lever.

Also, if the reception of the IS actuation command is detected in the above step #2323, the control is advanced to a step #2324 where the timer TMRHOSEI is reset and starts. Then, in a subsequent step #2326, the blur sensor output and the blur correction amount are read, and in a subsequent step #2327, the data is subjected to A/D conversion, and in a subsequent step #2328, the data is converted into driving data for conversion of the blur correction lens 2208. Then, in a step #2329, the blur correction lens 2208 is driven to conduct blur correction.

In a subsequent step #2330, the reception of the on signal of the switch SW2 is detected, and upon receiving the on signal, the control is advanced to a step #2331 where the blur sensor output and the blur correction amount are read, and in a subsequent step #2332, the data is subjected to A/D conversion. Then, in a subsequent step #2333, mirror and shutter fluctuation data stored in a ROM is read, and in a subsequent step #2334, the data is converted into data for driving the blur correction lens 2208, and in a step #2335, the blur correction lens 2208 is driven to conduct blur correction. Then, in a subsequent step #2336, the iris is closed through the aperture stop driving system 2205 to conduct the exposure, and in a step #2337, if the completion of exposure is not detected, the control is returned to the step #2331, but if the completion of exposure is detected, the control is advanced to a step #2338 where the iris is released to complete the sequential operation, and the control is returned to the step #2321.

Figures 31, 31A:
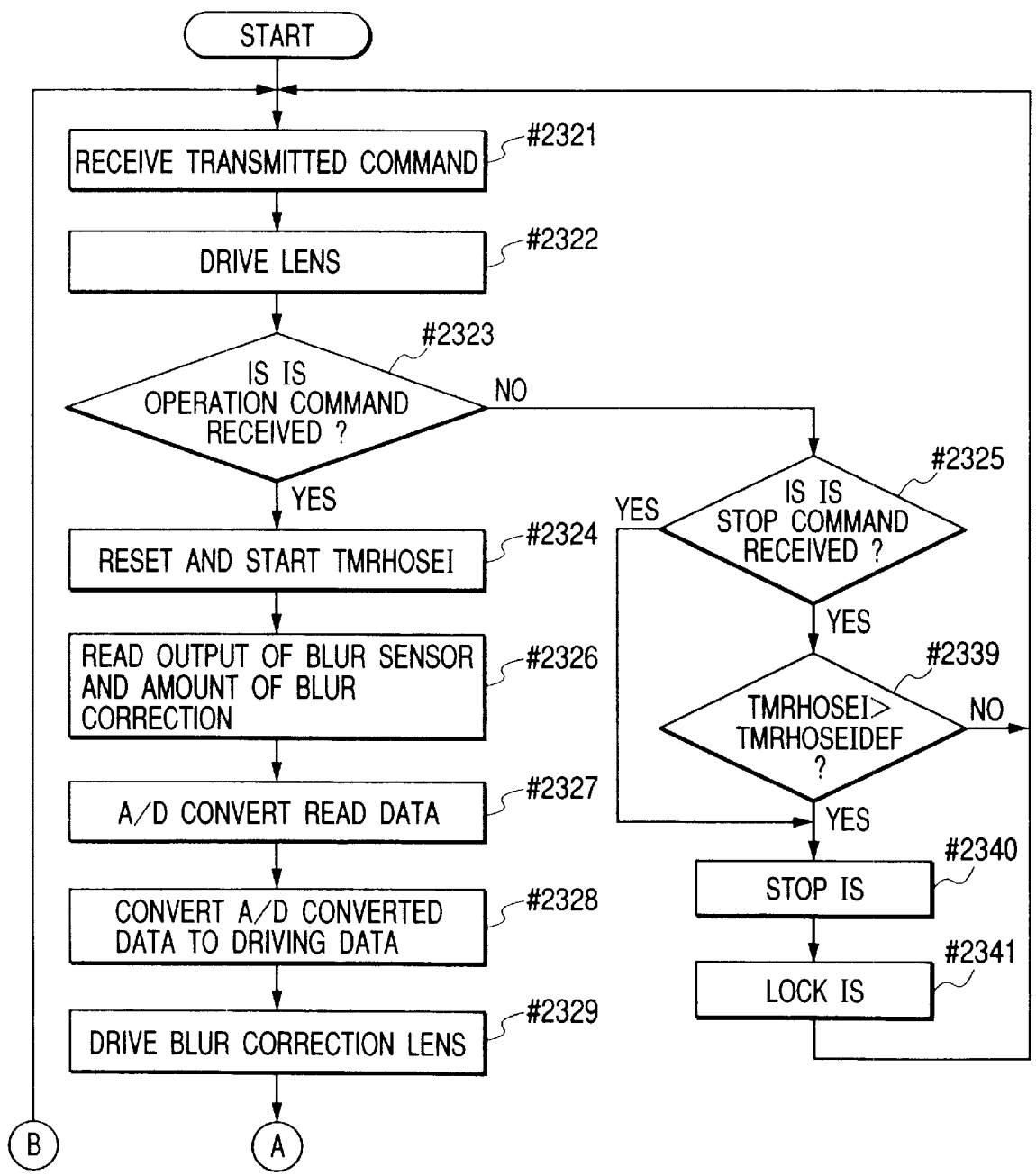
FIG. 31 is comprised of FIGS. 31A and 31B are flowcharts showing the operation of an interchangeable lens side in accordance with the seventh embodiment of the present invention.
Figure 31B:
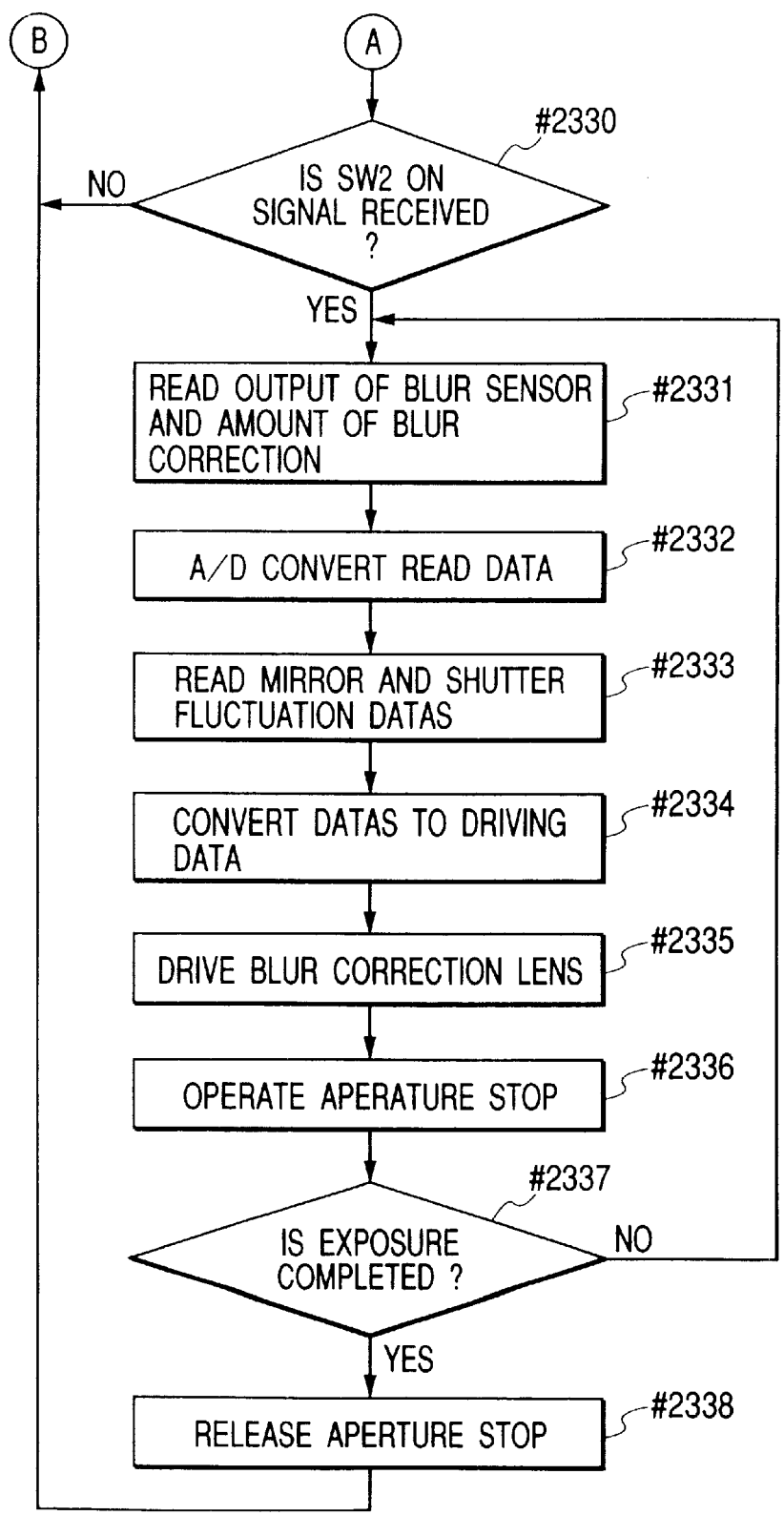

As described above, in the seventh embodiment of the present invention, as shown in the steps #2339 to #2341 of FIGS. 31A and 31B, when the command or data related to the driving of the blur correction lens 2208 from the camera body side to the interchangeable lens side has not been received (not received by the interchangeable lens) for the predetermined period of time, the driving of the blur correcting means is locked at the given position by the locking means formed of a mechanical structure, the useless driving of the image blur correcting means is prevented, thereby being capable of suppressing the power consumption caused by the blur correction during that period of time to 0.

Figure 32B:
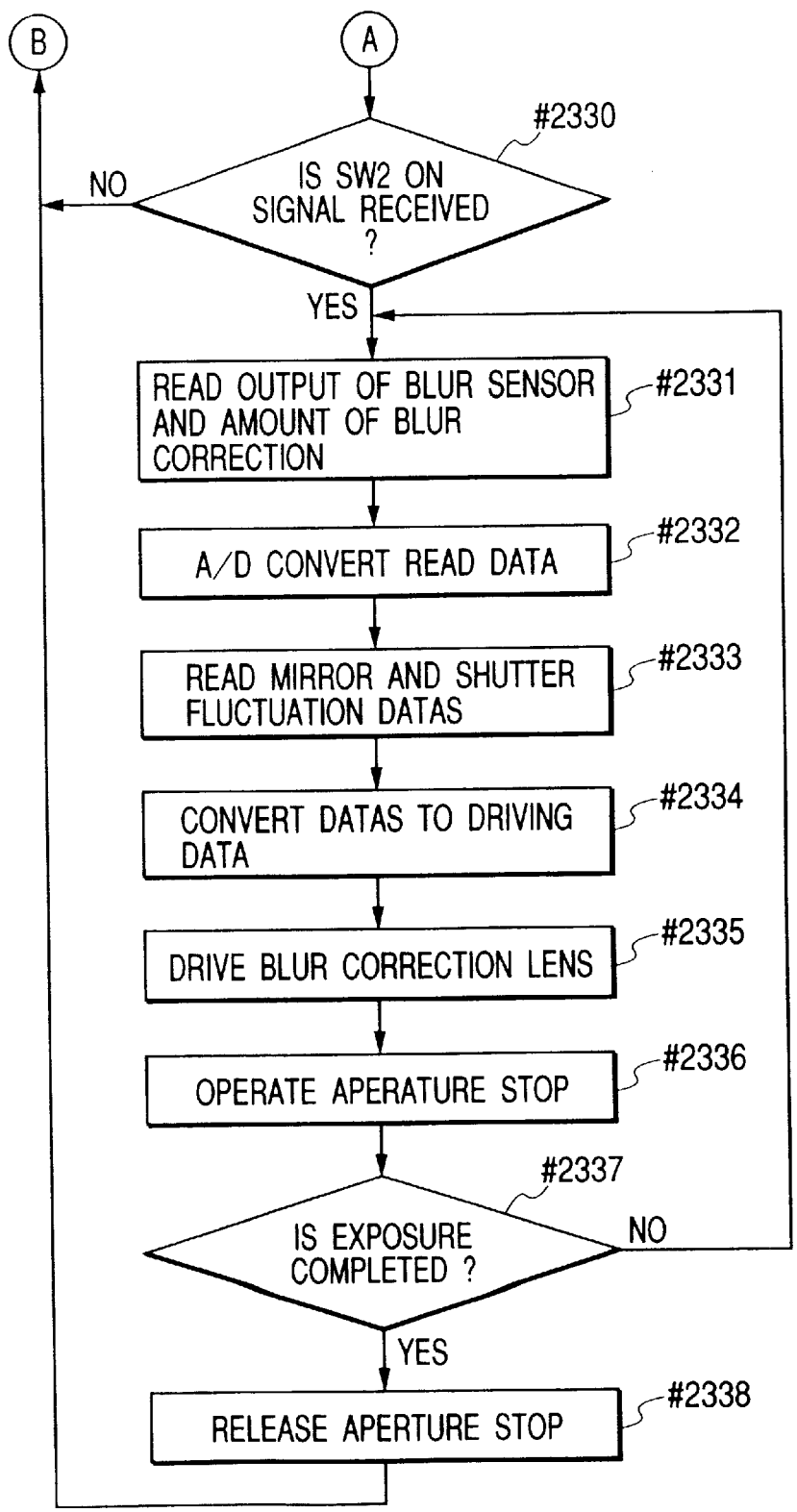
FIG. 32 is comprised of FIGS. 32A and 32B are flowcharts showing the operation of an interchangeable lens side in accordance with an eighth embodiment of the present invention.

FIGS. 32A and 32B are flowcharts showing the operation at the interchangeable lens side in accordance with an eighth embodiment of the present invention, and corresponds to the flowchart shown in FIGS. 31A and 31B in accordance with the above seventh embodiment. Since other operation is identical with that in the above seventh embodiment, its description will be omitted.

In FIG. 24, as a process in the case where the judgement in the step #2339 of FIG. 23 is yes, a step #2400 is added.

In the step #2339, it is judged whether the timer TMRHO-SEI is larger than a predetermined period of time TMRHO-SEIDEF or not, and if larger, since the command or data related to the image blur correction has not been received for the predetermined period of time TMRHOSEIDEF, the control is advanced to a step #2400 in order to stop the driving of the blur correction lens 2208, where the blur correction lens 2208 is driven to a given position and stops. The stopping manner is identical with that in the above seventh embodiment.

With the above structure, the power consumption related to the driving of the image blur correcting means can be reduced as in the above seventh embodiment.

In the above-mentioned respective embodiments, the blur or fluctuation sensor formed of a vibration gyro is assumed as the blur detecting means, however other angular velocity sensors or other sensors (displacement or angular velocity sensor, velocity sensor, acceleration, or angular acceleration sensor, an area sensor, etc.) can be used. Also, as the image blur correcting means, an optical member is moved on a face substantially perpendicular to the optical axis, to thereby conduct the image blur correction. However, other image blur correcting means such as a variable apex angle prism or the like may be employed.

Also, in the above respective embodiments, an example in which the present invention is applied to a silver salt camera was described. Similarly, the present invention can be applied to another photographing device such as a video camera or a digital camera, or other optical devices.

As was described above, according to the present invention, there can be provided the image blur correcting system formed of the photographing device and the optical device which is capable of reducing the arithmetic operation load related to the image blur correction at the optical device side.

Also, according to the present invention, there can be provided the image blur correcting system, the camera system the camera and the interchangeable lens which are capable of reducing the communication load related to the load of driving the image blur correcting means depending on the drive target position of the image blur correcting means.

Further, according to the present invention, there can be provided the image blur correcting system, the camera system the camera and the interchangeable lens which are capable of suppressing the power consumption or reducing the power consumption by stopping the useless driving of the image blur correcting means if a signal related to the driving of the image blur correcting means does not occur for a predetermined period of time.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image blur correcting system including a camera unit portion having blur detecting means and an optical unit portion having image blur correcting means, comprising:

arithmetically operating means for determining a relation between a detection output value of said blur detecting means and a driven amount of said image blur correcting means corresponding to the detection output value in accordance with information related to a blur prevention sensitivity, conducting arithmetic operation on the basis of the determined relation to calculate a drive signal for driving said image blur correcting means in accordance with the detection output value of said blur detecting means;

first transmitting means for transmitting the drive signal calculated by said arithmetically operating means to said optical unit portion, said arithmetically operating means and said first transmitting means being arranged on said camera unit portion, second transmitting means for transmitting the information related to the blur prevention sensitivity to said camera unit portion; and drive control means that receives the drive signal for controlling the driving of said image blur correcting means in accordance with the drive signal, said second transmitting means and said drive control means being arranged on said optical unit portion.

2. An image blur correcting system according to claim 1, wherein said optical unit portion includes at least one of a focus lens and a zoom lens, and said second transmitting means transmits a signal corresponding to a state of at least one of said focus lens and said zoom lens to said camera unit portion as the information related to the blur prevention sensitivity.

3. An image blur correcting system according to claim 2, wherein said second transmitting means transmits the signal corresponding to a state of at least one of said focus lens and said zoom lens to said camera unit portion as the information related to the blur prevention sensitivity after said focus lens is in focus.

4. An image blur correcting system according to claim 1, wherein said arithmetically operating means determines a relation between the detection output value of said blur detecting means and the driven amount of said image blur correcting means in accordance with the information related to the blur prevention sensitivity which is transmitted from said optical unit portion and conducts arithmetic operation for calculating the drive signal, at any time while the image blur correcting operation continues.

5. An image blur correcting system according to claim 1, wherein said second transmitting means transmits the information related to the blur prevention sensitivity to said camera unit portion upon receiving the drive signal from said camera unit portion.

6. A camera system including a camera having blur detecting means and an interchangeable lens having image blur correcting means, and detachably attached to said camera, comprising:
   arithmetically operating means for determining a relation between a detection output value of said blur detecting means and a driven amount of said image blur correcting means corresponding to the detection output value in accordance with information related to a blur prevention sensitivity, conducting arithmetic operation on the basis of the determined relation to calculate a drive signal for driving said image blur correcting means in accordance with the detection output value of said blur detecting means; and
   first transmitting means for transmitting the drive signal calculated by said arithmetically operating means to said interchangeable lens, said arithmetically operating means and said first transmitting means being arranged on said camera
   second transmitting means for transmitting the information related to the blur prevention sensitivity to said camera, and
   drive control means that receives the drive signal for controlling the driving of said image blur correcting means in accordance with the drive signal, said second transmitting means and said drive control means being arranged on said interchangeable lens.

7. A camera which has blur detecting means and to which an interchangeable lens having image blur correcting means is detachably attachable, said camera comprising:
   arithmetically operating means for determining a relation between a detection output value of said blur detecting means and a driven amount of said image blur correcting means corresponding to the detection output value in accordance with information related to a blur prevention sensitivity, conducting predetermined arithmetic operation on the basis of the determined relation to calculate a drive signal for driving said image blur correcting means in accordance with the detection output value of said blur detecting means; and
   transmitting means for transmitting the drive signal calculated by said arithmetically operating means to said interchangeable lens.

8. An interchangeable lens which has image blur correcting means and is detachably attachable to a camera having blur detecting means, said interchangeable lens comprising:
   transmitting means for transmitting information related to blur prevention sensitivity to said camera; and
   drive control means for controlling the driving of said image blur correcting means in accordance with the drive signal transmitted from said camera.

9. An image blur correcting system including a camera unit portion having blur detecting means and an optical unit portion having image blur correcting means, comprising:
   transmitting means for transmitting to said optical unit portion a given-position drive signal for driving said image blur correcting means to a given position or a coordinate position drive signal of said image blur correcting means which is calculated on the basis of an output of said blur detecting means, said transmitting means being arranged on said camera unit portion; and
   drive control means for controlling the driving of said image blur correcting means in accordance with the given-position drive signal transmitted from said transmitting means or the coordinate position drive signal, said drive control means being arranged on said optical unit portion.

10. An image blur correcting system according to claim 9, wherein the data amount of the given-position drive signal is smaller than the data amount of the coordinate position drive signal.

11. An image blur correcting system according to claim 9, wherein said camera unit portion transmits the given-position drive signal to said optical unit portion from said transmitting means instead of the coordinate position drive signal in the case where the coordinate position drive signal calculated on the basis of an output of said blur detecting means is equal to or substantially equal to the given-position drive signal.

12. An image blur correcting system according to claim 9, wherein said optical unit portion transmits position setting information related to the given-position drive signal to which the optical characteristic of said optical device is added to said camera unit portion; and
   wherein said camera unit portion transmits the given-position drive signal for driving said image blur correcting means to a predetermined position to said optical unit portion on the basis of the position setting information.

13. An image blur correcting system including a camera unit portion having blur detecting means and an optical unit portion having image blur correcting means, comprising:
   transmitting means for transmitting to said optical unit portion a given angle-of-view drive signal for driving said image blur correcting means to a given angle of view or a coordinate position drive signal of said image blur correcting means which is calculated on the basis of an output of said blur detecting means, said transmitting means being arranged on said camera unit portion; and
   drive control means for controlling the driving of said image blur correcting means in accordance with the given-angle-of view drive signal transmitted from said transmitting means or the coordinate position drive signal, said drive control means being arranged on said optical unit portion.

14. An image blur correcting system according to claim 13, wherein the data amount of the given-angle-of-view drive signal is smaller than the data amount of the coordinate position drive signal.

15. An image blur correcting system according to claim 13, wherein said camera unit portion transmits the given-angle-of-view drive signal to said optical unit portion from said transmitting device instead of the coordinate position drive signal in the case where the coordinate position drive signal calculated on the basis of an output of said blur detecting means is equal to or substantially equal to the given-angle-of view drive signal.

16. An image blur correcting system according to claim 13, wherein said optical unit portion transmits position setting information related to the given-position drive signal to which the optical characteristic of said optical unit portion is added to said camera unit portion; and wherein said camera unit portion transmits the given-angle-of-view drive signal for driving said image blur correcting means to a predetermined position to said optical unit portion on the basis of the position setting information.

17. An interchangeable lens having image blur correcting means which constitutes a camera system in combination with a camera having blur detecting means, said interchangeable lens comprising:

drive control means for controlling the driving of said image blur correcting means on the basis of the signal related to the driving of said image blur correcting means upon receiving said signal, and for driving said image blur correcting means to a predetermined position and stopping the driving of said image blur correcting means when not receiving the signal related to the driving of said image blur correcting means for a predetermined period of time.

18. A camera system including a camera having blur detecting means and an interchangeable lens having image blur correcting means and detachably attached to said camera, comprising:

transmitting means for transmitting to said interchangeable lens a given-position drive signal for driving said image blur correcting means to a given position or a coordinate position drive signal of said image blur correcting means which is calculated on the basis of an output of said blur detecting means, said transmitting means being arranged on said camera; and drive control means for controlling the driving of said image blur correcting means in accordance with the given-position drive signal transmitted from said transmitting means or the coordinate position drive signal, said drive control means being arranged on said interchangeable lens.

19. A camera system according to claim 18, wherein the data amount of the given-position drive signal is smaller than the data amount of the coordinate position drive signal.

20. A camera system according to claim 18, wherein said camera transmits the given-position drive signal to said interchangeable lens from said transmitting device instead of the coordinate position drive signal in the case where the coordinate position drive signal calculated on the basis of an output of said blur detecting means is equal to or substantially equal to the given-position drive signal.

21. An image blur correcting system according to claim 18, wherein said interchangeable lens transmits position setting information related to the given-position drive signal to which the optical characteristic of said optical device is added to said camera; and wherein said camera transmits the given-position drive signal for driving said image blur correcting means to a predetermined position to said interchangeable lens on the basis of the position setting information.

22. A camera having blur detecting means that constitutes a camera system in combination with an interchangeable lens having image blur correcting means, said camera comprising:

transmitting means for transmitting to said interchangeable lens a given-position drive signal for driving said image blur correcting means to a given position or a coordinate position drive signal of said image blur correcting means which is calculated on the basis of an output of said blur detecting means.

23. A camera system according to claim 22, wherein said camera transmits the given-position drive signal to said interchangeable lens from said transmitting device instead of the coordinate position drive signal in the case where the coordinate position drive signal calculated on the basis of an output of said blur detecting means is equal to or substantially equal to the given-position drive signal.

24. An interchangeable lens constituting a camera system in combination with said camera according to claim 22 or 23, said interchangeable lens comprising:

drive control means for controlling the driving of said image blur correcting means in accordance with the given-position drive signal transmitted from said camera or the coordinate position drive signal.

25. A camera system including a camera having blur detecting means and an interchangeable lens having image blur correcting means and detachably attached to said camera, comprising:

transmitting means for transmitting to said optical device a given-angle-of view drive signal for driving said image blur correcting means to a given angle of view or a coordinate position drive signal of said image blur correcting means which is calculated on the basis of an output of said blur detecting means, said transmitting means being arranged on said camera; and drive control means for controlling the driving of said image blur correcting means in accordance with the given angle-of-view drive signal transmitted from said transmitting means or the coordinate position drive signal, said drive control means being arranged on said interchangeable lens.

26. A camera system according to claim 25, wherein the data amount of the given-angle-of-view drive signal is smaller than the data amount of the coordinate position drive signal.

27. A camera system according to claim 25, wherein said camera transmits the given-angle-of position drive signal to said interchangeable lens from said transmitting device instead of the coordinate position drive signal in the case where the coordinate position drive signal calculated on the basis of an output of said blur detecting means is equal to or substantially equal to the given-angle-of-position drive signal.

28. A camera system according to claim 25, wherein said interchangeable lens transmits position setting information related to the given-position drive signal to which the optical characteristic of said optical device is added to said camera; and wherein said camera transmits the given-angle-of view drive signal for driving said image blur correcting means to a predetermined position to said interchangeable lens, on the basis of the position setting information.

29. A camera having blur detecting means which constitutes a camera system in combination with an interchangeable lens having image blur correcting means, said camera comprising:

transmitting means for transmitting to said interchangeable lens a given-angle-of-view drive signal for driving said image blur correcting means to a given angle of view or a coordinate position drive signal of said image blur correcting means which is calculated on the basis of an output of said blur detecting means.

30. A camera according to claim 29, wherein said camera transmits the given-angle-of-position drive signal to said interchangeable lens from said transmitting device instead of the coordinate position drive signal in the case where the coordinate position drive signal calculated on the basis of an output of said blur detecting means is equal to or substantially equal to the given-angle-of-position drive signal.

31. An interchangeable lens having image blur correcting means which constitutes a camera system in combination with said camera according to claim 29, said interchangeable lens comprising:

drive control means for controlling the driving of said image blur correcting means in accordance with the given-angle-of-view drive signal transmitted from said camera or the coordinate position drive signal.

32. An image blur correcting system including a camera unit portion having blur detecting means with an optical unit portion having image blur correcting means, comprising:

transmitting means for transmitting a signal related to the driving of said image blur correcting means to said optical unit portion, said transmitting means being arranged on said camera unit portion; and drive control means for controlling the driving of said image blur correcting means on the basis of the signal related to the driving of said image blur correcting means upon receiving said signal and for stopping the driving of said image blur correcting means when not receiving the signal related to the driving of said image blur correcting means for a predetermined period of time, said drive control means being arranged on said optical unit portion.

33. An image blur correcting system according to claim 32, wherein said optical unit portion includes mechanically locking means for mechanically locking said image blur correcting means to a given position; and wherein said drive control means locks said image blur correcting means to a given position by said mechanically locking means after said image blur correcting means is driven to a position where said mechanically locking means functions when said drive control means does not receive the signal related to the driving for a predetermined period of time.

34. An image blur correcting system including a camera unit portion having blur detecting means and an optical unit portion having image blur correcting means, comprising:

transmitting means for transmitting a signal related to the driving of said image blur correcting means to said optical unit portion, said transmitting means being arranged on said camera unit portion; and drive control means for controlling the driving of said image blur correcting means on the basis of the signal related to the driving of said image blur correcting means upon receiving said signal, and for driving said image blur correcting means to a predetermined position and stopping the driving of said image blur correcting means when not receiving the signal related to the driving of said image blur correcting means for a predetermined period of time, said drive control means being arranged on said optical unit portion.

35. An image blur correcting system according to claim 34, wherein said image blur correcting means includes electrically locking means for retaining said image blur correcting means to said predetermined position.

36. An image blur correcting system according to claim 34, wherein said predetermined position is a position at the time where it is judged that the signal related to the driving is not received for said predetermined period of time.

37. An image blur correcting system according to claim 34 or 35, wherein said predetermined position is a movable center position of said image blur correcting means.

38. An image blur correcting system according to claim 34 or 35, wherein said predetermined position is a position where an electric power for retaining said image blur correcting means to a predetermined position is the least.

39. A camera system including a camera having blur detecting means and an interchangeable lens having image blur correcting means, comprising:

transmitting means for transmitting a signal related to the driving of said image blur correcting means to said camera, said transmitting means being arranged on said camera; and drive control means for controlling the driving of said image blur correcting means on the basis of the signal related to the driving of said image blur correcting means upon receiving said signal and for stopping the driving of said image blur correcting means when not receiving the signal related to the driving of said image blur correcting means for a predetermined period of time, said drive control means being arranged on said interchangeable lens.

40. A camera system according to claim 39, wherein said interchangeable lens includes mechanically locking means for mechanically locking said image blur correcting means to a given position; and wherein said drive control means locks said image blur correcting means to a given position by said mechanically locking means after said image blur correcting means is driven to a position where said mechanically locking means functions when said drive control means does not receive the signal related to the driving for a predetermined period of time.

41. A camera system including a camera having blur detecting means and an interchangeable lens having image blur correcting means, comprising:

transmitting means for transmitting a signal related to the driving of said image blur correcting means to said interchangeable lens, said transmitting means being arranged on said camera; and drive control means for controlling the driving of said image blur correcting means on the basis of the signal related to the driving of said image blur correcting means upon receiving said signal and for driving said image blur correcting means to a predetermined position and stopping the driving of said image blur correcting means when not receiving the signal related to the driving of said image blur correcting means for a predetermined period of time, said drive control means being arranged on said interchangeable lens.

42. A camera system according to claim 41, wherein said image blur correcting means includes electrically locking means for retaining said image blur correcting means to said predetermined position.

43. A camera system according to claim 41, wherein said predetermined position is a position at the time where it is judged that the signal related to the driving is not received for said predetermined period of time.

44. A camera system according to claim 41 or 42, wherein said predetermined position is a movable center position of said image blur correcting means.

45. A camera system according to claim 41 or 42, wherein said predetermined position is a position where an electric power for retaining said image blur correcting means to a predetermined position is the last.

46. An interchangeable lens having image blur correcting means which constitutes a camera system in combination with a camera having blur detecting means, said interchangeable lens comprising:

drive control means for controlling the driving of said image blur correcting means on the basis of the signal related to the driving of said image blur correcting means upon receiving said signal from said camera, and for stopping the driving of said image blur correcting means when not receiving the signal related to the driving of said image blur correcting means for a predetermined period of time.

* * * * *

UNITED STATES PATENT AND TRADEMARK OFFICE
CERTIFICATE OF CORRECTION

PATENT NO.    : 6,522,837 B2
DATED         : February 18, 2003
INVENTOR(S)   : Kazuhiro Izukawa It is certified that error appears in the above-identified patent and that said Letters Patent is hereby corrected as shown below:

Drawings,
Figure 26B, Box # 1192, "PICH" should read -- PITCH --.

Column 7,
Line 44, "4B" should read -- 4B which are --.
Line 59, "9b" should read -- 9B which are --.

Column 8,
Line 10, "15B" should read -- 15B which are --.
Line 25, "21B" should read -- 21B which are --.
Line 28, "22B" should read -- 22B which are --.
Line 39, "26B" should read -- 26B which are --.
Line 54, "31B" should read -- 31B which are --.
Line 58, "32B" should read -- 32B which are --.

Column 25,
Line 15, "those angle of views" should read -- those angles of view --.

Column 29,
Line 31, "of" should read -- off --.

Column 32,
Line 34, "conducting" should read -- and conducting --.

Column 33,
Lines 22 and 48, "conducting" should read -- and conducting --.
Line 26, "and" should be deleted.
Line 31, "camera" should read -- camera; --.

Column 34,
Line 40, "given angle-of-view" should read -- given-angle-of-view --.
Lines 49 and 64, "given-angle-of view" should read -- given-angle-of-view --.

UNITED STATES PATENT AND TRADEMARK OFFICE
CERTIFICATE OF CORRECTION

PATENT NO. : 6,522,837 B2
DATED : February 18, 2003
INVENTOR(S) : Kazuhiro Izukawa It is certified that error appears in the above-identified patent and that said Letters Patent is hereby corrected as shown below:

<u>Column 36,</u>
Lines 20 and 49, "given-angle-of view" should read -- given-angle-of-view --.
Line 28, "given angle-of-view" should read -- given-angle-of-view --.
Line 37, "given-angle-of position" should read -- given-angle-of-position --.

Signed and Sealed this

Fourteenth Day of October, 2003

JAMES E. ROGAN
*Director of the United States Patent and Trademark Office*